United States Patent
Hayakawa

(10) Patent No.: US 7,983,781 B2
(45) Date of Patent: Jul. 19, 2011

(54) APPARATUS FOR DETERMINING SEWING SEQUENCES, PROGRAM FOR DETERMINING SEWING SEQUENCES RECORDED ON COMPUTER-READABLE RECORDING MEDIUM, AND SEWING MACHINE

(75) Inventor: Atsuya Hayakawa, Chita (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1149 days.

(21) Appl. No.: 11/727,340

(22) Filed: Mar. 26, 2007

(65) Prior Publication Data
US 2007/0233308 A1    Oct. 4, 2007

(30) Foreign Application Priority Data
Mar. 28, 2006 (JP) .................... 2006-087635

(51) Int. Cl.
*G06F 7/66* (2006.01)
(52) U.S. Cl. ............... 700/136; 112/470.01; 112/475.19
(58) Field of Classification Search .......... 700/136–138; 112/102.5, 163, 445, 470.01, 470.04, 475.19
See application file for complete search history.

(56) References Cited

U.S. PATENT DOCUMENTS

| | | | | |
|---|---|---|---|---|
| 5,701,830 A | * | 12/1997 | Muto | ......................... 112/102.5 |
| 5,765,496 A | | 6/1998 | Futamura | |
| 5,896,295 A | * | 4/1999 | Matsushita et al. | ........... 700/138 |
| 5,904,109 A | * | 5/1999 | Asano | ......................... 112/102.5 |
| 6,012,402 A | * | 1/2000 | Sekine | ......................... 112/102.5 |
| 6,980,877 B1 | * | 12/2005 | Hagino et al. | ................ 700/138 |

FOREIGN PATENT DOCUMENTS

| | | |
|---|---|---|
| JP | A 6-15072 | 1/1994 |
| JP | A 10-113483 | 5/1998 |
| JP | A 2003-33589 | 2/2003 |
| JP | A 2004-33538 | 2/2004 |
| JP | A 2005-73870 | 3/2005 |
| JP | A 2005-73874 | 3/2005 |

* cited by examiner

*Primary Examiner* — Gary L. Welch
*Assistant Examiner* — Nathan E Durham
(74) *Attorney, Agent, or Firm* — Oliff & Berridge, PLC

(57) ABSTRACT

Sewing data of multiple sewing targets stored in RAM of a sewing sequence determining apparatus is acquired. Permutations or combinations of the sewing targets are created as sewing sequence candidates. A number of needle bars N provided at a multi-needle sewing machine is acquired. An optimal thread replacement count is initialized. A thread replacement count is calculated for each of sewing sequence candidates, in the case where sewing operations are carried out by the multi-needle sewing machine equipped with N needle bars on the sewing targets in accordance with the sewing sequence candidates. A sewing sequence candidate of the fewest thread replacement count is determined to be an optimal sewing sequence candidate. The optimal sewing sequence candidate is displayed on a liquid crystal display and announced. Determination of sewing sequences at the time of carrying out sewing operations with respect to multiple sewing targets is easily achieved.

29 Claims, 32 Drawing Sheets

FIG. 7

| SEWING SEQUENCES | SEWING TARGET A | SEWING TARGET B | SEWING TARGET C |
|---|---|---|---|
| 1 | RED | YELLOWISH GREEN | RED |
| 2 | BLUE | ORANGE | BLACK |
| 3 | WHITE | PURPLE | LIGHT BLUE |
| 4 | BLACK | GOLD | PINK |
| 5 | BROWN | LIGHT BLUE | BLUE |
| 6 | BLACK | PINK | BROWN |
| 7 | GREEN | | WHITE |
| 8 | YELLOW | | |
| 9 | RED | | |
| 10 | GREY | | |

FIG. 8

| NEEDLE BAR NUMBERS | COLORS OF THREADS |
|---|---|
| 1 | YELLOWISH GREEN |
| 2 | PURPLE |
| 3 | LIGHT BLUE |
| 4 | RED |
| 5 | GOLD |
| 6 | GREEN |

FIG. 11

| SEWING SEQUENCE CANDIDATE NUMBERS | FIRST SEQUENCE | SECOND SEQUENCE | THIRD SEQUENCE |
|---|---|---|---|
| 1 | A | B | C |
| 2 | A | C | B |
| 3 | B | A | C |
| 4 | B | C | A |
| 5 | C | A | B |
| 6 | C | B | A |

FIG. 12

| SEWING TARGETS | SEWING SEQUENCES | COLORS OF THREAD | NEEDLE BAR NUMBER 1 / COLORS OF THREAD YELLOWISH GREEN | 2 / PURPLE | 3 / LIGHT BLUE | 4 / RED | 5 / GOLD | 6 / GREEN | THREAD REPLACEMENT COUNT (TIMES) |
|---|---|---|---|---|---|---|---|---|---|
| A | 1 | RED | BLUE | WHITE | BLACK | RED | BROWN | GREEN | 4 |
| | 2 | BLUE | | | | | | | |
| | 3 | WHITE | | | | | | | |
| | 4 | BLACK | | | | | | | |
| | 5 | BROWN | | | | | | | |
| | 6 | BLACK | | | | | | | |
| | 7 | GREEN | YELLOW | GREY | YELLOWISH GREEN | RED | ORANGE | GREEN | 4 |
| | 8 | YELLOW | | | | | | | |
| | 9 | RED | | | | | | | |
| | 10 | GREY | | | | | | | |
| B | 11 | YELLOWISH GREEN | | | | | | | |
| | 12 | ORANGE | | | | | | | |
| | 13 | PURPLE | PURPLE | GOLD | LIGHT BLUE | RED | PINK | BLACK | 5 |
| | 14 | GOLD | | | | | | | |
| | 15 | LIGHT BLUE | | | | | | | |
| | 16 | PINK | | | | | | | |
| C | 17 | RED | | | | | | | |
| | 18 | BLACK | | | | | | | |
| | 19 | LIGHT BLUE | BLUE | BROWN | LIGHT BLUE | WHITE | PINK | BLACK | 3 |
| | 20 | PINK | | | | | | | |
| | 21 | BLUE | | | | | | | |
| | 22 | BROWN | | | | | | | |
| | 23 | WHITE | | | | | | | |
| TOTAL | | | | | | | | | 16 |

FIG. 13

| SEWING SEQUENCE CANDIDATE NUMBERS | FIRST SEQUENCE | SECOND SEQUENCE | THIRD SEQUENCE | THREAD REPLACEMENT COUNT (TIMES) |
|---|---|---|---|---|
| 1 | A | B | C | 16 |
| 2 | A | C | B | 14 |
| 3 | B | A | C | 14 |
| 4 | B | C | A | 10 |
| 5 | C | A | B | 14 |
| 6 | C | B | A | 17 |

FIG. 17

| | | | NEEDLE BAR NUMBER | | COLORS OF THREAD | | | | |
|---|---|---|---|---|---|---|---|---|---|
| | | | 1 | 2 | 3 | 4 | 5 | 6 | THREAD REPLACEMENT COUNT (TIMES) |
| SEWING TARGETS | SEWING SEQUENCES | COLORS OF THREAD | YELLOWISH GREEN | PURPLE | LIGHT BLUE | RED | GOLD | GREEN | |
| A | 1 | RED | BLUE | WHITE | BLACK | RED | BROWN | GREEN | 4 |
| | 2 | BLUE | | | | | | | |
| | 3 | WHITE | | | | | | | |
| | 4 | BLACK | | | | | | | |
| | 5 | BROWN | | | | | | | |
| | 6 | BLACK | | | | | | | |
| | 7 | GREEN | | | | | | | |
| | 8 | YELLOW | YELLOW | GREY | BLACK | RED | BROWN | GREEN | 2 |
| | 9 | RED | | | | | | | |
| | 10 | GREY | | | | | | | |
| B | 1 | YELLOWISH GREEN | YELLOWISH GREEN | ORANGE | PURPLE | GOLD | LIGHT BLUE | PINK | 6 |
| | 2 | ORANGE | | | | | | | |
| | 3 | PURPLE | | | | | | | |
| | 4 | GOLD | | | | | | | |
| | 5 | LIGHT BLUE | | | | | | | |
| | 6 | PINK | | | | | | | |
| C | 1 | RED | RED | BLACK | BLUE | BROWN | LIGHT BLUE | PINK | 4 |
| | 2 | BLACK | | | | | | | |
| | 3 | LIGHT BLUE | | | | | | | |
| | 4 | PINK | | | | | | | |
| | 5 | BLUE | | | | | | | |
| | 6 | BROWN | | | | | | | |
| | 7 | WHITE | WHITE | BLACK | BLUE | BROWN | LIGHT BLUE | PINK | 1 |
| TOTAL | | | | | | | | | 17 |

FIG. 19

| | | | NEEDLE BAR NUMBER | | | COLORS OF THREAD | | | |
|---|---|---|---|---|---|---|---|---|---|
| | | | 1 | 2 | 3 | 4 | 5 | 6 | THREAD REPLACEMENT COUNT (TIMES) |
| SEWING TARGETS | SEWING SEQUENCES | COLORS OF THREAD | YELLOWISH GREEN | PURPLE | LIGHT BLUE | RED | GOLD | GREEN | |
| A | 1 | RED | BLUE | WHITE | BLACK | RED | BROWN | GREEN | 4 |
| | 2 | BLUE | | | | | | | |
| | 3 | WHITE | | | | | | | |
| | 4 | BLACK | | | | | | | |
| | 5 | BROWN | | | | | | | |
| | 6 | BLACK | | | | | | | |
| | 7 | GREEN | | | | | | | |
| | 8 | YELLOW | YELLOW | GREY | YELLOWISH GREEN | RED | ORANGE | PURPLE | 5 |
| | 9 | RED | | | | | | | |
| | 10 | GREY | | | | | | | |
| B | 1 | YELLOWISH GREEN | | | | | | | |
| | 2 | ORANGE | | | | | | | |
| | 3 | PURPLE | | | | | | | |
| | 4 | GOLD | GOLD | LIGHT BLUE | PINK | RED | BLACK | BLUE | 5 |
| | 5 | LIGHT BLUE | | | | | | | |
| | 6 | PINK | | | | | | | |
| C | 1 | RED | | | | | | | |
| | 2 | BLACK | | | | | | | |
| | 3 | LIGHT BLUE | | | | | | | |
| | 4 | PINK | | | | | | | |
| | 5 | BLUE | | | | | | | |
| | 6 | BROWN | | | | | | | |
| | 7 | WHITE | BROWN | WHITE | PINK | RED | BLACK | BLUE | 2 |
| TOTAL | | | | | | | | | 16 |

FIG. 20

| RAM | |
|---|---|
| MULTI-NEEDLE SEWING MACHINE THREAD INFORMATION STORAGE AREA | 470 |
| SEWING DATA STORAGE AREA | 471 |
| SEWING SEQUENCE CANDIDATE STORAGE AREA | 472 |
| NUMBER-OF-NEEDLE BARS STORAGE AREA | 473 |
| SEWING THREAD INFORMATION STORAGE AREA | 474 |
| NEEDLE BAR/THREAD INFORMATION STORAGE AREA | 475 |
| THREAD REPLACEMENT COUNT STORAGE AREA | 476 |
| OPTIMAL CANDIDATE STORAGE AREA | 477 |
| SEWING SEQUENCE CANDIDATE COUNTER STORAGE AREA | 478 |
| THREAD INFORMATION SEWING SEQUENCE STORAGE AREA | 479 |
| SEWING THREAD INFORMATION COUNTER STORAGE AREA | 480 |
| SEWING TARGET COUNTER STORAGE AREA | 481 |
| PREDETERMINED THREAD DEFAULT INFORMATION STORAGE AREA | 482 |
| PREDETERMINED THREAD INFORMATION STORAGE AREA | 483 |
| NUMBER-OF-PREDETERMINED THREAD INFORMATION STORAGE AREA | 484 |
| GROUP STORAGE AREA | 491 |
| SEQUENCE-DETERMINED SEWING TARGET STORAGE AREA | 492 |
| SEQUENCE-DETERMINED GROUP STORAGE AREA | 493 |
| INTRA-GROUP SEQUENCE-DETERMINED SEWING TARGET STORAGE AREA | 494 |
| INTRA-GROUP SEWING SEQUENCE STORAGE AREA | 495 |
| PRELIMINARY CANDIDATE CREATION TARGET STORAGE AREA | 496 |
| PRELIMINARY CANDIDATE STORAGE AREA | 497 |
| SEWING SEQUENCE CANDIDATE CREATION TARGET STORAGE AREA | 498 |
| ⋮ | |

| PATTERN NUMBERS | CONDITIONS | PRESENCE OF GROUP | | SEQUENCE-DETERMINED SEWING TARGET | | SEQUENCE-DETERMINED GROUP | | INTRA-GROUP SEQUENCE-DETERMINED SEWING TARGET | | NUMBER OF SEWING SEQUENCE CANDIDATES | SEWING SEQUENCE CANDIDATES |
|---|---|---|---|---|---|---|---|---|---|---|---|
| | | ABSENT | PRESENT | ABSENT | PRESENT | ABSENT | PRESENT | ABSENT | PRESENT | | |
| 1 | NO CONDITIONS | O | | O | | | | | | 4! | ABCD, ABDC, ACBD, ACDB, ADBC, ADCB, BACD, BADC, BCAD, BCDA, BDAC, BDCA, CABD, CADB, CBAD, CBDA, CDAB, CDBA, DABC, DACB, DBAC, DBCA, DCAB, DCBA |
| 2 | C IS SET AT FIRST SEQUENCE | O | | | O | | | | | 3! | CABD, CADB, CBAD, CBDA, CDAB, CDBA |
| 3 | AB IS GROUPED | | O | O | | O | | | | 3! × 2! | ABCD, ABDC, BACD, BADC, CABD, CBAD, CDAB, CDBA, DABC, DBAC, DCAB, DCBA |
| 4 | AB IS GROUPED IN ORDER OF AB | | O | O | | O | | | | 3! | ABCD, ABDC, CABD, CDAB, DABC, DCAB |
| 5 | GROUP AB IS SET AT FIRST SEQUENCE | | O | O | | | O | | | 2! × 2! | ABCD, ABDC, BACD, BADC |
| 6 | GROUP AB IS SET AT FIRST SEQUENCE IN ORDER OF AB | | O | O | | | O | | | 2! | ABCD, ABDC |
| 7 | C IS SET AT FIRST SEQUENCE, AND AB IS GROUPED | | O | | O | O | | | | 2! × 2! | CABD, CBAD, CDAB, CDBA |
| 8 | C IS SET AT FIRST SEQUENCE, AND AB IS GROUPED IN ORDER OF AB | | O | | O | O | | | | 2! | CABD, CDAB |
| 9 | C IS SET AT FIRST SEQUENCE, AND GROUP AB IS SET AT SECOND SEQUENCE | | O | | O | | O | O | | 2! | CABD, CBAD |
| 10 | C IS SET AT FIRST SEQUENCE, AND GROUP AB IS SET AT SECOND SEQUENCE IN ORDER OF AB | | O | | O | | O | | O | 1 | CABD |

FIG. 24

| PATTERN NUMBERS | PRELIMINARY CANDIDATE NUMBERS | FIRST SEQUENCE | SECOND SEQUENCE | THIRD SEQUENCE |
|---|---|---|---|---|
| 3 AND 4 | 1 | AB | C | D |
| | 2 | AB | D | C |
| | 3 | C | AB | D |
| | 4 | C | D | AB |
| | 5 | D | AB | C |
| | 6 | D | C | AB |
| 5 AND 6 | 1 | AB | C | D |
| | 2 | AB | D | C |
| 7 AND 8 | 1 | C | AB | D |
| | 2 | C | D | AB |
| 9 AND 10 | 1 | C | AB | D |

FIG. 25

| PATTERN NUMBERS | INTRA-GROUP SEWING SEQUENCE NUMBERS | FIRST SEQUENCE | SECOND SEQUENCE |
|---|---|---|---|
| 3, 5, 7, AND 9 | 1 | A | B |
| | 2 | B | A |
| 4, 6, 8, AND 10 | 1 | A | B |

FIG. 27

| SEWING SEQUENCES | SEWING TARGET A | SEWING TARGET B | SEWING TARGET C | SEWING TARGET D |
|---|---|---|---|---|
| 1 | RED | YELLOWISH GREEN | RED | ORANGE |
| 2 | BLUE | ORANGE | BLACK | YELLOWISH GREEN |
| 3 | WHITE | PURPLE | LIGHT BLUE | YELLOW |
| 4 | BLACK | GOLD | PINK | PINK |
| 5 | BROWN | LIGHT BLUE | BLUE | RED |
| 6 | BLACK | PINK | BROWN | |
| 7 | GREEN | | WHITE | |
| 8 | YELLOW | | | |
| 9 | RED | | | |
| 10 | GREY | | | |

FIG. 31

| | | | NEEDLE BAR NUMBER / COLORS OF THREAD | | | | | | |
|---|---|---|---|---|---|---|---|---|---|
| | | | 1 | 2 | 3 | 4 | 5 | 6 | THREAD REPLACEMENT COUNT (TIMES) |
| SEWING TARGETS | SEWING SEQUENCES | COLORS OF THREAD | YELLOWISH GREEN | PURPLE | LIGHT BLUE | RED | GOLD | GREEN | |
| B | 1 | YELLOWISH GREEN | YELLOWISH GREEN | PURPLE | LIGHT BLUE | ORANGE | GOLD | PINK | 2 |
| | 2 | ORANGE | | | | | | | |
| | 3 | PURPLE | | | | | | | |
| | 4 | GOLD | | | | | | | |
| | 5 | LIGHT BLUE | | | | | | | |
| | 6 | PINK | | | | | | | |
| C | 1 | RED | RED | BLACK | LIGHT BLUE | BLUE | BROWN | PINK | 4 |
| | 2 | BLACK | | | | | | | |
| | 3 | LIGHT BLUE | | | | | | | |
| | 4 | PINK | | | | | | | |
| | 5 | BLUE | | | | | | | |
| | 6 | BROWN | | | | | | | |
| | 7 | WHITE | WHITE | BLACK | LIGHT BLUE | BLUE | BROWN | PINK | 1 |
| A | 1 | RED | WHITE | BLACK | RED | BLUE | BROWN | GREEN | 2 |
| | 2 | BLUE | | | | | | | |
| | 3 | WHITE | | | | | | | |
| | 4 | BLACK | | | | | | | |
| | 5 | BROWN | | | | | | | |
| | 6 | BLACK | | | | | | | |
| | 7 | GREEN | | | | | | | |
| | 8 | YELLOW | YELLOW | GREY | RED | BLUE | BROWN | GREEN | 2 |
| | 9 | RED | | | | | | | |
| | 10 | GREY | | | | | | | |
| TOTAL | | | | | | | | | 11 |

FIG. 32

| | | | NEEDLE BAR NUMBER | | | | | | COLORS OF THREAD | |
|---|---|---|---|---|---|---|---|---|---|---|
| | | | 1 | 2 | 3 | 4 | 5 | 6 | THREAD REPLACEMENT COUNT (TIMES) |
| SEWING TARGETS | SEWING SEQUENCES | COLORS OF THREAD | RED | BLACK | LIGHT BLUE | BLUE | BROWN | PINK | |
| C | 3 | LIGHT BLUE | | | | | | | |
| | 4 | PINK | | | | | | | |
| | 5 | BLUE | | | | | | | |
| | 6 | BROWN | | | | | | | |
| | 7 | WHITE | WHITE | BLACK | LIGHT BLUE | BLUE | BROWN | PINK | 1 |
| A | 1 | RED | WHITE | BLACK | RED | BLUE | BROWN | GREEN | 2 |
| | 2 | BLUE | | | | | | | |
| | 3 | WHITE | | | | | | | |
| | 4 | BLACK | | | | | | | |
| | 5 | BROWN | | | | | | | |
| | 6 | BLACK | | | | | | | |
| | 7 | GREEN | | | | | | | |
| | 8 | YELLOW | YELLOW | GREY | RED | BLUE | BROWN | GREEN | 2 |
| | 9 | RED | | | | | | | |
| | 10 | GREY | | | | | | | |
| D | 1 | ORANGE | YELLOW | ORANGE | RED | YELLOWISH GREEN | PINK | GREEN | 3 |
| | 2 | YELLOWISH GREEN | | | | | | | |
| | 3 | YELLOW | | | | | | | |
| | 4 | PINK | | | | | | | |
| | 5 | RED | | | | | | | |
| TOTAL | | | | | | | | | 8 |

APPARATUS FOR DETERMINING SEWING SEQUENCES, PROGRAM FOR DETERMINING SEWING SEQUENCES RECORDED ON COMPUTER-READABLE RECORDING MEDIUM, AND SEWING MACHINE

CROSS-REFERENCE TO RELATED APPLICATION

This application claims priority from JP 2006-087635, filed Mar. 28, 2006, the content of which is hereby incorporated by reference.

BACKGROUND

The present disclosure relates to a sewing sequence determining apparatus, a sewing sequence determining program recorded on a computer-readable recording medium, and a sewing machine, the apparatus and program determining sewing sequences of a sewing target when a plurality of sewing targets are sewn by a multi-needle sewing machine.

Conventionally, it has been well known that a multi-needle sewing machine has a plurality of needle bars having sewing needles mounted thereon and a needle bar case in which the plurality of needle bars are provided. This multi-needle sewing machine is configured so that a thread supplied to each of the sewing needles as upper thread can be mounted, the number of which is equal to or greater than the number of sewing needles. In addition, it has been known that a sewing machine control device for controlling the multi-needle sewing machine registers in association with each other needle bars (sewing needles) and thread information serving as information relating to colors, thickness, materials, and manufacturers or the like of threads supplied to the needle bars (sewing needles).

At the time of controlling sewing operations of a multi-needle sewing machine, such a sewing machine control device compares thread information included in sewing data for carrying out sewing operations with thread information on threads supplied to sewing needles, and selects sewing needles supplied with threads that correspond to the thread information in the sewing data as sewing needles. In addition, in the case where the thread corresponding to thread information included in the sewing data is not registered in the sewing machine control device, the above control device interrupts sewing operations of the multi-needle sewing machine.

At this time, an operator needs to replace threads so as to supply to the sewing needles the thread corresponding to the thread information included in the sewing data, and then, resume sewing using the multi-needle sewing machine. The operator must set a relationship between the needle bars and the threads supplied to the sewing needles mounted on the needle bars, whereas it is desirable to replace threads so as to reduce the number of thread replacement and to reduce the time period of interrupting sewing operations of the multi-needle sewing machine to the minimum. Therefore, there is proposed a variety of methods for effectively carrying out thread replacement of the multi-needle sewing machine.

For example, there is proposed a sewing machine control device, a sewing machine control method, and a sewing machine control program for determining a relationship between needle bars and threads supplied to sewing needles mounted onto these needle bars in consideration of the sewing sequences or thread use frequency or the like so as to reduce the number of the thread replacement during sewing operations, and then, announcing their relationship to an operator (for example, Japanese Patent Application Laid-open No. 2004-33538).

SUMMARY

The conventional sewing control device described above determines a relationship between needle bars and threads supplied to sewing needles mounted on these needle bars so as to reduce the number of the thread replacement with respect to a single sewing target. Therefore, in the case where a plurality of sewing targets is provided, the operator must determine the sequences of sewing these sewing targets. There has been a problem that, in order to reduce the thread replacement count through the whole sewing work on a plurality of sewing targets, the operator needs to grasp what kind of thread information on thread to be used for each sewing target and to determine which of the sequences is effective for sewing, requiring a large amount of labor. In addition, there has been a problem that, in the case where the sequences of sewing a plurality of sewing targets has not been properly determined, the thread replacement count increases, and concurrently, the sewing time or inconvenience associated with replacement increases.

The present disclosure solves the foregoing problems. Exemplary embodiments provide a sewing sequence determining apparatus, a sewing sequence determining program recorded in a computer-readable recording medium, and a sewing machine, the apparatus and program being capable of easily determining sewing sequences when sewing operations are carried out with respect to a plurality of sewing targets.

According to a first aspect of the present disclosure, there is provided a sewing sequence determining apparatus that determines sewing sequences of a plurality of sewing targets, the apparatus including, for example, a sewing data storage device that stores a plurality of sewing targets and sewing data in association with each other, the sewing data including at least thread information that is information relating to threads for sewing the sewing targets and sequence information that indicates sequences for sewing the sewing targets, a thread information readout device that reads out the thread information in accordance with the sequence information for each of sewing sequence candidates, each of which is a candidate of sewing sequences of the plurality of the sewing targets having the sewing data stored in the sewing data storage device, a needle bar/thread information storage device that stores needle bar/thread information that is information relating to threads set at a plurality of needle bars of a multi-needle sewing machine, a thread replacement count calculating device that compares sewing thread information that is the thread information sequentially read out by the thread information readout device with the needle bar/thread information stored in the needle bar/thread information storage device, and then calculates a thread replacement count, and an optimal sequence determining device that determines as an optimal sewing sequence candidate the sewing sequence candidate of which the thread replacement count calculated by the thread replacement count calculating device is minimum.

According to a second aspect of the present disclosure, there is provided a sewing sequence determining program that determines sewing sequences of a plurality of sewing targets, recorded on a computer-readable recording medium, the program including, for example, a sewing data storage step of storing a plurality of sewing targets and sewing data in association with each other, the sewing data including at least thread information that is information relating to threads for sewing the sewing targets and sequence information that indicates sequences for sewing the sewing targets, a thread information readout step of reading out the thread information in accordance with the sequence information for each of sewing sequence candidates, each of which is a candidate of sewing sequences of a plurality of the sewing targets having the sewing data stored in the sewing data storage step, a needle bar/thread information storage step of storing needle bar/thread information that is information relating to threads set at a plurality of needle bars of a multi-needle sewing machine, a thread replacement count calculating step of comparing sewing thread information that is the thread information sequentially read out in the thread information readout step with the needle bar/thread information stored in the needle bar/thread information storage step, and calculating a thread replacement count, and an optimal sequence determining step of determining as an optimal sewing sequence candidate the sewing sequence candidate of which the thread replacement count calculated in the thread replacement count calculating step is minimum.

According to a third aspect of the present disclosure, there is provided a sewing machine including, for example, a sewing sequence determining apparatus provided in accordance with the first aspect of the present disclosure.

BRIEF DESCRIPTION OF THE DRAWINGS

Exemplary embodiments of the disclosure will be described below in detail with reference to the accompanying drawings in which:

FIG. 7 is an illustrative view illustrating sewing sequences and thread colors (thread information) among sewing data on a sewing target;

FIG. 8 is an illustrative view illustrating thread information on threads set at needle bars of the multi-needle sewing machine;

FIG. 11 is an illustrative view illustrating sewing sequence candidates of Example 1;

FIG. 12 is an illustrative view for explaining a processing of calculating the thread replacement count;

FIG. 13 is an illustrative view illustrating the thread replacement count of the sewing sequence candidates of Example 1;

FIG. 17 is an illustrative view for explaining a processing of calculating the thread replacement count;

FIG. 19 is an illustrative view for explaining a processing of calculating the thread replacement count according to a modified example;

FIG. 20 is an illustrative view of a storage area of a RAM;

FIG. 23 is an illustrative view illustrating conditions for sewing sequences of Example 2 and sewing sequence candidates;

FIG. 24 is an illustrative view illustrating preliminary candidates;

FIG. 25 is an illustrative view illustrating intra-group sewing sequences;

FIG. 27 is an illustrative view illustrating sewing sequences and thread colors (thread information);

FIG. 31 is an illustrative view for explaining the processing of calculating the thread replacement count; and FIG. 32 is an illustrative view for explaining a processing of recalculating the thread replacement count.

DETAILED DESCRIPTION OF THE EXEMPLARY EMBODIMENTS

First to fourth exemplary embodiments in which the present disclosure is applied will be described in order with reference to the accompanying drawings. First, a sewing sequence determining apparatus according to the first embodiment is intended to determine the sewing sequences of sewing targets by a multi-needle sewing machine, and is provided integrally with the multi-needle sewing machine. This multi-needle sewing machine is equipped with six needle bars, making it possible to carry out sewing by means of six types of threads supplied from thread spools to sewing needles provided to the respective needle bars. The sewing sequence determining apparatus may be provided independently of the multi-needle sewing machine. Next, with reference to the accompanying drawings, a description will be given with respect to a physical configuration and an electrical configuration of a multi-needle sewing machine and a sewing sequence determining apparatus provided to the multi-needle sewing machine.

First, the physical configuration of the multi-needle sewing machine and the sewing sequence determining apparatus will be described with reference to FIG. 1 to FIG. 3. The front side of the paper face of FIG. 1 and FIG. 2 is referred to as a "front side of multi-needle sewing machine 11," and the rear side of the paper face is referred to as a "rear side of multi-needle sewing machine 11." In addition, a transverse direction is referred to as that viewed from an operator.

Figure 1:
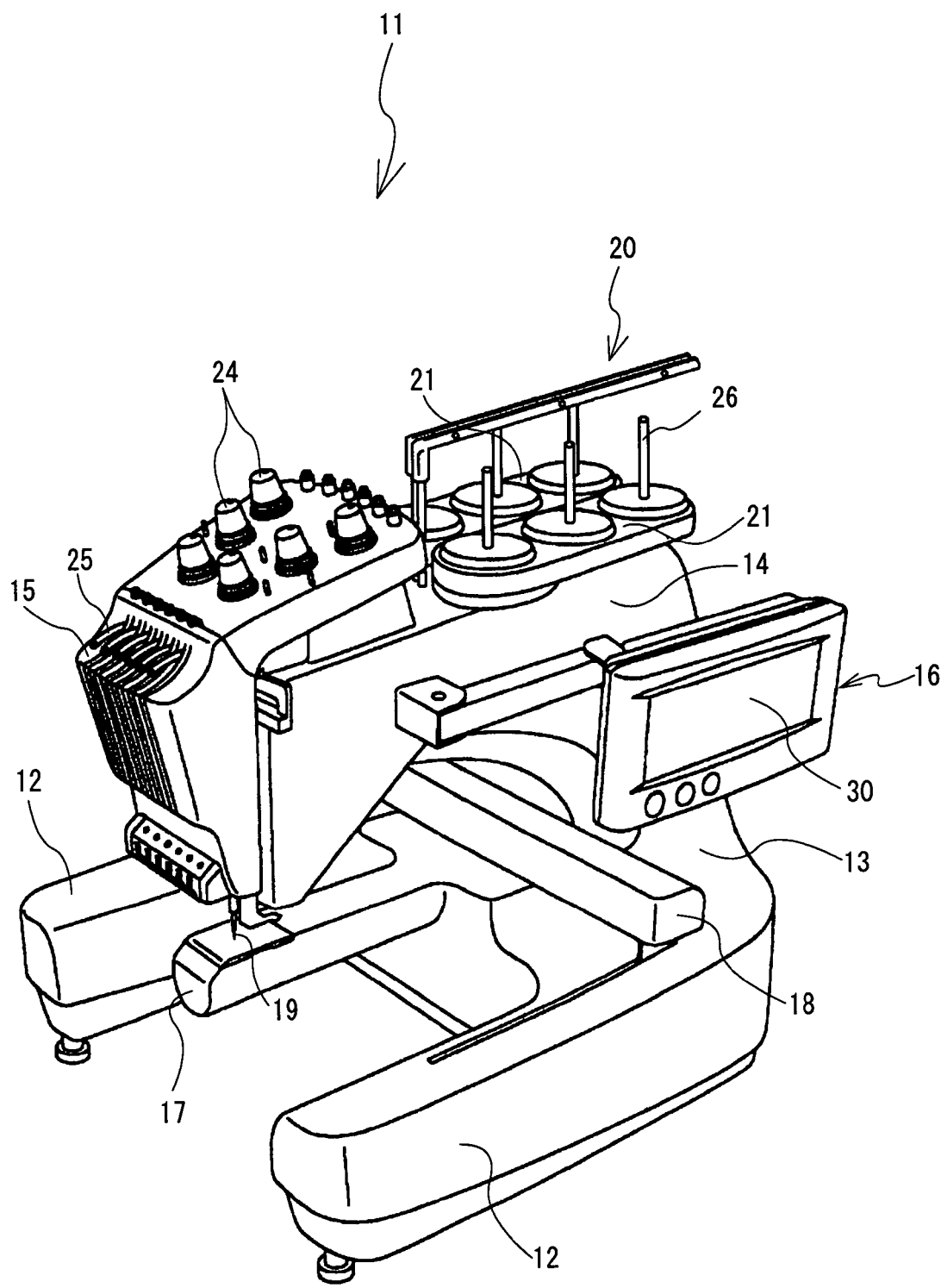
FIG. 1 is a perspective view of a multi-needle sewing machine according to an embodiment of the present disclosure.
Figure 2:
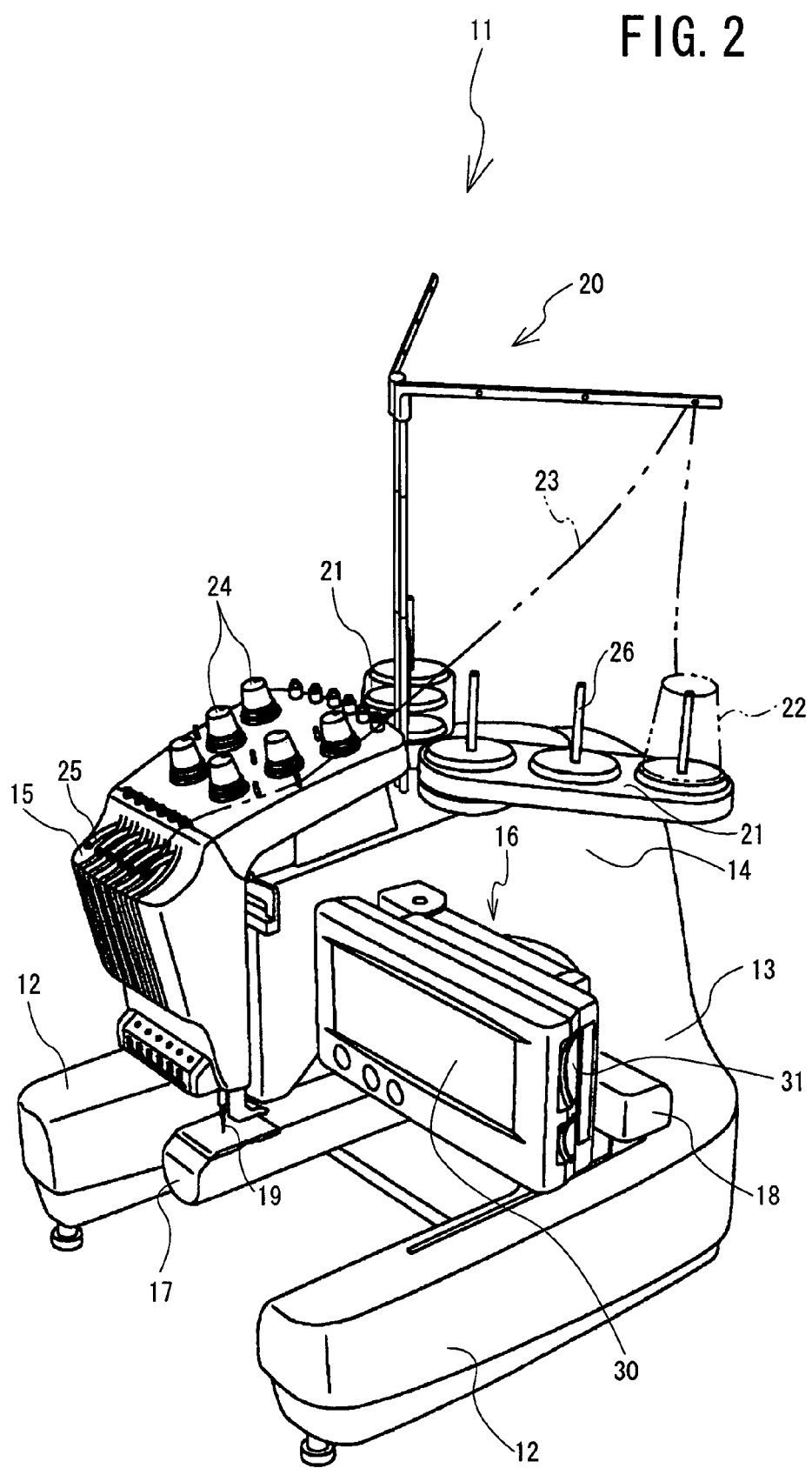
FIG. 2 is a perspective view of a multi-needle sewing machine when a thread spool base is set at an active position.

As shown in FIG. 1 and FIG. 2, the multi-needle sewing machine 11 is equipped with: a support section 12 for supporting the multi-needle sewing machine 11; a pillar section 13 erected from the support section 12; an arm section 14 extending from an upper end of the pillar section 13 to the front side of the multi-needle sewing machine 11; and a needle bar case 15 mounted on an end of the arm section 14 so as to be movable in a transverse direction. Then, at the right side of the center part of the arm section 14, there is provided an operating section 16 which is pivoted to the arm section 14 and which can be switched between a storage position shown in FIG. 1 and an operating position shown in FIG. 2. In addition, downward of the arm section 14, there are provided: a cylinder bed section 17 extending to the front side from a lower end part of the pillar section 13; and a embroidery frame moving mechanism 18 provided at the lower end part of the pillar section 13, the mechanism extending in the transverse direction.

Figure 3:
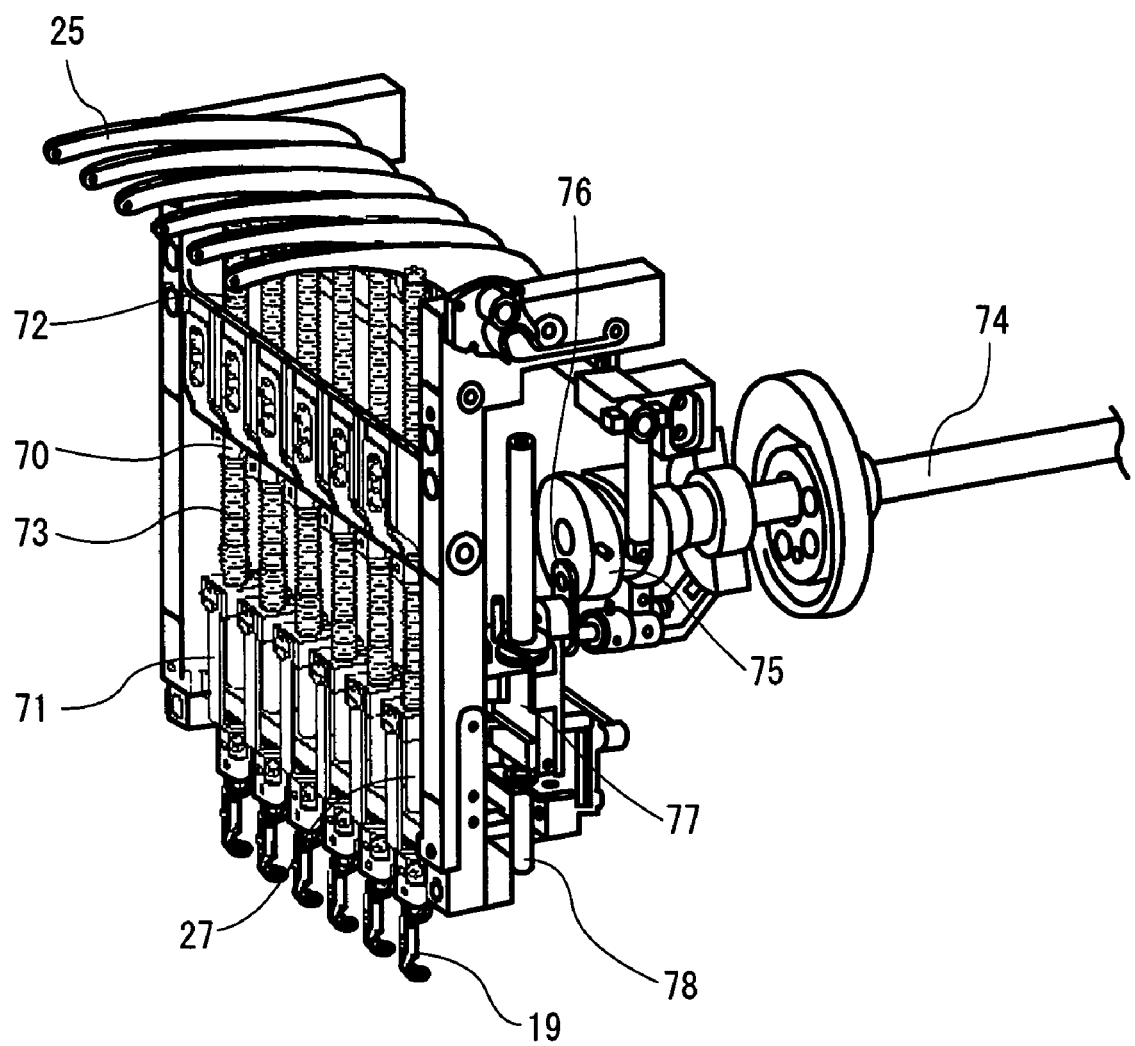
FIG. 3 is an internal schematic view of a needle bar case of the multi-needle sewing machine.

As shown in FIG. 3, six needle bars 27 are provided in the needle bar case 15, and the needle bars 27 are equipped with sewing needles 19, respectively. The needle bars 27 each are supported slidably in a vertical direction by means of two, top and bottom fixing members fixed to frames of the needle bar case 15 (only the top fixing member 70 is shown in FIG. 3). In addition, a foot 71 that can slide in the vertical direction is provided at the lower end part of the needle bar 27. A retainer spring 72 is provided at an upper half of the needle bar 27, and a retainer spring 73 is provided at a lower half thereof.

An operation of forming stitches on a work cloth attached to an embroidery frame (not shown) supported by the embroidery frame moving mechanism 18 (refer to FIG. 1) is carried out as follows. First, the needle bar case 15 moves transversely, whereby one of the six needle bars 27 is selected. Next, a drive shaft 74 is rotatably driven by means of a sewing machine motor 54 (refer to FIG. 4), its rotational driving is transmitted to a coupling member 76 via a thread take-up drive cam 75, and then, a transmission member 77 to which the coupling member 76 is pivoted is guided to a guide rod 78 disposed horizontally with respect to the needle bar 27, and then, the guided transmission member 77 is vertically driven. Then, its vertical driving is transmitted to the needle bar 27 via a coupling pin (not shown), and then, the needle bar 27 is vertically driven together with the sewing needle 19. The needle bar 27 is thus vertically driven, whereby the stitches are formed on the work cloth.

In addition, as shown in FIG. 1 and FIG. 2, a pair of left and right thread spool bases 21 on which a plurality of thread spools 22 can be mounted are provided at the top rear side of the arm section 14. A thread guide mechanism 20 is provided so as to correspond to the thread spool base 21. The thread spool base 21 and the thread guide mechanism 20 are configured so that they can be switched to a storage position retracted in substantially parallel to the longitudinal direction of the multi-needle sewing machine 11, as shown in FIG. 1, and an active position that opens against the rear side of the multi-needle sewing machine 11 in planer view, as shown in FIG. 2. Three spool pins 26 into which the thread spools 22 are engaged is provided on each of the thread spool base 21, and the respective three thread spools 22 can be placed. In addition, six thread spools 22 that are equal to the number of sewing needles 19 can be placed on the pair of the left and right thread spool bases 21. Upper threads 23 extending from the thread spools 22 set on the thread spool bases 21 are supplied to the sewing needles 19 via the thread guide mechanism 20 for preventing thread entanglement of the upper threads 23; a needle thread tensioner 24 for adjusting tension of a thread; and a thread take-up 25 or the like for pulling up the upper threads while vertically reciprocating them.

At the operating section 16, there are provided: a liquid crystal display 30 for displaying thread information or embroidery patterns or the like; and a flexible disk drive 31 (hereinafter, abbreviated as an "FDD") for inserting a flexible disk (not shown). The liquid crystal display 30 displays: thread information of threads set at the needle bars 27; sewing data on a sewing target; needle bars 27 whose threads are to be replaced and thread information; function names for executing a variety of functions required for sewing work; and further, a variety of messages or the like. This liquid crystal display 30 is equipped with a touch sensor 32 (refer to FIG. 4). If one of the items displayed on the liquid crystal display 30 is selected by a finger or a dedicated pen, the touch sensor 32 senses the selected item, thus making it possible to enter a variety of commands.

Figure 4:
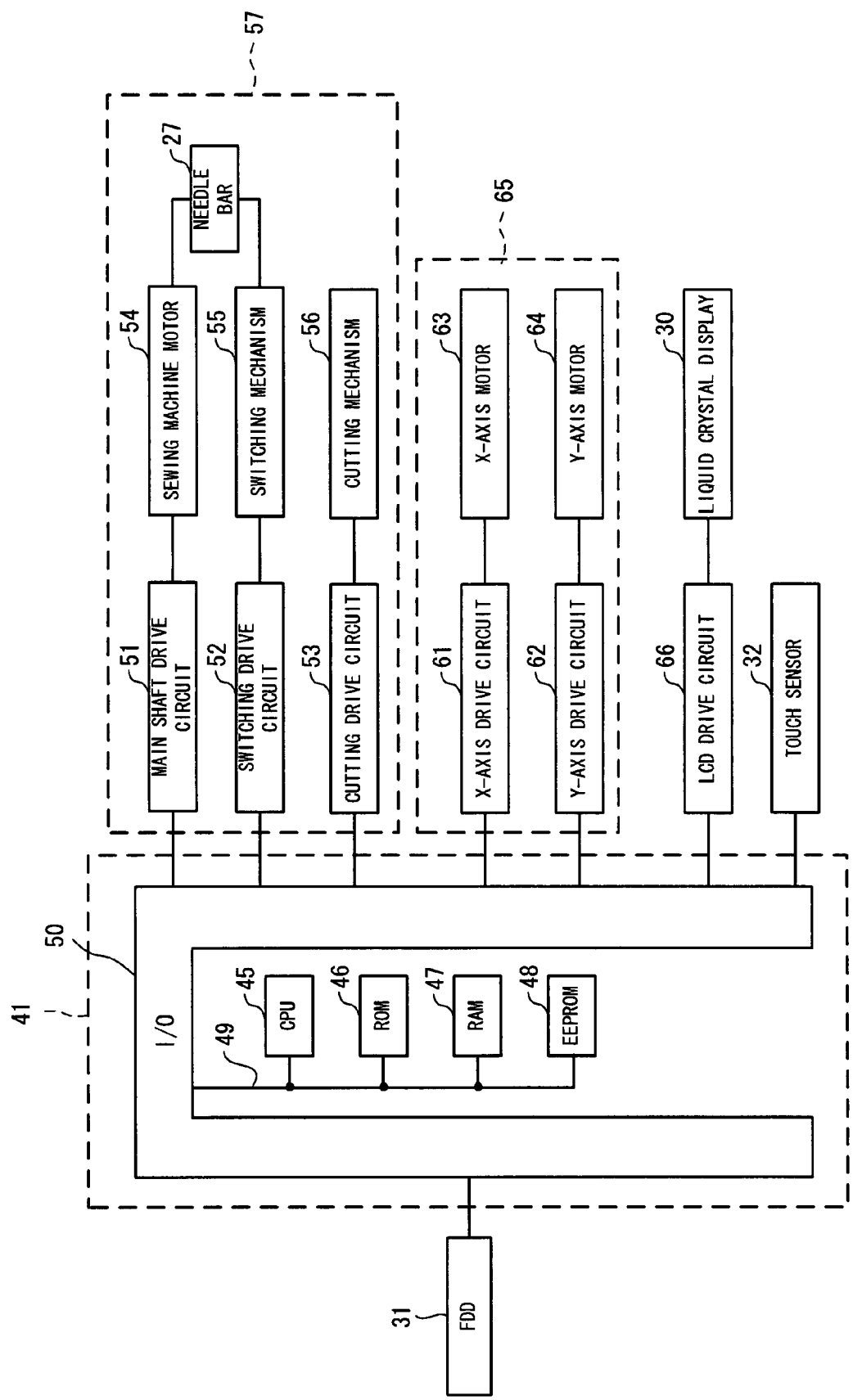
FIG. 4 is a block diagram depicting an electrical configuration of the multi-needle sewing machine.
Figure 5:
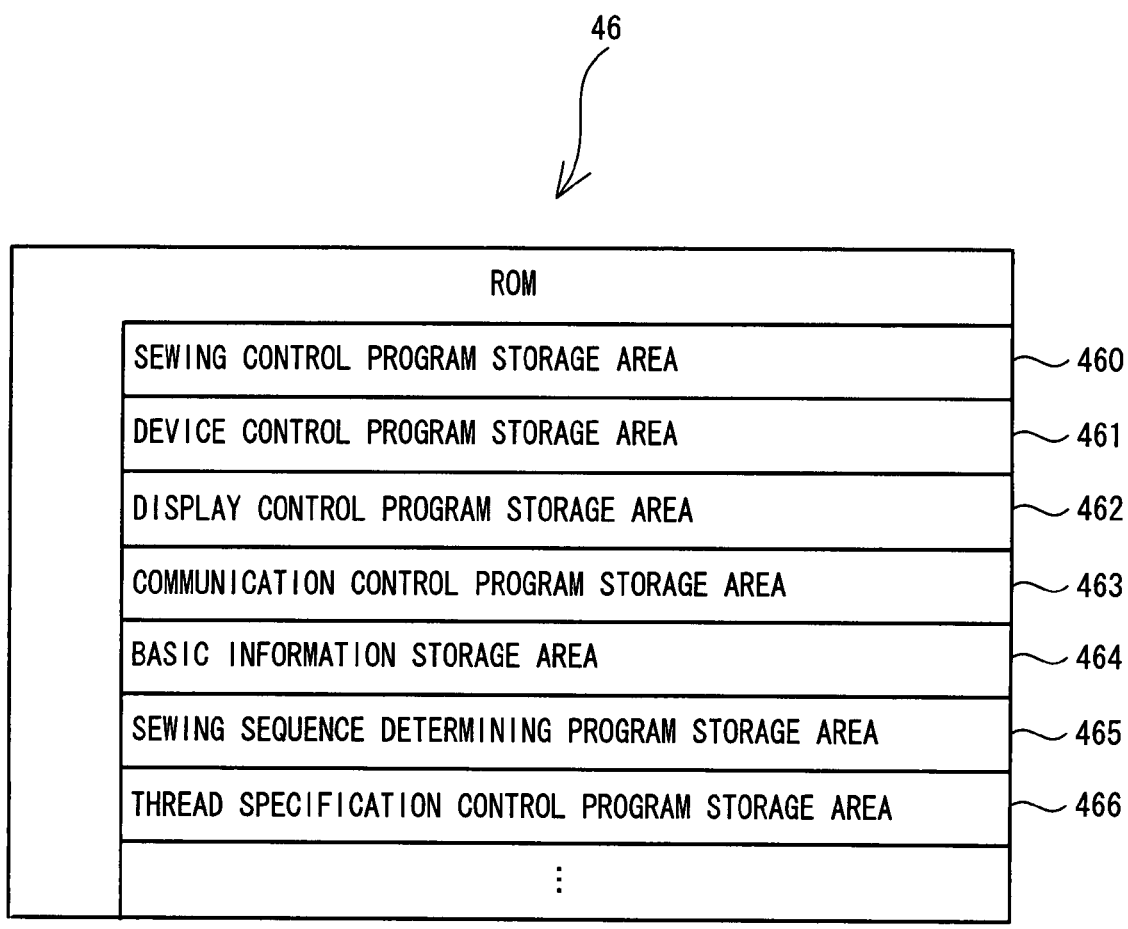
FIG. 5 is an illustrative view illustrating a storage area of a ROM.
Figure 6:
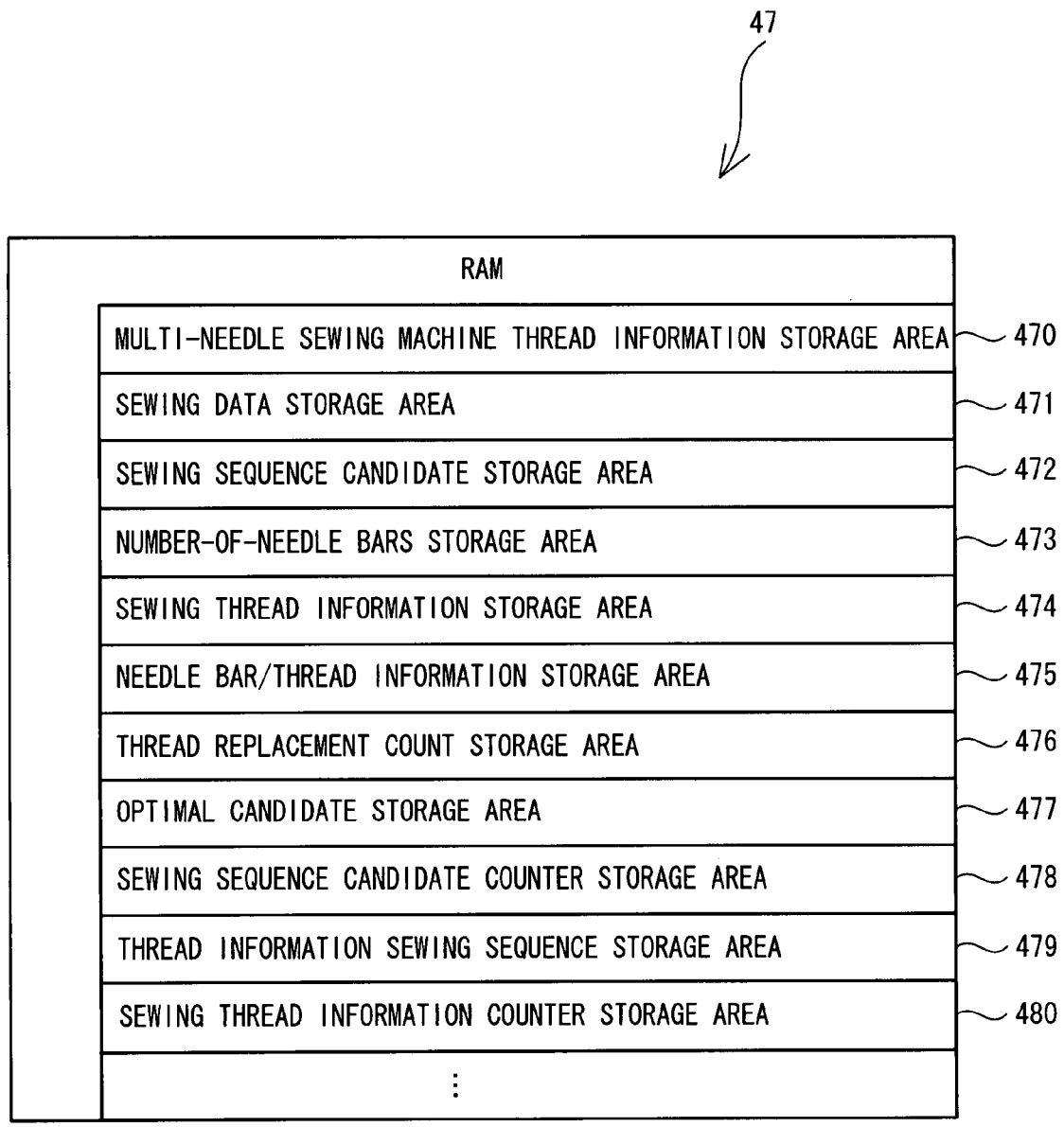
FIG. 6 is an illustrative view illustrating a storage area of a RAM.

Next, the electrical configuration of the multi-needle sewing machine 11 will be described with reference to FIG. 4 to FIG. 6. As shown in FIG. 4, the multi-needle sewing machine 11 includes, for example, a sewing needle drive section 57, a sewing target drive section 65, and a control unit 41.

The sewing needle drive section 57 is equipped with: a sewing machine motor 54 for reciprocally moving a needle bar 27 in a vertical direction; and a main shaft drive circuit 51 for driving the main shaft motor 54 in accordance with a control signal from the control unit 41. In addition, the sewing needle drive section 57 is also equipped with: a switch mechanism 55 for switching the needle bar 27; and a switching drive circuit 52 for driving the switch mechanism 55 in accordance with the control signal from the control unit 41. Further, the sewing needle drive section 57 is equipped with: a cutting mechanism 56 for cutting the threads set at the sewing needles 19 (refer to FIG. 1 and FIG. 2); and a cutting drive circuit 53 for driving the cutting mechanism 56 in accordance with the control signal from the control unit 41.

A sewing target drive section 65 is equipped with: an X-axis motor 63 for moving an embroidery frame (not shown) in a transverse direction; and an X-axis drive circuit 61 for driving the X-axis motor 63 in accordance with the control signal from the control unit 41. In addition, this sewing target drive section 65 is equipped with: a Y-axis motor 64 for driving an embroidery frame (not shown) in a longitudinal direction; and a Y-axis drive circuit 62 for driving the Y-axis motor 64 in accordance with the control signal from the control unit 41.

The control unit 41 includes, for example, a CPU 45, a ROM 46, a RAM 47, an EEPROM 48, and an input/output (I/O) interface 50, and they are interconnected by means of a bus 49. Besides the sewing needle drive section 57 and the sewing target drive section 65, an FDD 31, a touch sensor 32, and an LCD drive circuit 66 for controlling the liquid crystal display 30 are each connected to the input/output interface 50.

The CPU 45 is responsible for main control of the multi-needle sewing machine 11, and executes a variety of computations and processings in accordance with the sewing sequence determining program according to the present disclosure, stored in a sewing sequence determining program storage area 465 (refer to FIG. 5) of the ROM 46 that is a read-only memory. The sewing sequence determining program may be stored in an external storage device such as a flexible disk. In such a case, the program is read into the RAM 47, and then, is executed.

In the ROM 46, there is provided storage areas of storing programs for operating the multi-needle sewing machine 11 based on sewing data. A detailed description of the ROM 46 will be given with reference to FIG. 5. As shown in FIG. 5, in the ROM 46, there are provided, for example: a sewing control program storage area 460; a device control program storage area 461; a display control program storage area 462; a communication control program storage area 463; a basic information storage area 464; a sewing sequence determining program storage area 465; and a thread specification control program storage area 466. The sewing control program storage area 460 stores a program for driving and controlling devices required for sewing. The device control program storage area 461 stores a program for controlling devices subject to control except when sewing operations are carried out. The display control program storage area 462 stores a program for controlling the liquid crystal display 30. The communication control program storage area 463 stores a program for exchanging commands or data between a multi-needle sewing machine 11 and the sewing sequence determining device provided independently of the multi-needle sewing machine 11. The basic information storage area 464 stores, for example, model information indicating a model of the multi-needle sewing machine 11; size information on sewing areas; and the number of needle bars 27. The sewing sequence determining program storage area 465 stores the sewing sequence determining program according to the present disclosure. The thread specification control program storage area 466 stores a thread specification control program for an operator to associate: an all-thread information table that is a list of all items of thread information relating to plural types of threads used for sewing; and thread information on upper threads 23 (refer to FIG. 2) supplied from thread spools 22 and needle bars 27 with each other. The all-thread information table stored in the thread specification control program storage area 466 is composed of thread information relating to several thousands of types of threads. Thread information on each thread includes, for example, a thread information number, a manufacturer name, a thread color, thickness, and a material. The thread information number is a specific number that is set for each item of the thread information. By using the thread information number, thread information can be uniquely identified.

The RAM 47 is a storage device that is randomly readable and writable, and has storage areas of storing data for determining an optimal sewing sequence candidate. A detailed description of the RAM 47 will be given with reference to FIG. 6. The storage areas of the RAM 47 include, for example: a multi-needle sewing machine thread information storage area 470; a sewing data storage area 471; a sewing sequence candidate storage area 472; a number-of-needle bars storage area 473; a sewing thread information storage area 474; a needle bar/thread information storage area 475; a thread replacement count storage area 476; an optimal candidate storage area 477; a sewing sequence candidate counter storage area 478; a thread information sewing sequence storage area 479; and a sewing thread information counter storage area 480. The multi-needle sewing machine thread information storage area 470 stores thread information that is the information relating to threads set at the multi-needle sewing machine 11. The sewing data storage area 471 stores sewing data on a plurality of sewing targets. The sewing sequence candidate storage area 472 stores the sewing sequence candidates of the sewing targets stored in the sewing data storage area 471. The number-of-needle bars storage area 473 stores a number of needle bars N. The sewing thread information storage area 474 stores sewing thread information. The needle bar thread information storage area 475 stores needle bar thread information. The thread replacement count storage area 476 stores the thread replacement count. The optimal candidate storage area 477 stores an optimal sewing sequence candidate. The sewing sequence candidate counter storage area 478 stores a counter for sequentially reading out sewing sequence candidates. The thread information sewing sequence storage area 479 stores the sewing sequences of thread information to be used for sewing the sewing targets in accordance with the sewing sequence candidates. The sewing thread information counter storage area 480 stores a sewing thread information counter that is a counter for reading out items of thread information in accordance with the sewing sequences stored in the thread information sewing sequence storage area 479.

The multi-needle sewing machine 11 described above functions as a sewing sequence determining apparatus according to the present disclosure and determines the sequences of sewing a plurality of sewing targets so as to reduce the thread replacement count.

Next, with reference to the accompanying drawings, a description will be given with respect to operating procedures for Example 1, for determining the sewing sequences of sewing targets consisted of sewing targets A, B, and C (hereinafter, referred to as A, B, and C) by using the multi-needle sewing machine 11 equipped with the sewing sequence determining apparatus as configured above.

First, referring to FIG. 7, a description will be given with respect to sewing sequences and thread information among the sewing data for applying sewing to A, B, and C of Example 1. Thread information is composed of a thread information number, a manufacturer name, a color name, a thread color, thickness, and a material, etc. and they can be uniquely identified by the thread information number specific thereto. For the sake of clarification, the thread information is assumed to be composed of only information relating to thread colors in the following description.

Sewing sequences and thread information for the sewing targets are predetermined for each of the sewing targets. As shown in FIG. 7, A is a sewing target having 10 items of thread information, the target being sewn by threads whose colors are red, blue, white, black, brown, black, green, yellow, red, and gray in order from the earliest sewing. In A, the thread information of the sewing sequences 1st and 9th is set to be red and that of the sewing sequences 4th and 6th is set to be black. As is evident from this example, when comparing items of thread information possessed by one sewing target, information on the same thread color may be registered in the different sewing sequences. In addition, B is a sewing target having six items of thread information, the target being sewn by threads whose colors are yellowish green, orange, purple, gold, light blue, and pink in order from the earliest sewing. In addition, C is a sewing target having seven items of thread information, the target being sewn by threads whose colors are red, black, light blue, pink, blue, brown, and white in order from the earliest sewing.

Figure 9:
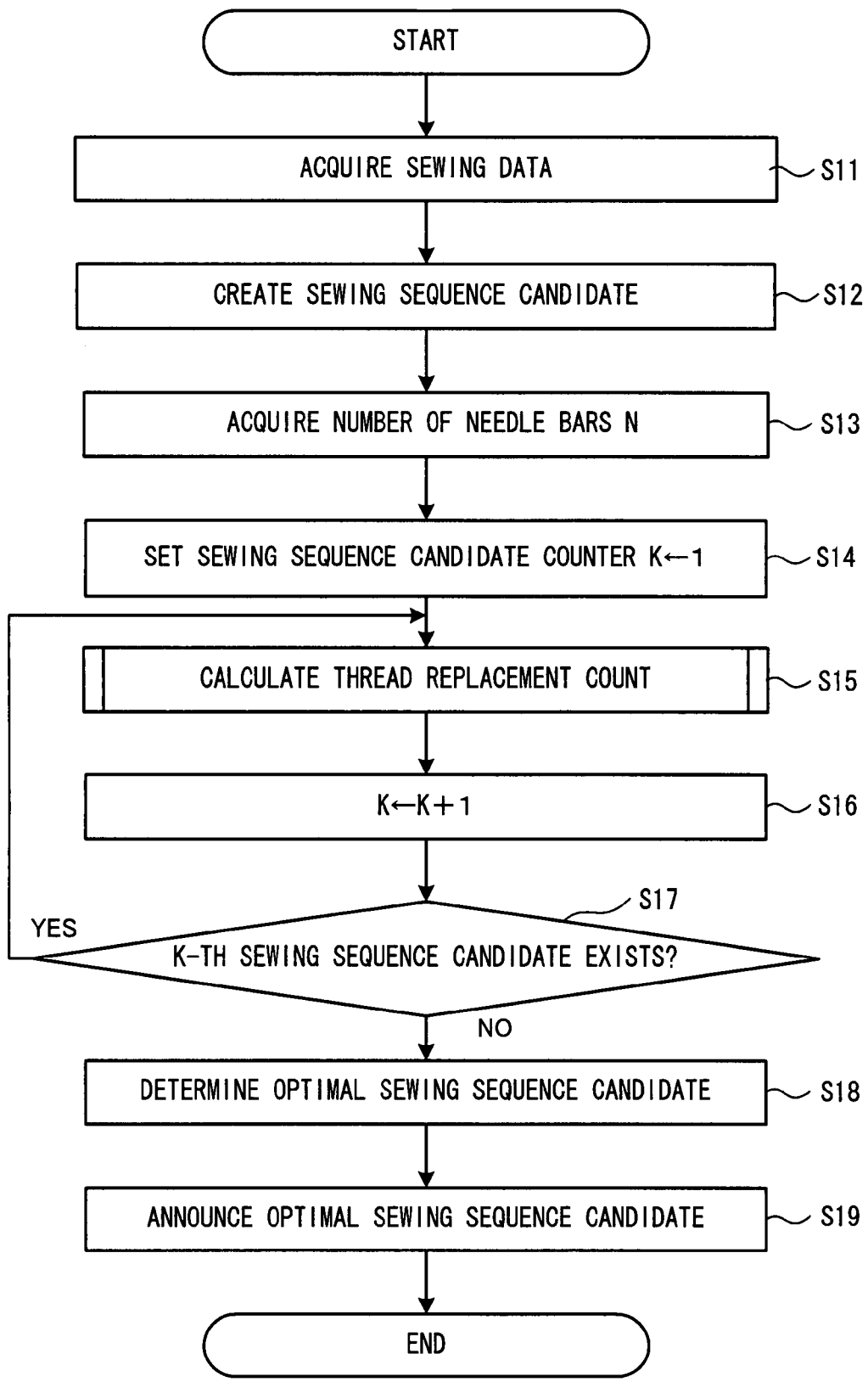
FIG. 9 is a main flowchart showing a flow of main processing of determining sewing sequences.
Figure 10:
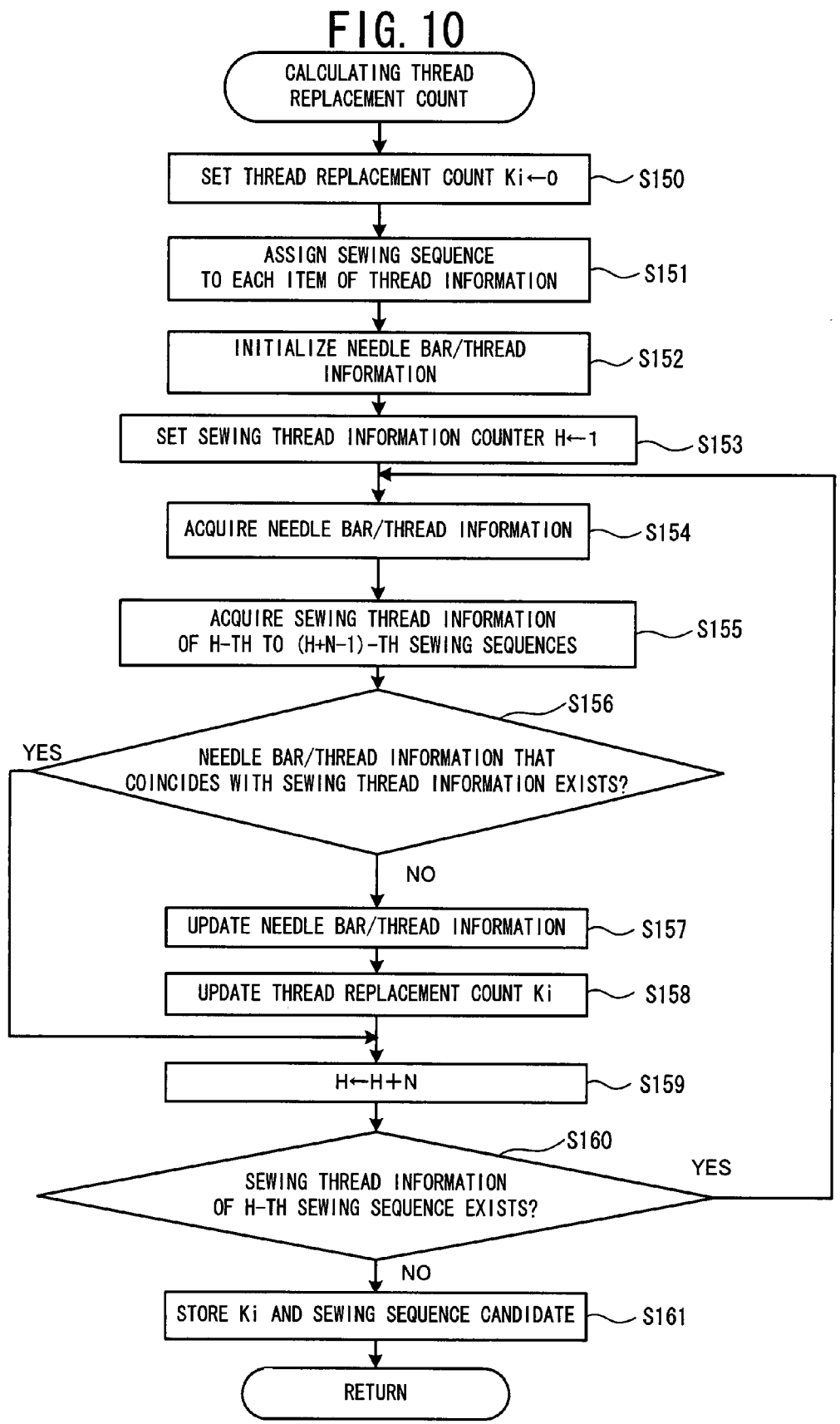
FIG. 10 is a flowchart showing sequences for carrying out a processing of calculating the thread replacement count in the main process.

Referring next to FIG. 8 to FIG. 13, a description will be given with respect to operating procedures for determining the sewing sequences of Example 1 composed of A, B, and C. A program that executes the main processing shown in FIG. 9 and the processing of calculating the thread replacement count shown in FIG. 10 is stored in the sewing sequence determining program storage area 465 of the ROM 46 (refer to FIG. 5), and the stored program is executed by the CPU 45 shown in FIG. 4.

In a first embodiment, an optimal sewing sequence candidate is determined, assuming that thread replacement is carried out every time sewing operations are performed on sewing data on the number of needle bars. When the main processing shown in FIG. 9 is started, the sewing data stored in a sewing data storage area 471 of the RAM 47 is acquired (S11). This sewing data may be directly input to a multi-needle sewing machine 11 by an operator using a liquid crystal display 30 so as to be stored in the sewing data storage area 471, or alternatively, the sewing data input to another device may be acquired from an FDD 31 (refer to FIG. 2) so as to be stored in the sewing data storage area 471.

Then, sewing sequence candidates are created with respect to sewing targets that configure the sewing data acquired in S11, and then, the created candidates are stored in a sewing sequence candidate storage area 472 (S12). The sewing sequences in the case of sewing A, B, and C of Example 1 are obtained as permutations as shown in FIG. 11, and are stored in the sewing sequence candidate storage area 472. In FIG. 11, the first column indicates the number of sewing sequence candidates, and the second to fourth columns respectively indicate the sewing targets to be sewn in the indicated sewing sequences 1 to 3. Then, a basic information storage area 464 of the ROM 46 is referred to, and number of the needle bars 27 (N=6) of the multi-needle sewing machine 11 is acquired to be stored in a number-of-needle bars storage area 473 (S13).

Then, in order to initialize a sewing sequence candidate counter K for sequentially reading out the sewing sequence candidates stored in the sewing sequence candidate storage area 472 in S12, the sewing sequence candidate counter K is set at 1, and then, the value 1 is stored in a sewing sequence candidate counter storage area 478 (S14). Then, the thread replacement count of a K-th sewing sequence candidate is calculated (S15). While a detailed description of the processings in S15 will be given later with reference to FIG. 10, the thread replacement count of the K-th sewing sequence candidate is calculated in accordance with the processing in S15; and the sewing sequence candidate and the number of the thread replacement are associated with each other; and then, the associated items of data are stored in a thread replacement count storage area 476.

Then, the sewing sequence candidate counter K is incremented by 1 in order to read out the next sewing sequence candidate, and the incremented value is stored in the sewing sequence candidate counter storage area 478 (S16). Then, the sewing sequence candidate storage area 472 and the sewing sequence candidate counter storage area 478 are referred to, and it is determined whether or not the K-th sewing sequence candidate exists (S17). In the case where it is determined that the K-th sewing sequence candidate exists (S17: Yes), the routine returns to S15 in which processing is repeated. In the case where it is determined that the K-th sewing sequence candidate does not exist (S17: No), the routine proceeds to S18. Then, in S18, a thread replacement count storage area 476 is referred to. Among the sewing sequence candidates, a sewing sequence candidate having the fewest thread replacement count is determined as an optimal sewing sequence candidate, and the determined candidate is stored in an optimal candidate storage area 477. Then, the CPU 45 announces the optimal sewing sequence candidate determined in S18 and stored in the optimal candidate storage area 477 to an operator by displaying it on a liquid crystal display 30 (S19), and main processing is terminated.

Next, with reference to the flowchart shown in FIG. 10, a description will be given with respect to how the processing of calculating the thread replacement count in S15 of FIG. 9 is carried out in the case where sewing operations are carried out in order of A, B, and C (hereinafter, abbreviated as "ABC") of sewing sequence candidate number 1 shown in FIG. 11. The processing shown in FIG. 10 (S15 in FIG. 9) is carried out for each sewing sequence candidate. This processing is also carried out by reading out thread information on each sewing target in accordance with a K-th sewing sequence candidate.

First, in S150 of FIG. 10, a thread replacement count Ki of a first sewing sequence candidate is set at 0 in order to initialize the thread replacement count Ki for sequentially storing the thread replacement count of the first sewing sequence candidate, and then, the value 0 is stored in a thread replacement count storage area 476.

Then, a sewing data storage area 471 and a sewing sequence candidate storage area 472 are referred to, the sewing sequences are assigned to items of thread information of sewing targets in accordance with the sewing sequences of a K-th sewing sequence candidate, and then, the assigned sequences are stored in a thread information sewing sequence storage area 479 (S151). In Example 1, in the case where sewing operations are carried out in order of ABC shown in FIG. 11, the sewing sequences of items of thread information on sewing targets are assigned as shown in the second column of FIG. 12, and the assigned sequences are stored in the thread information sewing sequence storage area 479. In FIG. 12, the first column indicates sewing targets A, B, and C; the second column indicates the sewing sequences of sewing data possessed by the sewing targets; and the third column indicates thread colors provided as thread information among the sewing data possessed by the sewing targets.

Then, needle bar/thread information is initialized (S152). This initialization of the needle bar/thread information is achieved by referring to a sewing machine/thread information storage area 470, acquiring thread information on threads set at each needle bar 27 of the multi-needle sewing machine 11 as needle bar/thread information, and then, storing the acquired information in a needle bar/thread information storage area 475. This needle bar/thread information may be input by an operator so as to be stored in the sewing machine/thread information storage area 470. Alternatively, the multi-needle sewing machine 11 is provided with a thread information sensor for sensing the thread information on threads allocated to each of the spool pins, and the information from the thread information sensor may be stored in the multi-needle sewing machine thread information storage area 470. Here, the threads with colors shown in FIG. 8 are assumed to be set at needle bars 27 of the multi-needle sewing machine 11 (refer to FIG. 4) and to be stored in the multi-needle sewing machine thread information storage area 470. In FIG. 8, the first column indicates the needle bar numbers corresponding to the needle bars 27 of the multi-needle sewing machine 11; and the second column indicates thread information of colors of threads set at the needle bars 27. Therefore, in S152, "Yellowish green, purple, light blue, red, gold, and green" is acquired as thread information on the threads set at the needle bars 27 of the multi-needle sewing machine 11, and the acquired data is stored in a needle bar/thread information storage area 475.

Then, in order to initialize a sewing thread information counter H for reading out sewing thread information, which will be described later, in accordance with the sewing sequences shown in the second column of FIG. 12, the sewing thread information counter H is set at 1, and then, the value 1 is stored in a sewing thread information counter storage area 480 (S153).

Then, in order to compare the sewing thread information and needle bar/thread information with each other, each read out by the number of needle bars N, first, the needle bar/thread information storage area 475 is referred to, and then, needle bar/thread information is acquired (S154). In Example 1, "Yellowish green, purple, light blue, red, gold, and green" is acquired as needle bar/thread information. Then, a thread information sewing sequence storage area 479 is referred to. Among items of thread information to which the sewing sequences are assigned in S151, thread information of the sewing sequences H-th to (H+N−1)-th is acquired as sewing thread information, and then, the acquired information is stored in a sewing thread information storage area 474 (S155). In Example 1, a thread information sewing sequence storage area 479 is referred to. Among the thread information (color) indicated in the third column of FIG. 12 "red, blue, white, black, brown, and black" of sewing sequences 1st to 6th (1+6−1) is acquired as sewing thread information, and the acquired information is stored in the sewing thread information storage area 474 (S155).

Then, the sewing thread information acquired in S155 and the needle bar/thread information acquired in S154 are compared with each other, and then, it is determined whether or not there exists the needle bar/thread information that coincides with the sewing thread information (S156). In the case where the determination result is affirmative (S156: Yes), it is determined that sewing operations can be carried out without thread replacement with respect to the sewing data included in the sewing thread information of the sewing sequences H-th to (H+N−1)-th. Therefore, the routine proceeds to S159 without carrying out the processings of S157 and S158 that presume that thread replacement is carried out before carrying out sewing operations by a thread of sewing sequence H.

On the other hand, in the case where the determination result is negative (S156: No), in the case where sewing operations are carried out with threads with the sewing thread information whose sewing sequences are H-th to (H+N−1)-th, it is indicated that it is necessary to carry out thread replacement at any point during the sewing operations with these threads. Therefore, in the subsequent S157 and S158, a processing is carried out, assuming that thread replacement is carried out before sewing with a thread of the sewing sequence H. It is to be noted that in S156, in the case where it is determined that even one of the N items of the sewing thread information fails to coincide with any item of the needle bar/thread information, it is determined that there is no needle bar/thread information that coincides with the sewing thread information (S156: No). In Example 1, in S156, it is determined for each of the sewing thread information items "red, blue, white, black, brown, and black" whether or not there exists any needle bar/thread information that coincides with it among those items "yellowish green, purple, light blue, red, gold, and green." Among the sewing thread information items, it is determined that there exists a needle bar/thread information item that coincides with the sewing information item "red," but there exists no needle bar/thread information items that coincide with the other sewing information items "blue, white, black, brown, and black." Thus, it is determined that there does not exist needle bar/thread information that coincides with sewing thread information (S156: No).

Then, in S157, the needle bar/thread information is updated so as to register needle bar/thread information that coincides with the sewing thread information (S157). The processings in S157 of Example 1 will be described with reference to FIG. 12. In FIG. 12, the fourth to ninth columns each indicate the thread information allocated to the needle bars 27 of the multi-needle sewing machine 11 (refer to FIG. 3). Numbers 1 to 6 assigned in a first line indicate the needle bar number of the multi-needle sewing machine 11, and "yellowish green, purple, light blue, red, gold, and green" assigned in the second line indicates the thread information on threads set at the needle bars of needle bar numbers (needle bar/thread information). Among the third to 25th lines, the lines having thread information in the fourth to ninth columns each indicate a timing of thread replacement to be carried out before carrying out sewing operations in accordance with the thread information indicated in a third column of the line. The thread information indicated in the line indicates thread information on threads set at the needle bars 27 after thread replacement has been carried out at the predetermined timing of thread replacement; and the thread information whose cells are shaded indicate threads which have been replaced at the predetermined timing of thread replacement. In addition, among the third to 25th lines, blanked lines each indicate that sewing operations can be carried out by threads with the thread information indicated in the third column of the line without a need to newly carry out thread replacement after the previous thread replacement.

In Example 1, in S157, the needle bar/thread information items are updated to "blue, white, black, red, brown, and green" so that thread information items that coincide with the sewing thread information items "red, blue, white, black, brown, and black" are all registered as needle bar/thread information (S157). The thread colors "blue, white, black, red, brown, and green" shown in a third line of FIG. 12 indicate needle bar/thread information after updated in accordance with the processing in S157. Among the needle bar/thread information shown in the third line, each item of the needle bar/thread information "blue, white, black and brown" in the shaded cells are updated in accordance with the processing in S157. At the time of sewing operations, before carrying out sewing operations with a thread having the sewing thread information "red" on a first sewing sequence shown in FIG. 12, i.e., before starting sewing, the threads set at the needle bar numbers 1, 2, 3, and 5 are replaced so that their colors respectively coincide with the needle bar/thread information "blue, white, black, red, brown, and green" after updated in S157, thereby making it possible to carry out sewing without interruption, based on the sewing data whose sewing sequences are 1st to 6th.

Then, the number of items of needle bar/thread information updated in S157 is added to the thread replacement count Ki of a K-th sewing sequence candidate, and then, the added number is stored in a thread replacement count storage area 476 (S158). Among the needle bar/thread information shown in a third line of FIG. 12, the needle bar/thread information updated in S157 includes four items "blue, white, black, and brown" whose cells are shaded. Thus, 4 is added to the thread replacement count Ki, and the added number is stored in the thread replacement count storage area 476 (S158).

Then, in order to read out thread information of the next sewing sequence, the number of needle bars N is added to the sewing thread information counter H, and the added number is stored in the sewing thread information counter storage area 480 (S159). In Example 1, 7 obtained by adding 6 to the sewing thread information counter H (H=1) is stored in the sewing thread information counter storage area 480 (S159). Then, a thread information sewing sequence storage area 479 and the sewing thread information counter storage area 480 are referred to, and then, it is determined whether or not there exists sewing thread information whose sewing sequence is H (S160). In the case where it is determined that sewing thread information whose sewing sequence is H exists (S160: Yes), the routine returns to S154, and the processing is repeated. In Example 1, as shown in FIG. 12, there exists sewing thread information "green" whose sewing sequence is 7. Thus, it is determined that the sewing thread information exists (S160: Yes), and then, the routine returns to S154 and the above-described processing is repeated.

In Example 1, similar processing is carried out, and, as shown in FIG. 12, thread information "green, yellow, red, gray, yellowish green, and orange" whose sewing sequences are from 7th (H=7) to 12th is acquired as sewing thread information (S155). Then, the needle bar/thread information "blue, white, black, red, brown, and green" is updated to "yellow, gray, yellowish green, red, orange, and green", as shown in the ninth line of FIG. 12 so as to coincide with the sewing thread information. At the time of sewing operations, immediately before carrying out sewing operations with a thread having the sewing thread information "green" of the seventh sewing sequence shown in FIG. 12, the threads set at the needle bar numbers 1, 2, 3, and 5 are replaced so that their thread colors coincide with the needle bar/thread information "yellow, gray, yellowish green, red, orange, and green" updated in S157, thereby making it possible to carry out sewing without interruption, based on the sewing data whose sewing sequences are from 7th to 12th. Then, 4 that is the number of items of needle bar/thread information updated in S157 is added to the thread replacement count Ki (Ki=4) (S158).

Similarly, thread information "purple, gold, light blue, pink, red, and black" whose sewing sequences are from 13 (H=13) to 18 is acquired as sewing thread information (S155), and then, the needle bar/thread information "yellow, gray, yellowish green, red, orange, and green" is updated to "purple, gold, light blue, red, pink, and black", as shown in a thirteenth line of FIG. 12 so as to coincide with the sewing thread information (S157). Then, 5 is added to the thread replacement count Ki (Ki=8) (S158). Then, thread information whose sewing sequences are from 19th (H=19) to 24th is read out; however, as shown in FIG. 12, the number of items of the stored thread information whose sewing sequences are from 19th is below the number of needle bars. In such a case, only the stored thread information, i.e., thread information "light blue, pink, blue, brown, and white" whose sewing sequences are 19th (H=19) to 23rd is acquired as the sewing thread information (S155). Then, the needle bar/thread information "purple, gold, light blue, red, pink, and black" is updated to "blue, brown, light blue, white, pink, and black", as shown in a nineteenth line of FIG. 12 so as to coincide with the sewing thread information (S157). Then, 3 is added to the thread replacement count Ki (Ki=13) (S158).

In S159 that follows the above step, the number of needle bars N is added to H, and 25 is obtained. However, 25th thread information does not exist as shown in FIG. 12, and thus, it is determined that there is no sewing thread information whose sewing sequence is H, which has been assigned in S151 (S160: No). In this case, it is determined that all items of the sewing thread information have been referred to. Thus, the thread replacement count Ki and a K-th sewing sequence candidate are then associated with each other, and then, the associated data is stored in the thread replacement count storage area 476 (S161). In Example 1, the thread replacement count Ki (Ki=16) and the sewing sequence candidates A, B, and C are stored in the thread replacement count storage area 476 (S161). Then, the routine returns to the main processing shown in FIG. 9, and then, proceeds to S16.

In Example 1, the thread replacement count of the sewing sequence candidates are calculated in S15 of FIG. 9 as shown in a fifth column of FIG. 13, and then, the calculated numbers are stored in the thread replacement count storage area 476 (S161). In the case where it is determined that the processing of calculating the thread replacement count for all of the sewing sequence candidates have completed (S17: No), in S18 of the main processing shown in FIG. 9, the thread replacement count storage area 476 is referred to, and then, a sewing sequence candidate having the fewest thread replacement count is determined as an optimal sewing sequence candidate. In Example 1, among the numbers of thread replacement of the sewing sequence candidates, shown in the fifth column of FIG. 13, the sewing sequence candidate 4 to be sewn in order of BCA is determined as an optimal sewing sequence candidate having the fewest number of thread replacement, i.e., 10, and then, the determined optimal sewing sequence candidate is stored in the optimal candidate storage area 477. Then, the optimal sewing sequence candidate determined in S18 and stored in the optimal candidate storage area 477 is displayed on the liquid crystal display 30, whereby the operator is announced of the resulting candidate (S19), and then, main processing is terminated.

According to the sewing sequence determining apparatus of the first embodiment described above, the thread replacement count assuming proper thread replacement can be calculated as compared with a case of determining which needle bar's thread is to be replaced for each item of the sewing thread information. In addition, a sewing target is sewn by a multi-needle sewing machine 11 in accordance with the optimal sewing sequence candidate determined by the sewing sequence determining apparatus, thereby making it possible to reduce a sewing time or inconvenience associated with thread replacement. In addition, the sewing sequence candidates are automatically created, thus, making it possible for an operator, to eliminate inconvenience of presetting sewing sequence candidates and storing them in a sewing sequence creating apparatus, and to prevent failure to set a sewing sequence candidate. Further, the optimal sewing sequence candidate is announced in S19 of FIG. 9 so that the operator can know in advance which of the sequences is effective to sew the sewing targets.

In the meantime, in the first embodiment described above, it has been determined whether or not there exists needle bar/thread information that coincides with sewing thread information read out by the number of needle bars in S156 of FIG. 10. In this method, there is an advantage that the thread replacement count assuming proper thread replacement can be calculated as compared with a case of determining which needle bar's thread to be replaced for each item of the sewing thread information. However, in the case where a thread having the same thread information is repeatedly used, the thread cannot be efficiently replaced merely by reading out the information by the number of needle bars. Therefore, processing may be carried out as in a second embodiment shown below. Hereinafter, with reference to the accompanying drawings, a description will be given with respect to operating procedures for creating the sewing sequence of Example 1 described previously by using a sewing sequence creating apparatus according to the second embodiment. The physical configuration and electrical configuration of the sewing sequence determining apparatus in the second embodiment are similar to those of the first embodiment, except for storage areas of a RAM 47. Therefore, the storage area of the RAM 47 different from that of the first embodiment will be described later. In addition, a description of aspects similar to those of the first embodiment is omitted here. Further, Example 1 is similar to the case of the first embodiment. Therefore, a description is omitted here.

Figure 14:
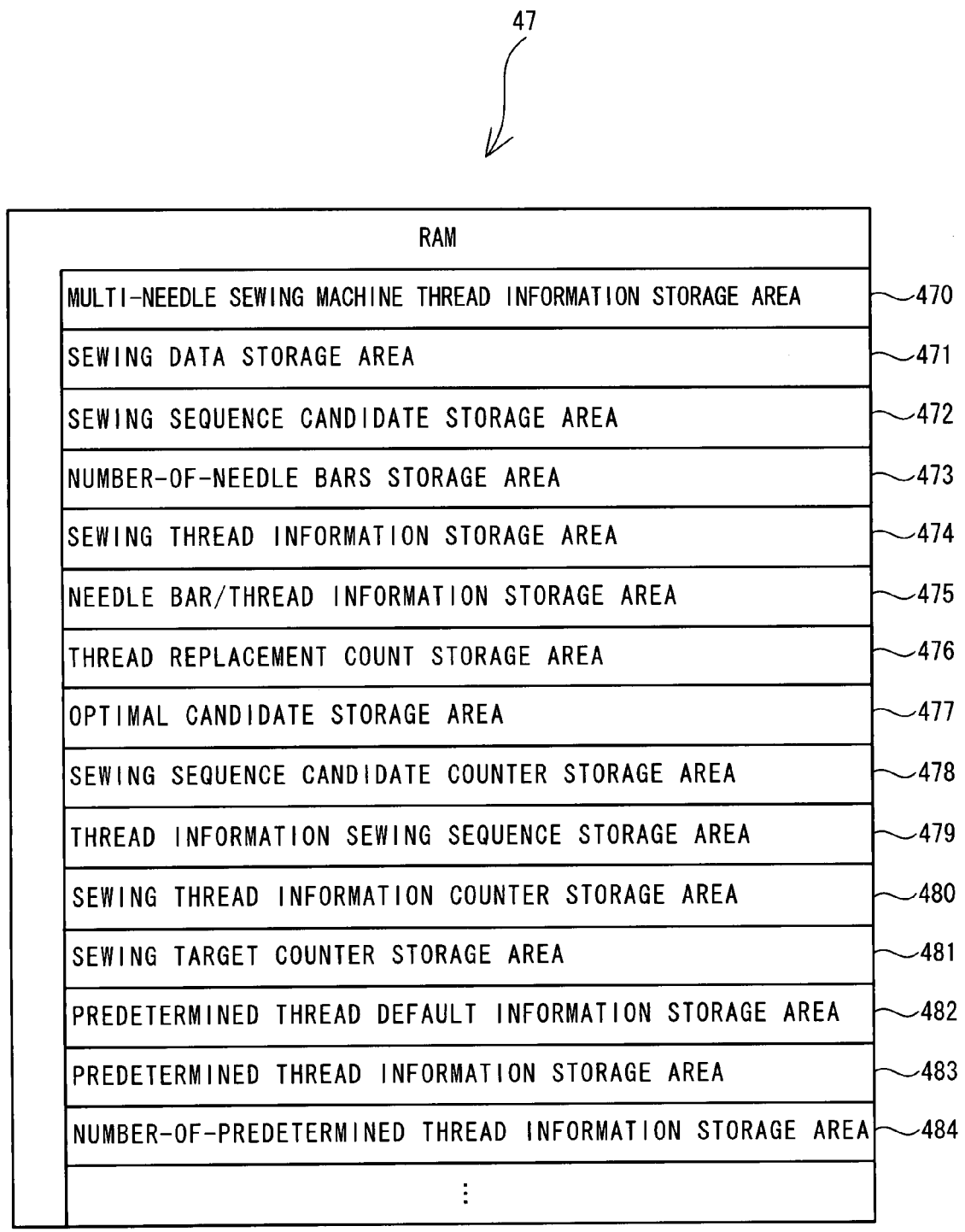
FIG. 14 is an illustrative view illustrating a storage area of a RAM in a second embodiment.

First, referring to FIG. 14, a description will be given with respect to the storage areas of the RAM 47 (refer to FIG. 4) different from that of the first embodiment. As shown in FIG. 14, in the storage areas of the RAM 47 in the second embodiment, besides the storage areas of the first embodiment shown in FIG. 6, there are provided, for example: a sewing target counter storage area 481; a predetermined thread default information storage area 482; a predetermined thread information storage area 483; and a number-of-predetermined thread information storage area 484. The sewing target counter storage area 481 stores a sewing target counter that is a counter for reading out sewing targets in accordance with sewing sequence candidates. The predetermined thread default information storage area 482 stores a default information of predetermined thread information that is thread information on threads to be placed at the needle bars. The predetermined thread information storage area 483 stores predetermined thread information. The number-of-predetermined thread information storage area 484 stores the number of items of predetermined thread information.

Figure 15:
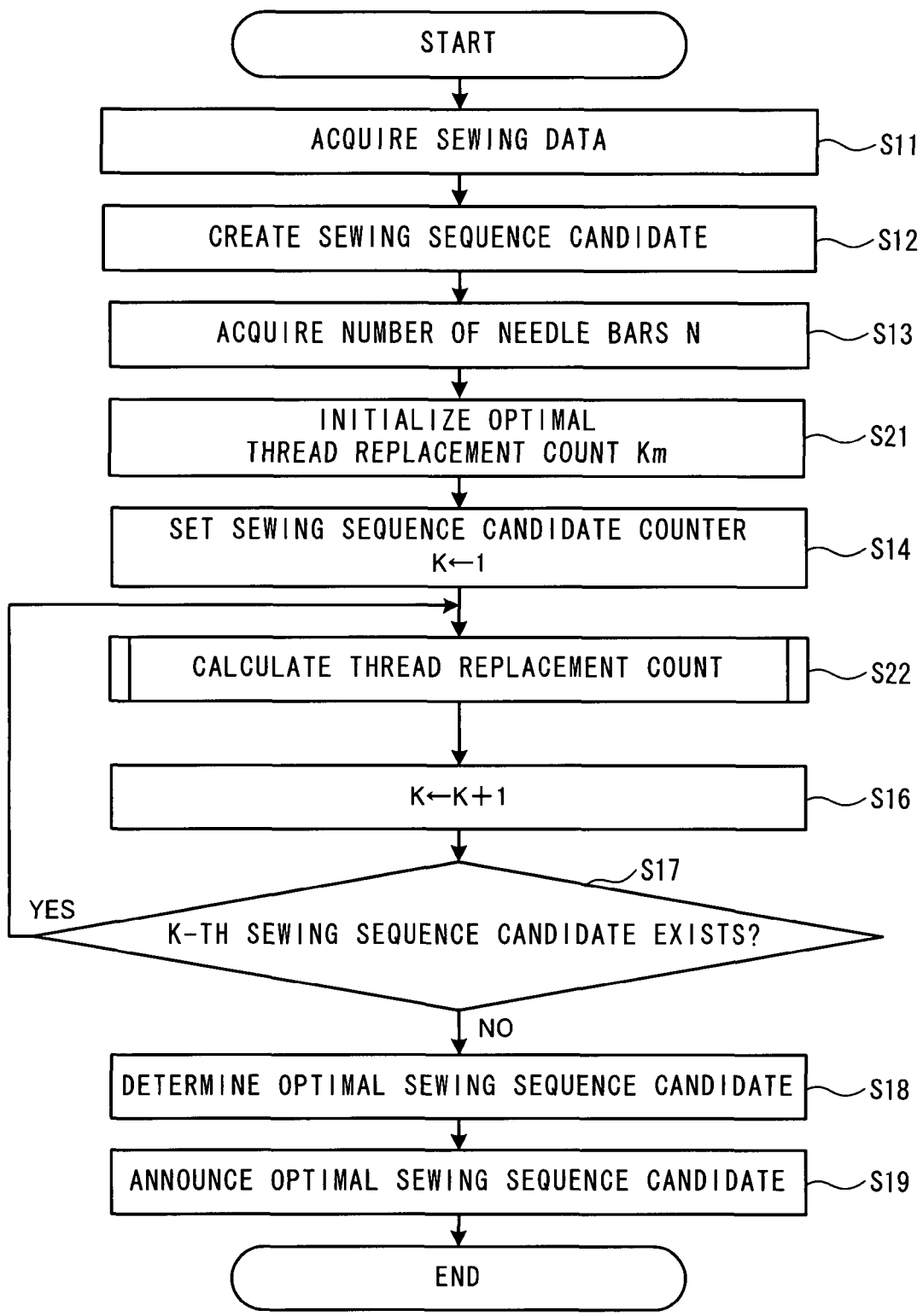
FIG. 15 is a main flowchart showing a flow of main processing of determining sewing sequences.

Next, a flow of processing of determining sewing sequences in the second embodiment will be described with reference to FIG. 15. FIG. 15 is a main flowchart showing a flow of main processing of determining sewing sequences in the second embodiment. As shown in FIG. 15, the flow of the processing of determining sewing sequences in the second embodiment is different from that of the first embodiment in the processings in S21 and S22. A description will be omitted with respect to processings common to those of the first embodiment. Hereinafter, the processings in S21 and S22 different from those of the first embodiment will be described with reference to FIG. 15 to FIG. 17. The sewing sequence and thread information on sewing targets and expressions relating to thread information and thread replacement timings set for needle bar numbers in FIG. 17 are as shown in FIG. 12 showing the first embodiment. In addition, the main processing shown in FIG. 15 and programs for executing calculation of the thread replacement count shown in FIG. 16 are stored in the sewing sequence determining program storage area 465 of the ROM 46 (refer to FIG. 5), and are executed by the CPU 45 shown in FIG. 4.

First, a description will be given with respect to S21 of FIG. 15. In the second embodiment, when a processing of obtaining the thread replacement count is carried out with respect to each of a plurality of sewing sequence candidates, in the case where the thread replacement count is equal to or greater than that of another sewing sequence candidate that has already been obtained, the processing of calculating the thread replacement count for the sewing sequence candidate is cancelled. Therefore, in the second embodiment, a sewing sequence candidate having the fewest thread replacement count and an optimal thread replacement count Km that is the thread replacement count of this sewing sequence candidate are stored in an optimal candidate, storage area 477. Then, in S21 shown in FIG. 15, the optimal thread replacement count Km is initialized, and then, the initialized count is stored in the optimal candidate storage area 477 (S21). The default value of the optimal thread replacement count Km may be set at a value that is sufficiently greater than an predetermined thread replacement count such as 100,000, for example or a NULL value may be set. Here, as a default value, 100,000 is set to be sufficiently greater than the thread replacement count.

Next, with reference to FIG. 8, FIG. 11, and FIG. 16, a description will be given with respect to how to carry out the processing of calculating the thread replacement count in S22 of FIG. 15. As is the case with the first embodiment, as an Example, a description will be given with respect to a case in which sewing operations are carried out in order of ABC with respect to the sewing sequence candidate number 1 shown in FIG. 11 by way of Example 1. The processing of S22 is carried out for each sewing sequence candidate. This operation is carried out by reading out the thread information on the sewing target in accordance with a K-th sewing sequence candidate.

Figure 16:
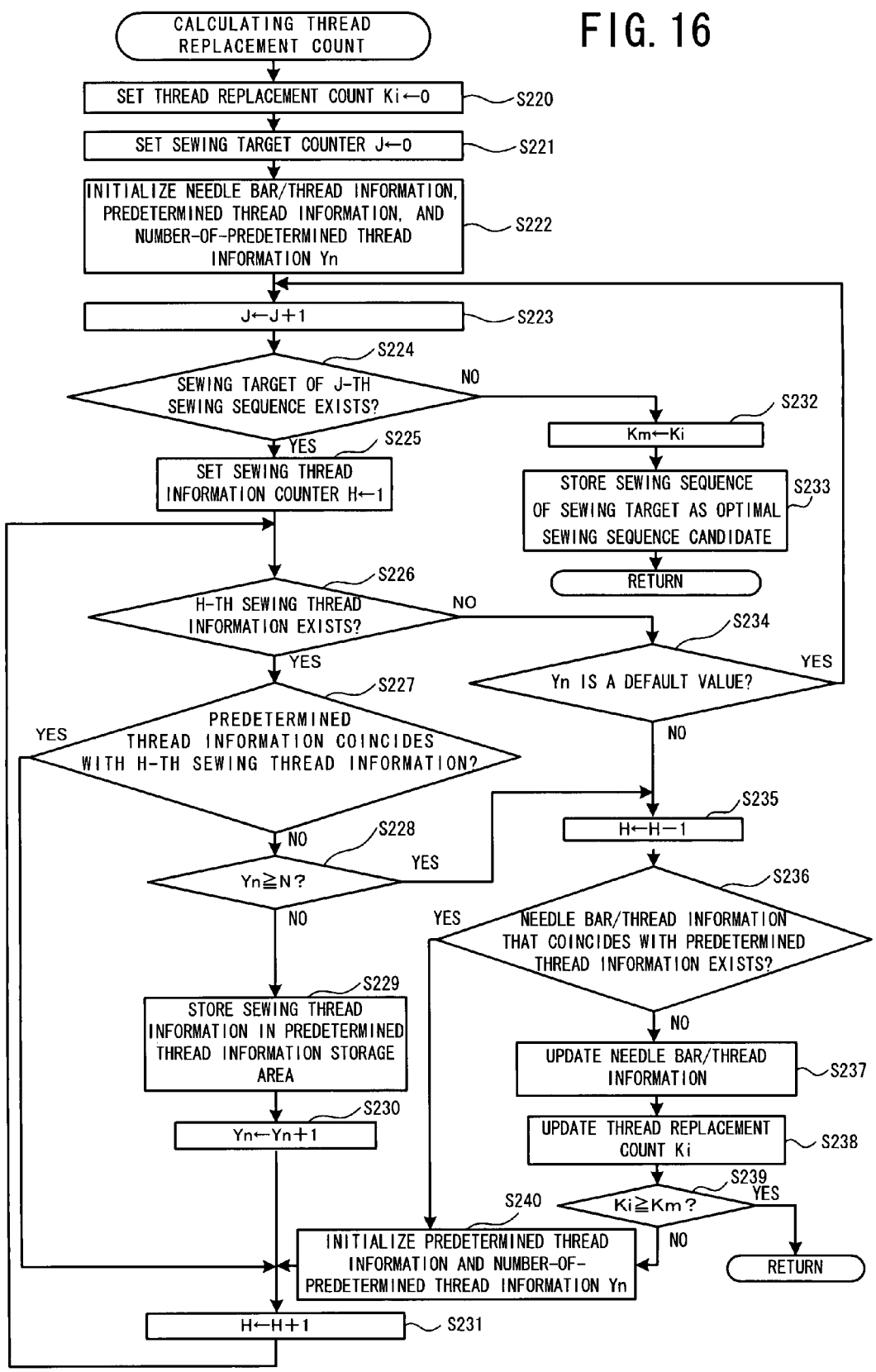
FIG. 16 is a flowchart showing sequences for calculating the thread replacement count executed in the main process.

First, in S220 of FIG. 16, in order to initialize a thread replacement count Ki for sequentially storing the thread replacement count of the K-th sewing sequence candidate, the thread replacement count Ki of the sewing sequence candidate is set at 0, and then, the value 0 is stored in the thread replacement count storage area 476. Then, in order to initialize a sewing target counter J for reading out a sewing target in accordance with the K-th sewing sequence candidate, the sewing target counter J is set at 0, and the value 0 is stored in the sewing target counter storage area 481 (S221).

Then, needle bar/thread information, predetermined thread information, and number-of-predetermined thread information Yn are initialized (S222). The initialization of the needle bar/thread information is similar to that in S152 of FIG. 10. In Example 1, in S222, "yellowish green, purple, light blue, red, gold, and green" is acquired as thread information on threads set at the needle bars 27 of a multi-needle sewing machine 11, and the acquired information is stored in a needle bar/thread information storage area 475.

In addition, the initialization of predetermined thread information is carried out by referring to the predetermined thread default information storage area 482 and causing the contents stored in the predetermined thread information storage area 483 to coincide with those stored in the predetermined thread default information storage area 482. As the default information of the predetermined thread information, besides a NULL value, for example, in the case where an attempt is made to place a specific thread at a needle bar without thread replacement, it is possible to arbitrarily set thread information, the number of which is less than the number of needle bars 27, for example, by setting the desired thread information as predetermined thread information. The thread information, the number of which is less than the number of needle bars 27, is set in order to allocate needle bars capable of carrying out thread replacement. In Example 1, assuming that a NULL value is set as a default information of the predetermined thread information, and then, the setting is stored in the predetermined thread default information storage area 482, the NULL value is stored in the predetermined thread information storage area 483 (S222). In addition, the initialization of a number-of-predetermined thread information Yn is carried out by referring to the predetermined thread default information storage area 482, and then, storing in a number-of-predetermined thread information storage area 484 the number-of-predetermined thread information Yn stored in the predetermined thread default information storage area 482. In Example 1, the number-of-predetermined thread information Yn is set at 0, and the setting is stored in the number-of-predetermined thread information storage area 484 (S222).

Then, a sewing target counter J is incremented by 1, and the resulting value is stored in the sewing target counter storage area 481 (S223). In Example 1, 1, which is a value obtained by incrementing the sewing target counter (J=0) by 1, is stored in the sewing target counter storage area 481 (S223). Then, the sewing sequence candidate storage area 472 is referred to, and then, it is determined whether or not there exists a sewing target whose sewing sequence is J (S224). In the case where the determination result is negative (S224: No), Ki is stored as an optimal thread replacement count Km in the optimal candidate storage area 477 (S232), and then, a sewing sequence candidate is stored as an optimal sewing sequence candidate in the optimal candidate storage area 477 (S233). Then, the routine returns to the main processing shown in FIG. 15, and then, proceeds to S16.

On the other hand, in Example 1, as shown in FIG. 17, there exists A that is a sewing target to be first sewn, and thus, it is determined that there exists a sewing target whose sewing sequence is 1st (S224: Yes), and then, the routine proceeds to S225. Then, in order to initialize the sewing thread information counter H for reading out thread information possessed by a sewing target whose sewing sequence is J-th as sewing thread information in accordance with the sewing sequence, the sewing thread information counter H is set at 1, and then, the value 1 is stored in the sewing thread information counter storage area 480 (S225). Then, a sewing data storage area 471 is referred to, and then, it is determined whether or not there exists H-th sewing thread information possessed by the J-th sewing target (S226). In the case where the determination result is negative (S226: No), it is determined that all of the thread information on the J-th sewing target has been read out, and thus, the routine proceeds to S234. The processing of S234 will be described later. On the other hand, in Example 1, as shown in FIG. 17, there exists sewing thread information item "red" whose sewing sequence is 1st, that is, the sewing target A whose sewing sequence is 1st. Thus, it is determined that there exists sewing thread information whose sewing sequence is 1st (S226: Yes), and then, the sewing thread information "red" is stored in the sewing thread information storage area 474.

Then, the sewing thread information storage area 474 and the predetermined thread information storage area 483 are referred to, and then, it is determined whether or not there exists predetermined thread information item that coincides with H-th sewing thread information (S227). In the case where the determination result is affirmative (S227: Yes), the routine proceeds to S231. On the other hand, in Example 1, in S222, a NULL value is set as predetermined thread information in the predetermined thread information storage area 483, and then, it is determined that there is no predetermined thread information that coincides with the first sewing thread information item "red" of the sewing target A (S227: No), and then, the routine proceeds to S228.

Then, in order to determine whether or not predetermined thread information can be registered in the predetermined thread information storage area 483, a number-of-predetermined thread information storage area 484 is referred to, and then, it is determined whether or not a number-of-predetermined thread information Yn is equal to or greater than a number of needle bars N (S228). In the case where the determination result is affirmative (S228: Yes), it is determined that the predetermined thread information cannot be registered in the predetermined thread information storage area 483 any more, and thus, the routine proceeds to S235. The processing of S235 will be described later. In Example 1, the number-of-predetermined thread information Yn is set at 0, and the number of the needle bars N is 6, and thus, it is determined that the number-of-predetermined thread information Yn is not equal to or greater than the number of needle bars N (S228: No). In this case, it is determined that the predetermined thread information can be registered in the predetermined thread information storage area 483, and thus, the sewing thread information "red" is then stored as predetermined thread information in the predetermined thread information storage area 483 (S229). Then, one more item of the predetermined thread information has been stored in the predetermined thread information storage area 483 in S229, and thus, the number-of-predetermined thread information Yn is incremented by 1, and then, the incremented number is stored in the number-of-predetermined thread information storage area 484 (S230). Then, in order to read out thread information whose sewing sequence is next as sewing thread information, the sewing thread information counter H is incremented by 1, and then, the incremented number is stored in the sewing thread information counter storage area 480 (S231). Then, the routine returns to S226 in which processing is repeated.

Similarly, in the processing of S229, items of sewing thread information of the sewing target A, "blue, white, black, brown, and green" whose sewing sequences are 2nd, 3rd, 4th, 5th, and 7th, respectively, are sequentially stored in the predetermined thread information storage area 483. With respect to the sixth sewing thread information "black", as the fourth sewing thread information "black" is already stored as the predetermined thread information in the predetermined thread information storage area 483, in S227, it is determined that there exists predetermined thread information that coincides with the sixth sewing thread information "black" (S227: Yes).

After the seventh (H=7) sewing thread information "green" has been stored in the predetermined thread information storage area 483 in the processing of S229 (S229), the number-of-predetermined thread information Yn is set at 6 in S230 that follows the above step. Then, in S231, H is set at 8, and then, in S226, it is determined that there exists the eighth sewing thread information "yellow" of the sewing target A (S226: Yes). Then, it is determined whether or not there exists predetermined thread information that coincides with the eighth sewing thread information "yellow" (S227). "Red, blue, white, black, brown, and green" are stored as the predetermined thread information in the predetermined thread information storage area 483, however, it is determined that there does not exist predetermined thread information that coincides with the eighth sewing thread information "yellow" (S227: No). And then, in S228 that follows the above step, it is determined that the number-of-predetermined thread information Yn is 6, and is equal to or larger than the value 6, which is the value of the number of the needle bars/threads N (S228: Yes), and thus, it is determined that the predetermined thread information cannot be registered in the predetermined thread information storage area 483 any more. While the predetermined thread information is thread information on threads to predetermined to be set at the needle bars, in the case where the number of items of the thread information newly stored as predetermined thread information has exceeded the number of the needle bars, it is determined to be necessary to carry out thread replacement, and then, in the processings in S235 to S240 that follow the above step, a processing of setting a thread replacement timing is carried out.

Following S228, it has been determined that the H-th sewing thread information is thread information on a thread that cannot be sewn unless thread replacement is newly carried out. Therefore, in order to re-execute processing of S226 or later, the sewing thread information counter H is decremented by 1, and the decremented number is stored in the sewing thread information counter storage area 480 (S235). Then, the predetermined thread information storage area 483 and the needle bar thread information storage area 475 are referred to, and then, it is determined whether or not there exists needle bar/thread information that coincides with the predetermined thread information (S236). In the case where there exists even one item of the predetermined thread information that does not coincide with any item of the needle bar/thread information, it is determined that there is no needle bar/thread information that coincides with the predetermined thread information. In the case where the determination result is affirmative (S236: Yes), it is determined that, after the previous thread replacement, even if thread replacement is not newly carried out, sewing operations can be carried out by the threads with the thread information registered as the predetermined thread information, and thus, the routine proceeds to S240 in which the predetermined thread information and the number-of-predetermined thread information Yn are initialized (S240). The processing of initializing the predetermined thread information and the number-of-predetermined thread information Yn is similar to that in the case of S222. Then, the routine proceeds to S231 in which the sewing thread information counter H is incremented by 1, and the incremented value is stored in the sewing thread information counter storage area 480 (S231). Then, the routine returns to S226 in which processing is repeated.

On the other hand, in Example 1, in S236, it is determined for each item of the predetermined thread information "red, blue, white, black, brown, and green" whether or not there exists any needle bar/thread information that coincides with it among those items "yellowish green, purple, light blue, red, gold, and green" Among the items of the predetermined thread information, it is determined that there exists items of the needle bar/thread information that coincides with the predetermined thread information items "red and green", but there is no needle bar/thread information items that coincides with the other predetermined thread information items "blue, white, black, and brown". Therefore, it is determined that there is no needle bar/thread information that coincides with the predetermined thread information (S236: No).

Then, needle bar/thread information is updated so that the needle bar/thread information that coincides with the predetermined thread information is stored in the needle bar/thread information storage area 475 (S237). Referring to FIG. 17, the processing in S237 of FIG. 16 will be described. As is the case with the first embodiment shown in FIG. 12, in FIG. 17, numbers 1 to 6 on the first line indicate needle bar numbers of the multi-needle sewing machine 11, and "yellowish green, purple, light blue, red, gold, and green" shown in the second line indicates thread information on threads set at the multi-needle sewing machine 11. In Example 1, the needle bar/thread information is updated to "blue, white, black, red, brown, and green" so that thread information that coincides with the predetermined thread information "red, blue, white, black, brown, and green" is registered as needle bar/thread information (S237). "Blue, white, black, red, brown, and green" shown in the third line indicates needle bar/thread information after updated in S237. Among the needle bar/thread information shown in the third line, the needle bar/thread information "blue, white, black, and brown" whose cells are shaded indicates the needle bar/thread information updated in S237. At the time of sewing operations, before carrying out sewing operations by means of a thread having the sewing thread information on the first sewing sequence, i.e., before starting sewing, thread replacement is carried out so that the colors of the threads coincide with the needle bar/thread information "blue, white, black, red, brown, and green" after updated in S237, thereby making it possible to carry out sewing with threads corresponding to the sewing sequences 1st to 7th without interruption.

Then, the number of items of the needle bar/thread information updated in S237 is added to a thread replacement count Ki of a K-th sewing sequence candidate, and the added value is stored in the thread replacement count storage area 476 (S238). Among the needle bar/thread information shown in the third line of FIG. 17, there are four items of the needle bar/thread information updated in S237, and thus, 4 is added to Ki, and then, the added value is stored in the thread replacement count storage area 476 (S238).

Then, an optimal candidate storage area 477 and the thread replacement count storage area 476 are referred to, and then, it is determined whether or not a value of Ki is equal to or greater than that of Km (S239). In the case where the determination result is affirmative (S239: Yes), it is determined that the thread replacement count of the sewing sequence candidate being processed is not minimal among the sewing sequence candidates whose thread replacement count have already been obtained. Therefore, the processing of calculating the thread replacement count of the sewing sequence candidate being processed is interrupted. Then, the routine returns to the main processing shown in FIG. 15, and then, proceeds to S16. On the other hand, in Example 1, the value of Ki is set at 4, which is not equal to or greater than 100,000 that is the value of Km set in S21 of FIG. 15, and thus, it is determined that the value of Ki is not equal to or greater than that of Km (S239: No), and then, the routine proceeds to S240.

In S240 that follows the above step, the predetermined thread information and the number-of-predetermined thread information Yn are initialized. The initializations of the predetermined thread information and the number-of-predetermined thread information Yn are similar to that in S222. Then, the sewing thread information counter H is incremented by 1, and then, the incremented value is stored in the sewing thread information counter storage area 480 (S231). Then, the routine returns to S226 to repeat the above-described processing.

Similarly, in the processing of S229, the items of the sewing thread information "yellow", "red", and "gray" of the sewing target A shown in FIG. 17, whose sewing sequences are 8th, 9th, and 10th, respectively, are sequentially stored in the predetermined thread information storage area 483. At this time, in S230, the number-of-predetermined thread information Yn is set at 3. In S231 that follows the above step, the sewing thread information counter H is set at 11. Then, the routine returns to S226 in which it is determined whether or not the eleventh sewing thread information exists (S226). As shown in FIG. 17, it is determined that there does not exist the sewing thread information whose sewing sequence is 11th (S226: No). In accordance with this processing, it is determined that all of the thread information on a J-th sewing target has been read out. Then, a processing of setting a thread replacement timing is carried out before carrying out a processing of reading out thread information on a next sewing target as sewing thread information.

Then, the predetermined thread default information storage area 482 and the number-of-predetermined thread information storage area 484 are referred to, and then, it is determined whether or not Yn is a default value (S234). In Example 1, the number-of-predetermined thread information Yn is set at 3, while the default value of the number-of-predetermined thread information Yn is set at 0. Thus, it is determined that Yn is not a default value (S234: No), and the routine proceeds to a processing of setting a thread replacement timing, which is a timing of carrying out thread replacement, in S235 to S237. The processings in S235 to S237 are as described previously. This processing is carried out in order to set the thread replacement timing at the time of replacing a sewing target. By doing so, it is possible to reduce the number of times of interrupting sewing by the multi-needle sewing machine 11 for the purpose of thread replacement. In Example 1, as shown in FIG. 17, the thread replacement timing is set before carrying out sewing operations by means of a thread corresponding to the eighth sewing sequence of the sewing target A, assuming the thread replacement timing between the sewing targets A and B as shown in the thirteenth line of FIG. 17. On the other hand, in the case where it is determined that Yn is the default value (S234: Yes), it is possible to determine that there is no need to carry out thread replacement newly before replacing a sewing target, and thus, the routine returns to S223 to repeat the processing.

As is the case with the sewing target A, with respect to the remaining sewing targets B and C, the thread information on the sewing targets is acquired as the sewing thread information in order of BC. Then, as shown in FIG. 17, the thread replacement timings are set, respectively, before carrying out sewing operations by means of a thread corresponding to the first sewing sequence of the sewing target A shown in the third line of the figure; before carrying out sewing operations by means of a thread corresponding to the eighth sewing sequence of the sewing target A shown in the tenth line of the figure; at the time of replacing the sewing target A with the sewing target B shown in the thirteenth line of the figure; at the time of replacing the sewing target B with the sewing target C shown in the nineteenth line of the figure; before carrying out sewing operations by means of a thread corresponding to the seventh sewing sequence of the sewing target C shown in the 25th line of the figure; and then, in S238, the thread replacement count is stored as 17 times in the thread replacement counts storage area 476. In S239 that follows the above step, the number of Ki in Example 1 is set at 17, which is not equal to or greater than 100,000 that is the value of Km, and thus, it is determined that the value of Ki is not equal to or greater than that of Km (S239: No), and then, the predetermined thread information and a number-of-predetermined thread information Yn are initialized (S240). Then, 8, which is a value obtained by incrementing the sewing thread counter H by 1 is stored in the sewing thread information counter storage area 480 (S231).

Then, a sewing data storage area 471 is referred to, and then, it is determined whether or not there exists sewing thread information whose sewing sequence is 8th for the sewing target C which is the third in the sewing sequence candidate (S226). As shown in FIG. 17, the sewing target C has no thread information having the eighth sewing sequence, and thus, it is determined that there is no sewing thread information having the eighth sewing sequence (S226: No). Then, the number-of-predetermined thread information storage area 484 is referred to, and then, it is determined whether or not the number-of-predetermined thread information Yn is the default value (S234). In S240, the number-of-predetermined thread information Yn is initialized, and thus, it is determined that the number-of-predetermined thread information Yn is the default value (S234: Yes). Then, the sewing target counter J (J=3) is incremented by 1 (S223), and then, it is determined whether or not there exists a sewing target whose sewing sequence is 4th (S224). As shown in FIG. 17, it is determined that there is no sewing target whose sewing sequence is 4th (S224: No), and then, the routine proceeds to S232.

In S232 that follows the above step, the thread replacement count storage area 476 is referred to; the thread replacement count Ki is set as the optimal thread replacement count Km; and then it is stored in the optimal candidate storage area 477 (S232). Then, the sewing sequence candidate is stored as the optimal sewing sequence candidate in the optimal candidate storage area 477 (S233). Then, the routine returns to the main processing shown in FIG. 15, and then, proceeds to S16.

In Example 1, the numbers of thread replacement of the sewing sequence candidates shown in FIG. 11 are 17, 15, 15, 11, 15, and 17 times in order from the smallest sewing sequence candidate number. Therefore, after the processing of S22 has been carried out with respect to all of the sewing sequence candidates, the sewing sequence candidate BCA with the fewest thread replacement count is stored in the optimal candidate storage area 477. Then, in S18 of the main processing shown in FIG. 15, the optimal candidate storage area 477 is referred to, and then, it is determined that the sewing sequence BCA having the fewest thread replacement count, which is 11 times, stored in the optimal candidate storage area 477 is the optimal sewing sequence candidate.

Then, the optimal sewing sequence candidate BCA determined in S18 and stored in the optimal candidate storage area 477 is displayed on the liquid crystal display 30, whereby the displayed candidate is announced to the operator (S19), and then, the main processing is terminated.

According to the sewing sequence determining apparatus of the second embodiment described above, it is assumed that sewing operations are carried out with respect to sewing data of which sewing operations can be carried out without thread replacement, and then, threads are replaced as a whole immediately before carrying out sewing operations based on sewing data requiring thread replacement. In addition, an optimal sewing sequence candidate that has the fewest thread replacement count is determined so as to minimize occasions of interrupting sewing by a multi-needle sewing machine 11 in order to replace threads. Therefore, the thread replacement count assuming more proper thread replacement can be calculated so as to reduce occasions of interrupting sewing by the multi-needle sewing machine 11 for the purpose of thread replacement.

In addition, in the case where the thread replacement count of a sewing sequence candidate is found to be equal to or greater than that of another sewing sequence candidate in the middle of calculating the thread replacement count, the processing of calculating the thread replacement count of the sewing sequence candidate is canceled so that the optimal sewing sequence candidate can be determined more efficiently. In addition, a sewing sequence pattern can be automatically obtained, thus making it possible to prevent failure to set sewing sequence candidates.

Figure 18:
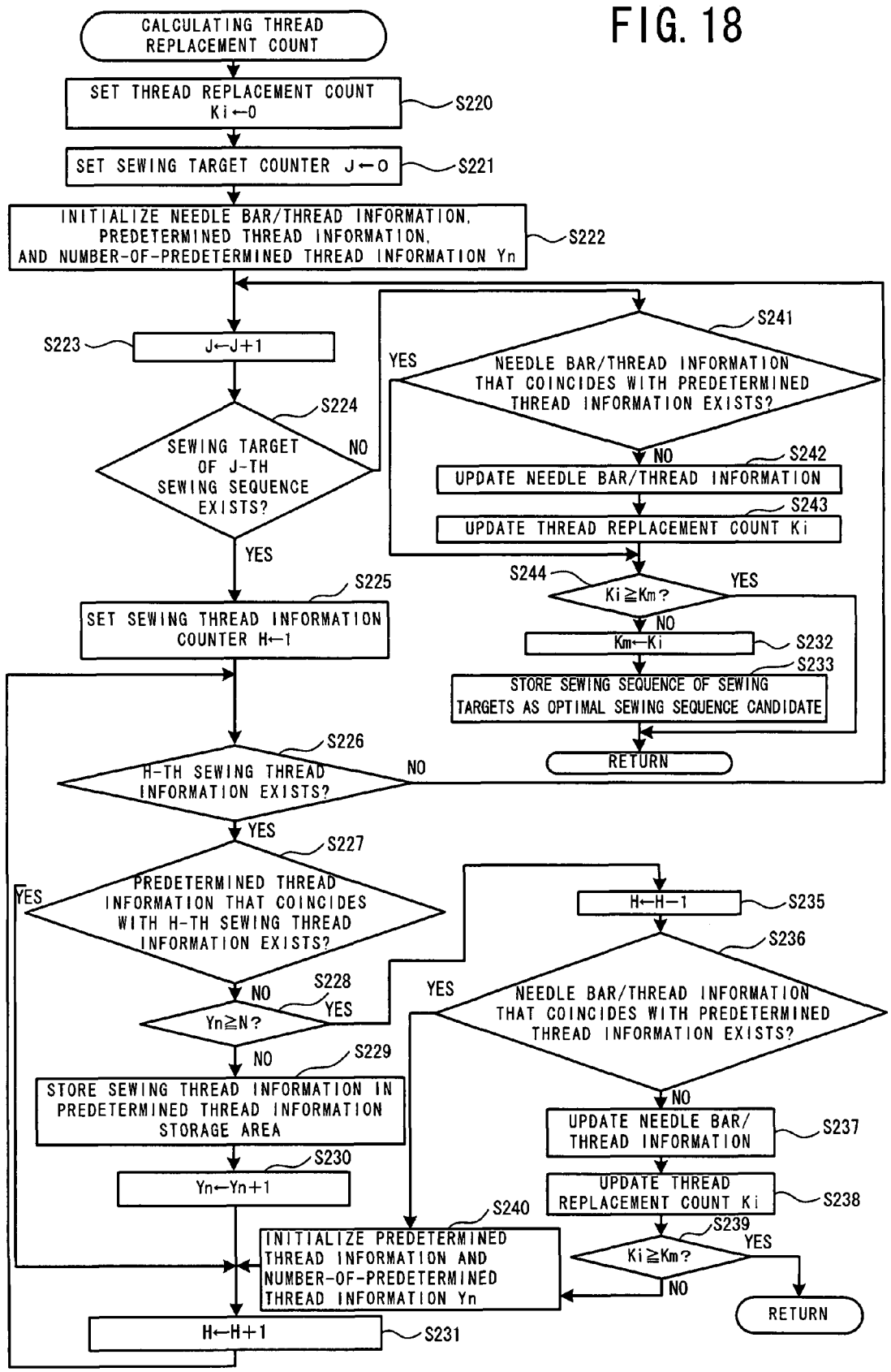
FIG. 18 is a flowchart of a processing of calculating the thread replacement count according to a modified example.

In the meantime, in the second embodiment described above, in S234 shown in FIG. 16, a processing has been carried out assuming that a timing of forcible thread replacement is set to carry out thread replacement when a sewing target is replaced. However, in the case where there is no need for providing the timing of such forcible thread replacement, the processing of providing the timing of the forcible thread replacement can be eliminated as a processing carried out in S22 of FIG. 15. Referring to FIG. 15, FIG. 18, and FIG. 19, a description will be given with respect to a modified example of the second embodiment having eliminated the processing of providing the timing of the forcible thread replacement. The sewing sequences and thread information on sewing targets in FIG. 19, and expressions relating to thread information set for needle bar numbers and thread replacement timings are as shown in FIG. 12 showing the first embodiment.

In the modified example, in S22 of FIG. 15, a processing of calculating a thread replacement count shown in the flowchart of FIG. 18 is carried out. As shown in FIG. 18, in the processing of calculating the thread replacement count in the modified example, in the case where it has been determined that there is no H-th sewing thread information (S226: No) in S226, S223 and S224 are carried out as processings that follow S226. In addition, in the case where it has been determined that there is no sewing target whose sewing sequence is J-th in S224 (S244: No), the processings in S241 to S244 similar to those of S236 to S239 are carried out between S224 and S232.

As described above, in the modified example in which the forcible thread replacement timing is not set when the sewing targets set at the multi-needle sewing machine 11 are replaced, the thread replacement timing in the case of carrying out sewing operations in order of ABC of Example 1 is as shown in FIG. 19. As shown in FIG. 19, in the modified example of the second embodiment, when the sewing targets are replaced, the thread replacement timing is not set. The thread replacement timing is set before carrying out sewing operations by means of a thread corresponding to the first sewing sequence of the sewing target A shown in the third line of the figure; before carrying out sewing operations by means of a thread of the eighth sewing sequence of the sewing target A shown in the tenth line of the figure; before carrying out sewing operations by means of a thread of the fourth sewing sequence of the sewing target B shown in the sixteenth line of the figure; and before carrying out sewing operations by means of a thread corresponding to the sixth sewing sequence of the sewing target C shown in the 24$^{th}$ line of the figure.

In accordance with this modified example, if the thread replacement count of the sewing sequence candidates shown in FIG. 11 are obtained, the numbers are 16, 17, 15, 10, 14, and 17 times in order from the smallest sewing sequence candidate number. Therefore, with respect to all of the sewing sequence candidates, after the processing of calculating the thread replacement count has been carried out in S22 of FIG. 15, the sewing sequence candidate BCA with the fewest thread replacement count, i.e., 10 times, is stored in the optimal candidate storage area 477. Then, in S18 of the main processing shown in FIG. 15, the optimal candidate storage area 477 is referred to, the sewing sequence BCA having the fewest thread replacement count, i.e., 10 times, stored in the optimal candidate storage area 477 is determined as an optimal sewing sequence candidate. Then, the optimal sewing sequence candidate determined in S18 and stored in the optimal candidate storage area 477 is displayed on the liquid crystal display 30, whereby the displayed optimal candidate is announced to the operator (S19), and then, the main processing is terminated.

By means of the processings described above, an optimal sewing sequence candidate can be determined in accordance with the modified example of the second embodiment. According to the modified example, it is assumed that sewing operations are carried out as long as it can be carried out without thread replacement, and threads are replaced as a whole immediately before carrying out sewing operations based on the sewing data requiring thread replacement. Thus, an optimal sewing sequence candidate can be obtained based on the thread replacement count assuming proper thread replacement.

In the meantime, in the first and second embodiments described above, permutations of a plurality of sewing targets have been created in a processing of creating sewing sequence candidates shown in S12 of FIG. 9 or in S12 of FIG. 15. In this method, there is an advantage that combinations of all of the sewing sequences can be fully created. However, in the case where an attempt is made to sew a specific sewing target in a specific sequence, the sewing sequence candidate of which a sewing target is sewn in a desired sewing sequence is not always determined as an optimal sewing sequence candidate. Therefore, processing may be carried out as in a third embodiment shown below.

Next, referring to FIG. 20 to FIG. 25, a description will be given with respect to operating procedures for creating sewing sequences of Example 2 made of A, B, C, and D by using a sewing sequence creating apparatus of the third embodiment. The physical configuration and electrical configuration of a sewing sequence determining apparatus in the third embodiment are similar to those of the second embodiment except for storage areas of the RAM 47. Therefore, the storage areas of the RAM 47 different from those of the second embodiment will be described later. In addition, a description of aspects similar to those of the second embodiment will be omitted here.

First, referring to FIG. 20, a description will be given with respect to storage areas of the RAM 47 different from those of the second embodiment. As shown in FIG. 20, in the storage areas of the RAM 47 in the third embodiment, besides the storage areas of the RAM 47 of the second embodiment shown in FIG. 14, there are provided: a group storage area 491; a sequence-determined sewing target storage area 492; a sequence-determined group storage area 493; an intra-group sequence-determined sewing target storage area 494; an intra-group sewing sequence storage area 495; a preliminary candidate creation target storage area 496; a preliminary candidate storage area 497; and a sewing sequence candidate creation target storage area 498. The group storage area 491 stores sewing targets constituting groups on a group-by-group basis. The sequence-determined sewing target storage area 492 stores a sewing target whose sewing sequence is determined and the sewing sequence of the sewing target in association with each other. The sequence-determined group storage area 493 stores a group whose sewing sequence is determined and the sewing sequence of the group in association with each other. The intra-group sequence-determined sewing target storage area 494 stores an intra-group sequence-determined sewing target, which is one of the sewing targets constituting a group and whose sewing sequence within the group is determined, and an intra-group sewing sequence, which is a sewing sequence within the group, of the intra-group sequence sewing target. The intra-group sewing sequence storage area 495 stores an intra-group sewing sequence. The preliminary candidate creation target storage area 496 handles a group as one sewing target, and stores the group as a preliminary candidate creation target for creating sewing sequences. The preliminary candidate storage area 497 stores a preliminary candidate. The sewing sequence candidate creation target storage area 498 stores a sewing target serving as a target for creating a sewing sequence candidate.

Next, referring to FIG. 23, a description will be given with respect to conditions for sewing sequences of Example 2. As Example 2 for explaining the third embodiment, as is patterns 1 to 10 shown in FIG. 23, conditions for sewing sequences of A, B, C, and D have been set. In FIG. 23, the first column indicates numbers of patterns; the second column indicates conditions for sewing sequences; the third and fourth columns indicate whether or not there exists a group among the conditions for sewing sequences; and the fifth and sixth columns indicate whether or not there exists a sequence-determined sewing target among the conditions for sewing sequences. In addition, in FIG. 23, the seventh and eighth columns indicate whether or not there exists a sequence-determined group among the conditions for sewing sequences. Further, the ninth and tenth columns indicate whether or not there exists an intra-group sequence-determined sewing target. Furthermore, the 11th column indicates the number of sewing sequence candidates created in accordance with the third embodiment, and the 12th column indicates sewing sequence candidates created in accordance with the third embodiment. In the case where the sewing sequence candidate is described as ABCD in the 12th column, it indicates that it is a sewing sequence candidate composed of sewing targets A, B, C, and D which are to be sewn in order of A, B, C, and D.

As shown in FIG. 23, pattern 1 does not provide a condition for sewing sequences, and pattern 2 provides a condition in which the sewing target C is sewn first. In addition, pattern 3 provides a condition in which the sewing targets A and B configure a group, and pattern 4 sets a condition in which sewing operations are carried out in order of the sewing targets A and B in addition to the condition of pattern 3. Further, pattern 5 provides a condition in which a group consisting of the sewing targets A and B is sewn at a first sequence in addition to the condition of pattern 3. Pattern 6 sets a condition in which sewing operations are carried out in order of the sewing targets A and B in addition to the condition of pattern 5, and pattern 7 provides a condition in which the sewing targets A and B configures a group in addition to the condition of pattern 2. Pattern 8 sets a condition in which sewing operations are carried out in order of the sewing targets A and B in addition to the condition of pattern 7. Pattern 9 provides a condition in which a group consisting of the sewing targets A and B is sewn at a second sequence in addition to the condition of pattern 7. In addition, pattern 10 sets a condition in which sewing operations are carried out in order of the sewing targets A and B in addition to the condition of pattern 9.

Figure 21:
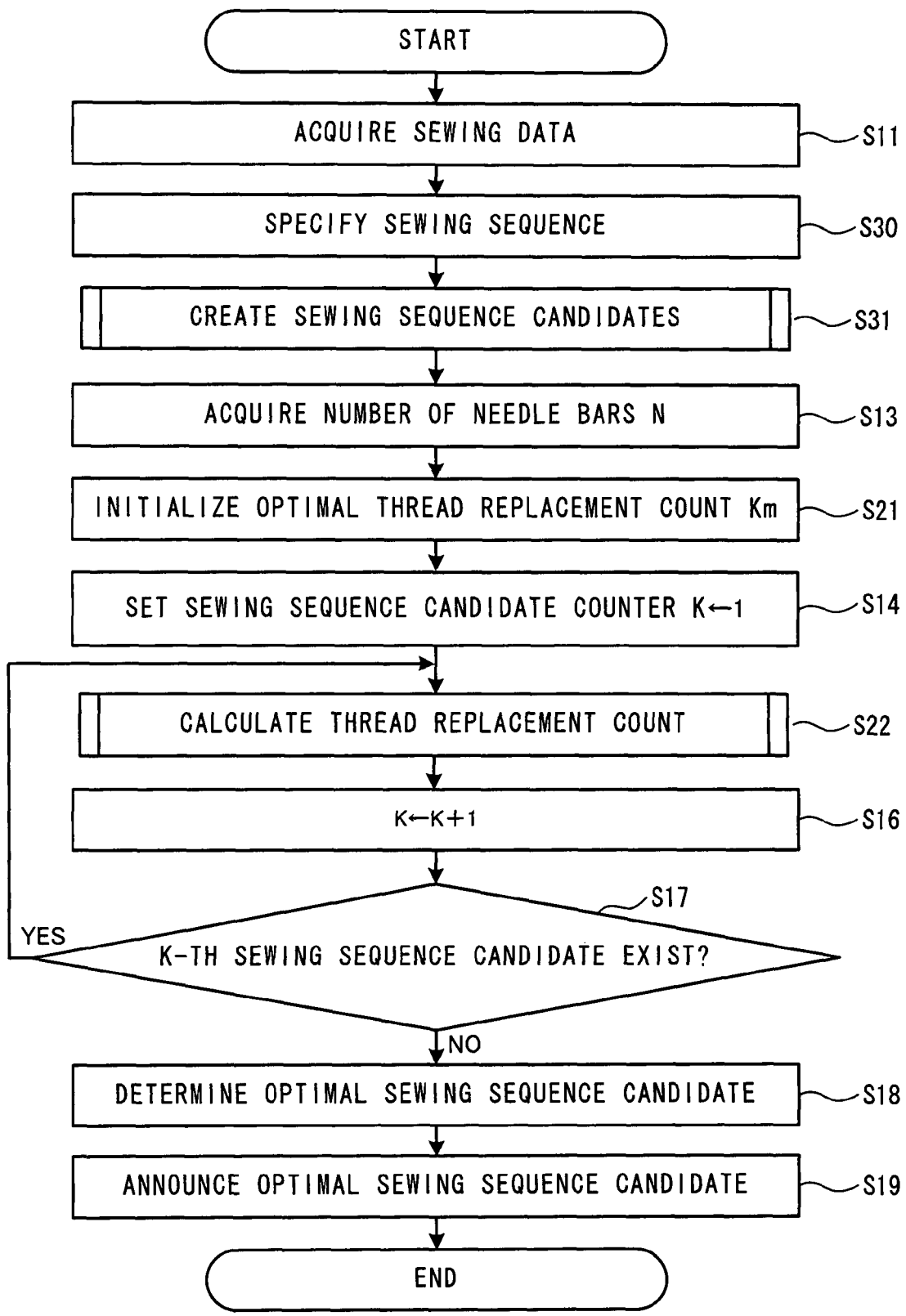
FIG. 21 is a main flowchart showing a flow of main processing of determining sewing sequences.
Figure 22:
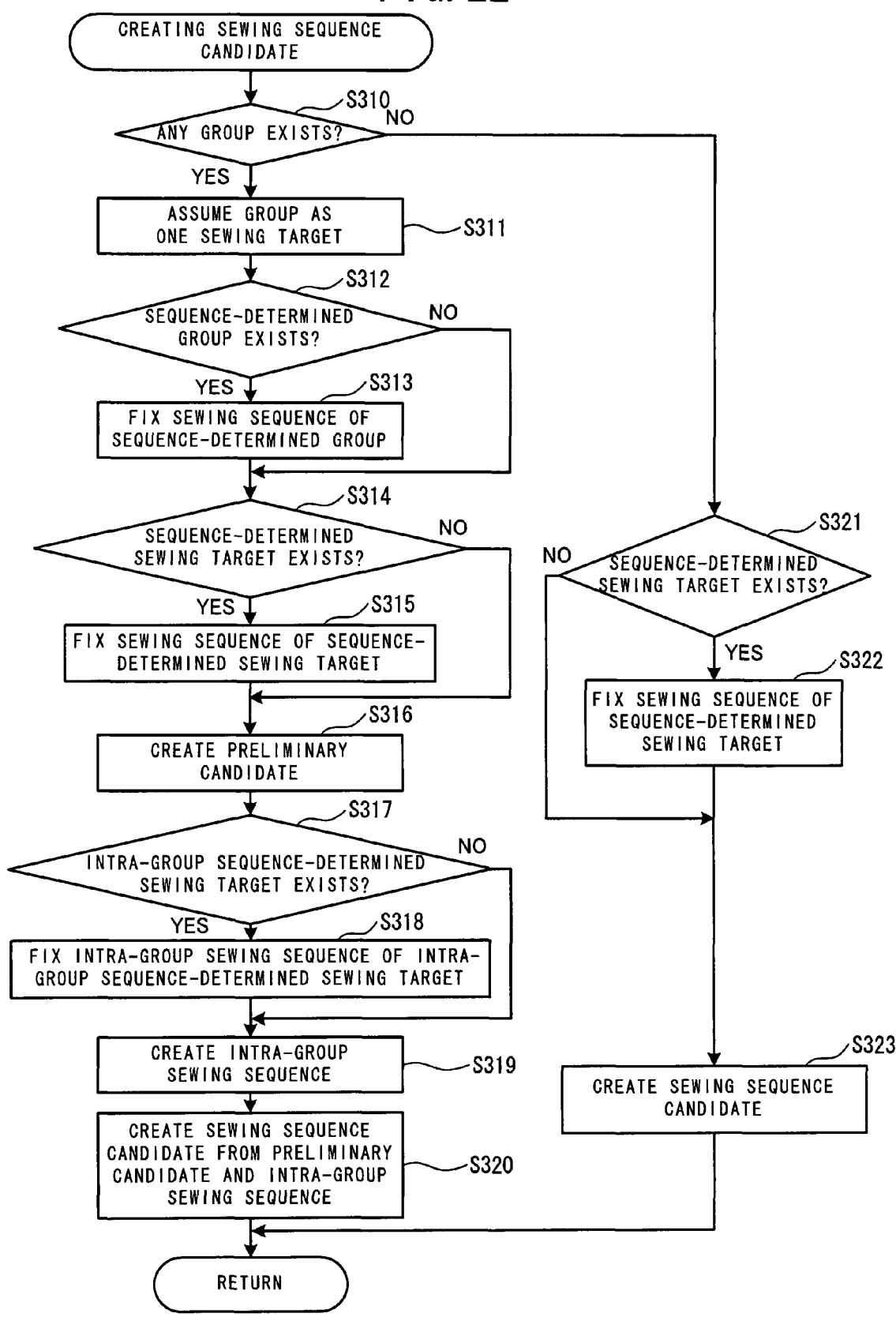
FIG. 22 is a flowchart showing sequences for carrying out a processing of creating sewing sequence candidates in the main process.

Next, referring to FIG. 21, a description will be given with respect to a flow of main processing of determining sewing sequences in the third embodiment. As shown in FIG. 21, the flow of proceeding operation of determining sewing sequences in the third embodiment is different from that of the second embodiment in processings of S30 and S31. A description of processings common to those of the second embodiment will be omitted here. Next, referring to FIG. 21 and FIG. 22, a description will be given with respect to the processings of S30 and S31 different from those of the second embodiment. A program for executing the main processing shown in FIG. 21 and the processing of creating sewing sequence candidates in FIG. 22 is stored in the sewing sequence determining program storage area 465 of the ROM 46 (refer to FIG. 5). This program is executed by the CPU 45 shown in FIG. 4.

First, a description will be given with respect to a processing S30 different from that of the second embodiment. In the third embodiment, an optimal sewing sequence candidate is determined from among sewing sequence candidates that meet desired conditions. Therefore, in S30, the sewing data storage area 471 is referred to, and the sewing targets are displayed on the liquid crystal display 30 (refer to FIG. 1 and FIG. 2). Then, one of the conditions relating to the sewing sequences of the sewing targets displayed on the liquid crystal display 30 is selected by the operator. The condition selected by the operator is sensed by means of a touch sensor 32 (refer to FIG. 4) provided on the liquid crystal display 30, and then, the sensed condition is stored in the storage area of the RAM 47 as described below in detail (S30).

In the processing, any of the conditions of patterns 1 to 10 shown in FIG. 23 may be input by the operator. Then, sewing targets configuring groups are stored in the group storage area 491 on a group-by-group basis. At this time, in order to determine whether or not there exists a sequence-determined sewing target among the sewing targets configuring groups, a sequence determination flag is set as OFF and stored in the group storage area 491 in association with the sewing targets. In Example 2, with respect to patterns 3 to 10 where a condition in which A and B configures a group is provided, A and B configuring a group is stored in the group storage area 491. At this time, the sequence determination flag for each of A and B is set as OFF, and the setting is stored in the group storage area 491.

In S30, a sequence-determined sewing target, which is a sewing target whose sewing sequence has been specified and input, and the sewing sequence of the sequence-determined sewing target are stored in the sequence-determined sewing target storage area 492. In Example 2, pattern 2 and patterns 7 to 10 in which the sewing sequence of the sewing target C has been specified and input as a first sequence; sewing target C and the first sequence indicating the sewing sequence of the sewing target C are stored in the sequence-determined sewing target storage area 492.

In S30, a sequence-determined group, which is a group whose sewing sequence has been specified and input, and the sewing sequence of the sequence-determined group are stored in the sequence-determined group storage area 493. In Example 2, with respect to patterns 5 and 6 in which the sewing sequence of group AB consisting of the sewing targets A and B has been specified and input as a first sequence, the group AB and the first sequence indicating the sewing sequence of the group AB are stored in the sequence-determined group storage area 493. In addition, with respect to patterns 9 and 10 in which the sewing sequence of group AB consisting of the sewing targets A and B has been specified and input as a second sequence, the group AB and the second sequence indicating the sewing sequence of the group AB are stored in the sequence-determined group storage area 493.

In S30, an intra-group sequence-determined sewing target, which is a sewing target whose intra-group sewing sequence has been specified and input, and the intra-group sewing sequence of the intra-group sequence-determined sewing target, are stored in the intra-group sequence-determined sewing target storage area 494. In Example 2, among the group AB consisting of the sewing targets A and B, with respect to patterns 4, 6, 8, and 10 in which the sewing sequence of A has been specified and input as a first sequence and the sewing sequence of B has been specified and input as a second sequence, the sewing target A and the first sequence indicating the sewing sequence of A are stored in the intra-group sequence-determined sewing target storage area 494. In addition, the sewing target B and the second sequence indicating the sewing sequence of B are stored in the intra-group sequence-determined sewing target storage area 494.

Next, referring to FIG. 22, a description will be given with respect to a processing S31 different from that of the second embodiment. In the third embodiment, in order to create sewing sequence candidates that meet desired conditions, among a plurality of sewing targets, in the case where there exists a group of the grouped sewing targets, the group is handled as one sewing target to obtain preliminary candidates and determine their sewing sequences, and intra-group sewing sequences of the sewing targets configuring the group indicating the sewing sequences within the group, respectively. Then, sewing sequence candidates are created from the preliminary candidates and the intra-group sewing sequence. In addition, among the plurality of sewing targets, in the case where there exists a sequence-determined sewing target, the sewing sequence of the sewing target is fixed so as to determine a sewing sequence candidate.

Therefore, in S310 of FIG. 22, first, the group storage area 491 is referred to, and then, it is determined whether or not the grouped sewing targets exist among the plurality of sewing targets (S310). As shown in FIG. 23, in patterns 1 and 2, there exists no grouped sewing targets, and thus, it is determined that no group exists (S310: No), and the routine proceeds to S321. The processing of S321 will be described later. On the other hand, in patterns 3 to 10, the sewing targets A and B configure a group, and thus, it is determined that a group exists (S310: Yes). Here, it is assumed that the sewing targets A and B are grouped as group AB. In S311 that follows the above step, the group AB is handled as one sewing target. Then, as targets used for creating preliminary candidates, the group AB, and the sewing targets C and D are stored in the preliminary candidate creation target storage area 496. At this time, in order to determine whether or not there exists a sequence-determined group or sewing target, an sequence determination flag is set as OFF and stored in the preliminary candidate creation target storage area 496 in association with the groups or the sewing targets. In Example 2, the sequence determination flag for each of the group AB, and the sewing targets C and D is set as OFF, and the setting is stored in the preliminary candidate creation target storage area 496.

Then, in S312, the sequence-determined group storage area 493 is referred to, and it is determined whether or not sequence-determined group exists (S312). As shown in FIG. 23, in patterns 3, 4, 7, and 8, the sewing sequence of group AB is not specified and input, and thus, it is determined that a sequence-determined group does not exist (S312: No), and then, the routine proceeds to S314. On the other hand, in patterns 5 and 6, the sewing sequence of the group AB is specified and input as a first sequence. In patterns 9 and 10, the sewing sequence of the group AB is specified and input as a second sequence, and thus, it is determined that a sequence-determined group exists (S312: Yes). In S313 that follows the above step, the sequence determination flag of group AB is set to ON, and the setting is stored in the preliminary candidate creation target storage area 496; the sewing sequence of the group AB is fixed; and then, the fixed sewing sequence is stored in the preliminary candidate storage area 497.

The processing of fixing the sewing sequence of the sequence-determined group in S313 is carried out as follows, for example. First, the preliminary candidate creation target storage area 496 is referred to, and the number P of the sewing targets and the groups having the sequence determination flag set to OFF is acquired among the sewing targets and groups serving as preliminary candidate creation targets. Then, by the number of P! (a factorial of P), tables for obtaining preliminary candidates are provided in the preliminary candidate storage area 497, and then, the sequence-determined groups are stored in cells of the table indicating the sewing sequences corresponding to those of the sequence-determined groups, which are stored in the sequence-determined group storage area 493 (S313). In patterns 5 and 6 of Example 2, with respect to the group AB, the sequence determination flag is set to ON, while the sequence determination flags of the sewing targets C and D are set to OFF. Therefore, the factorial of P (the number of P!) is 2. Then, by 2 which is the number of 2!, tables for obtaining preliminary candidates are allocated in the preliminary candidate storage area 497, and then, the group AB is stored in a cell of a first sewing sequence of the table. Similarly, in patterns 9 and 10, the group AB is stored in a cell of a second sewing sequence of the table.

Then, in S314, the sequence-determined sewing target storage area 492 is referred to, and then, it is determined whether or not a sequence-determined sewing target exists (S314). As shown in FIG. 23, in patterns 3 to 6, the sewing sequences of the sewing targets C and D that are not grouped are not specified or input, and thus, it is determined that a sequence-determined sewing target does not exist (S314: No), and the routine proceeds to S316. On the other hand, in patterns 7 to 10, the sewing sequence of the sewing target C is specified and input as a first sequence, and thus, it is determined that a sequence-determined sewing target exists (S314: Yes). Then, the sequence determination flag of the sewing target C is set to ON, and the setting is stored in the preliminary candidate creation target storage area 496; the sewing sequence of the sewing target C is fixed, and the fixed sewing sequence is stored in the preliminary candidate storage area 497 (S315). The processing of fixing the sewing sequence of the sequence-determined sewing target in S315 is similar to the case of S313.

In the case of patterns 9 and 10, it is determined that the processing in S313 has been carried out. Thus, in S315, first, the preliminary candidate creation target storage area 496 is referred to. Among the sewing targets and groups serving as preliminary candidate creation targets, there is obtained the number P of sewing targets and groups for which the sequence determination flag is set to OFF. The already allocated storage areas are reconstructed so that storage areas for obtaining preliminary candidates are allocated by the number of P!, and then, the sewing sequences of the sewing targets are stored in the preliminary candidate storage area 497 (S313). In this case, the value of P is 1, and thus the already created storage areas are reconstructed so that storage areas are allocated to enable creation of preliminary candidates by the number of the permutation of 1, and then, the sewing target C is stored as the sewing target of a first sewing sequence in the storage area.

In S316 that follows the above step, a preliminary candidate is created. First, a preliminary candidate creation target storage area 496 is referred to, and then, it is determined whether or not there exists a sewing target for which the sequence determination flag is set to ON. In the case where the determination result is negative, permutations of all the sewing targets stored in the preliminary candidate creation target storage area 496 are obtained, and the thus obtained permutations are stored in a preliminary candidate storage area 497. Patterns 3 and 4 do not have a sewing target with the sequence determination flag set as ON, and thus, there are obtained permutations of the group AB, and the sewing targets C and D stored in the preliminary candidate creation target storage area 496. Then, the preliminary candidates are obtained as shown in FIG. 24. In the figure, the first column represents pattern numbers; the second column indicates numbers of the preliminary candidates created with respect to the patterns; and the third to fifth columns represent the sewing targets to be sewn in sewing sequences of the preliminary candidates. In the figure, AB indicates the group AB. As shown in FIG. 24, in patterns 3 and 4, preliminary candidates of preliminary candidate numbers 1 to 6 are created, and then, the created preliminary candidates are stored in the preliminary candidate storage area 497.

On the other hand, in the case where there exists a sewing target of which a sequence determination flag is set to ON, there are obtained: permutations of sewing targets of which the sewing determination flag stored in the preliminary candidate creation target storage area 496 is set to OFF; and the thus obtained permutations are stored in the preliminary candidate storage area 497. In patterns 5 to 10, there exists a sewing target of which the stored sequence determination flag is set to ON, and thus, there are obtained permutations of sewing targets of which the sequence determination flag stored in the preliminary candidate creation target storage area 496 is set to OFF; and then, the preliminary candidates as shown in FIG. 24 are stored in the preliminary candidate storage area 497. In the case where there is no sewing target of which the stored sequence determination flag is set to OFF, it is determined that a preliminary candidate has been already created.

In S317 that follows the above step, first, an intra-group sequence-determined sewing target storage area 494 is referred to in a processing for creating intra-group sewing sequences, and then, it is determined whether or not there exists an intra-group sequence-determined sewing target. As shown in FIG. 23, in patterns 3, 5, 7, and 9, it is determined that there is no intra-group sequence-determined sewing target (S317: No), and the routine proceeds to S319. On the other hand, as shown in FIG. 23, in patterns 4, 6, 8, and 10, it is determined that there exists an intra-group sequence-determined sewing target (S317: Yes). Then, in S318 that follows the above step, the sequence determination flag of the intra-group sequence-determined sewing target stored in the group storage area 491 is set to ON; the intra-group sewing sequence of the intra-group sequence-determined sewing target is fixed to the sewing sequence stored in the intra-group sequence-determined sewing target storage area 494; and then, the fixed sewing sequence is stored in an intra-group sewing sequence storage area 495. The processing of fixing the intra-group sewing sequence is similar to that of S313.

In S319 that follows the above step, an intra-group sewing sequence is created. In the processing of creating the intra-group sewing sequence, first, the group storage area 491 is referred to, and it is determined whether or not there exists a sewing target of which the stored sequence determination flag is set to ON, on a group by group basis. With respect to a group in which there is no sewing target of which the stored sequence determination flag is set to ON, there are obtained permutations of all the sewing targets configuring the group stored in the group storage area 491; and then, the thus obtained permutations are stored in the intra-group sewing sequence storage area 495. In patterns 3, 5, 7, and 9, there is no intra-group sequence-determined sewing target, and then, it is determined that there is no sewing target of which the sequence determination flag stored in the group is set to ON. Therefore, as shown in FIG. 25, there are obtained permutations of the sewing targets A and B that configure the group AB; and the thus obtained permutations are stored in the intra-group sewing sequence storage area 495. In FIG. 25, the first column indicates pattern numbers; the second column indicates numbers of the intra-group sewing sequences of patterns; and the third and fourth columns indicates sewing targets of the first and second sewing sequences in the group, respectively.

On the other hand, with respect to a group having a sewing target of which the sequence determination flag stored is set to ON, there are obtained permutations of the sewing targets of which the sequence determination flag is set to OFF; and then, the obtained permutations are stored in the intra-group sewing sequence storage area 495. In patterns 4, 6, 8, and 10, it is determined that there exists an intra-group sequence-determined sewing target and that there exists a sewing target of which the stored sequence determination flag is set to ON. However, with respect to the sewing targets A and B configuring group AB, the stored sequence determination flags are set to ON. Therefore, as shown in FIG. 25, it is determined that the intra-group sewing sequence has already been stored in the intra-group sewing sequence storage area 495.

In S320 that follows the above step, the preliminary candidate storage area 497 and the intra-group sewing sequence storage area 495 are referred to; sewing sequence candidates are created from the preliminary candidates and the intra-group sewing sequences; and the thus created sewing sequence candidates are stored in the sewing sequence candidate storage area 472. With respect to the sewing sequence candidates in patterns 3 and 10, the sewing sequence candidates shown in the 12th column of FIG. 23 are created from the preliminary candidates shown in FIG. 24 and the intra-group sewing sequences shown in FIG. 25 and then, the created candidates are stored in the sewing sequence candidate storage area 472. Then, the routine returns to the main processing shown in FIG. 21, and then, proceeds to S13.

On the other hand, in S310 of FIG. 22, in patterns 1 and 2 where it has been determined that grouped sewing targets do not exist (S310: No), in S321 that follows the above step, the sewing targets A, B, C, and D are stored in the sewing sequence candidate creation target storage area 498 as sewing targets serving as targets for creating sewing sequence candidates. At this time, in order to determine whether or not there exists a sewing target having a determined sequence, the sequence determination flag is set to OFF and stored in the sewing sequence candidate creation target storage area 498 in association with each of the sewing targets. Then, a sequence-determined sewing target storage area 492 is referred to, and then, it is determined whether or not there exists a sequence-determined sewing target. As shown in FIG. 23, in pattern 1, there is no sewing target of which the sewing sequence has been specified and input, and thus, it is determined that there is no sequence-determined sewing target (S321: No), and the routine proceeds to S323. On the other hand, in pattern 2, the sewing sequence of the sewing target C is specified and input as a first sequence, and thus, it is determined that a sequence-determined sewing target exists (S321: Yes). Then, the sequence determination flag of the sewing target C is set to ON, and the setting is stored in the sewing sequence candidate creation target storage area 498. Then, the sewing sequence of the sewing target C is fixed to the sewing sequence stored in the sequence-determined sewing target storage area 492, and the fixed sequence is stored in the sewing sequence candidate storage area 472 (S322). The processing of fixing the sewing sequence of the sequence-determined sewing target is similar to that of S313.

In S323 that follows the above step, a sewing sequence candidate is created, and then, the thus created candidate is stored in the sewing sequence candidate storage area 472. In the processing of creating the sewing sequence candidate, first, the sewing sequence candidate creation target storage area 498 is referred to, and then, it is determined whether or not there exists a sewing target of which the stored sequence determination flag is set to ON. In the case where the determination result is negative, there are obtained permutations of all the sewing targets stored in the sewing sequence candidate creation target storage area 498; and then, the thus obtained permutations are stored in the sewing sequence candidate storage area 472. In pattern 1, it is determined that there is no sewing target of which the stored sequence determination flag is set to ON. Therefore, as shown in the sewing sequence candidate of FIG. 23, permutations of the sewing targets A, B, C, and D are obtained, and the thus obtained permutations are stored in the sewing sequence candidate storage area 472.

On the other hand, in the case where there exists a sewing target of which the stored sequence determination flag is set to ON, there are obtained permutations of the sewing targets of which the sequence determination flag is set to OFF; and then, the obtained permutations are stored in the already stored sewing sequence candidate storage area 472. In pattern 2, the sewing sequence of the sewing target C is set at a first sequence, and then, it is determined that there exists a sewing target of which the stored sequence determination flag is set to ON. Then, there are obtained the permutations of the sewing targets A, B, and D of which the sequence determination flag is set to OFF; and then, as shown in the sewing sequence candidates of FIG. 23, the permutations are stored in the already stored sewing sequence candidate storage area 472.

As has been described above, the sewing sequence candidate is created in S31 of FIG. 21 the processing of calculating the thread replacement count is carried out in S22 with respect to all of the sewing sequence candidates; and then, an optimal sewing sequence candidate is determined in S18. Then, in S19, the optimal sewing sequence candidate is announced, and then, the processing of creating the sewing sequence is terminated.

According to the sewing sequence determining apparatus of the third embodiment described above, a specific group composed of sewing targets is specified and input as a group, and then, the sewing sequence candidate can be created so that the sewing sequences of the sewing targets configuring the group are sequential. In addition, when the intra-group sewing sequences of grouped sewing targets are specified and input, the sewing sequence candidates can be created so that the intra-group sewing sequences of the sewing targets can be obtained as the input sewing sequences. Further, among a plurality of sewing targets, while a specific group of sewing targets is defined as a group, in the case where the sewing sequence of the group has been specified and input, the sewing sequence candidates can be created so that the sewing sequence of the group is obtained as the input sewing sequence. Furthermore, among a plurality of sewing targets, by specifying and inputting the sewing sequence of a specific sewing target, the sewing sequence candidate can be created so that the sewing sequence of the sewing target is obtained as the input sewing sequence.

In the first to third embodiments described above, there is an advantage that the sewing sequence of a sewing target can be known such that thread replacement is reduced, before sewing a plurality of sewing targets. On the other hand, in the case where an attempt is made to revise the sewing sequence of a sewing target by adding or deleting a sewing target in the middle of sewing a plurality of sewing targets in accordance with the optimal sewing sequence candidate, recalculation cannot be carried out unless sewing on a sewing target has been completed. Therefore, processing may be carried out as in a fourth embodiment shown below.

Next, referring to FIG. 26 to FIG. 32, a description will be given with respect to operating procedures for creating sewing sequences of Example 3 made of sewing targets A, B, C, and D by using a sewing sequence creating apparatus of the fourth embodiment. The physical configuration and electrical configuration of the sewing sequence determining apparatus in the fourth embodiment are similar to those of the second embodiment except for storage areas of the RAM 47. Therefore, the storage areas of the RAM 47 different from those of the second embodiment will be described later. In addition, a description of aspects similar to those of the second embodiment will be omitted here.

Figure 26:
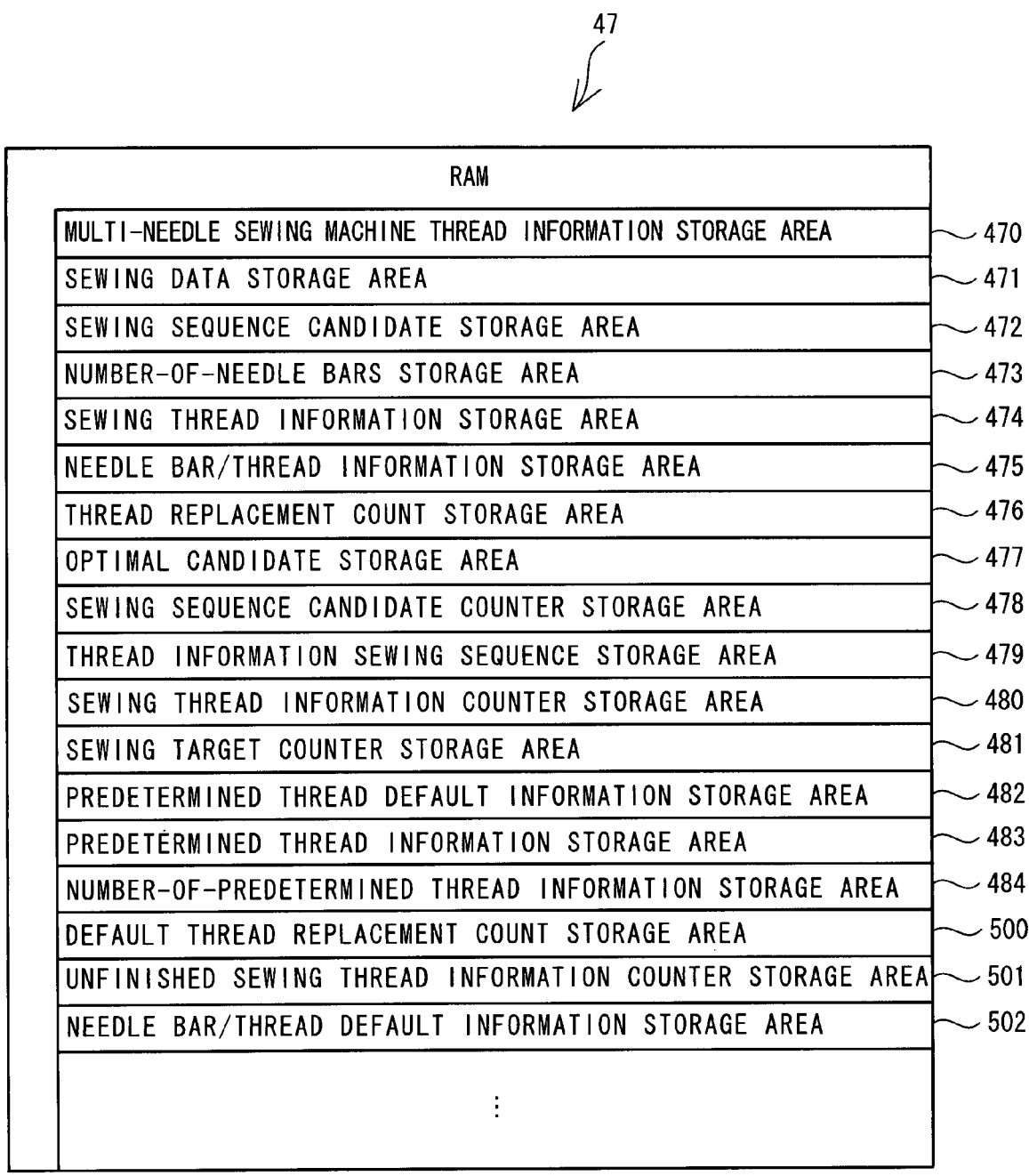
FIG. 26 is an illustrative view of a storage area of a RAM.

First, referring to FIG. 26, a description will be given with respect to the storage areas of the RAM 47 different from those of the second embodiment. As shown in FIG. 26, in the storage areas of the RAM 47 in the fourth embodiment, besides the storage areas of the RAM 47 of the second embodiment shown in FIG. 14, there are provided, for example: a default thread replacement count storage area 500; an unfinished sewing thread information counter storage area 501; and a needle bar/thread default information storage area 502. The default thread replacement count storage area 500 stores as a default thread replacement count the thread replacement count obtained in accordance with a processing of reading the sewing thread information on the sewing targets being sewn. The unfinished sewing thread information counter storage area 501 is a counter for reading unfinished sewing thread information in accordance with the sewing sequence. The needle bar/thread default information storage area 502 stores as a needle bar/thread default information the needle bar/thread information obtained in accordance with the processing of reading the sewing thread information on the sewing targets being sewn.

Next, Example 3 will be described with reference to FIG. 31. In Example 3, as shown in FIG. 31, it is assumed that the sewing targets A, B, and C are sewn in order of the optimal sewing sequence candidate BCA determined in accordance with the second embodiment; and when sewing operations are carried out by a thread of the third sewing sequence of the sewing target C represented by the shaded cell in FIG. 31, the sewing target D has been added as a new sewing target. In the optimal sewing sequence candidate BCA, sewing of the sewing target B has been terminated, the sewing target C is being sewn, and the sewing target A is not yet sewn.

Next, referring to FIG. 27, a description will be given with respect to the thread information on the sewing targets of Example 3. Among the sewing targets configuring Example 3, the sewing sequences and thread colors (thread information) of the sewing targets A, B, and C are omitted here because the sequences and colors are similar to those of the first embodiment. Therefore, the sewing sequences and thread colors (thread information) of the sewing target D will be described here. As shown in FIG. 27, the sewing target D is a sewing target having five items of color information, the sewing target being sewn by thread colors of "orange, yellowish green, yellow, pink, and red" in sewing sequence from the earliest sewing. As in the first embodiment, it is assumed that the thread information is composed of only information relating to thread colors for the sake of simple explanation.

Figure 28:
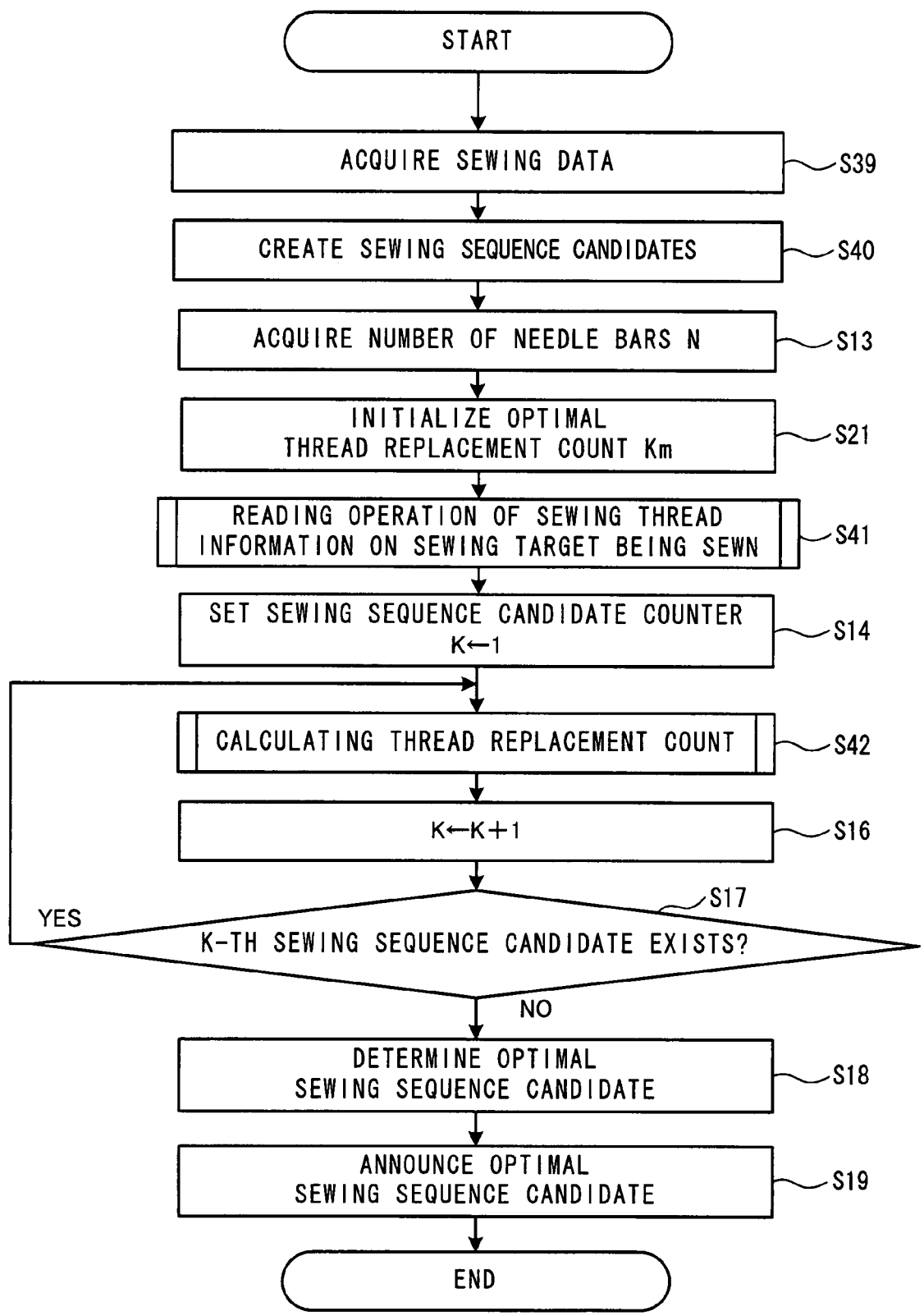
FIG. 28 is a main flowchart showing a flow of main processing of determining sewing sequences.

Next, referring to FIG. 28, a description will be given with respect to a flow of processing of determining sewing sequences in the fourth embodiment. As shown in FIG. 28, the flow of processing of determining sewing sequences in the fourth embodiment is different from that of the second embodiment in the processings of S39, S40, S41, and S42. A description of processings common to those of the second embodiment will be omitted here. Hereinafter, referring to FIG. 28 to FIG. 32, a description will be given with respect to the processings of S39, S40, S41, and S42 different from those of the second embodiment. The main processing shown in FIG. 28; the processing of reading out the sewing thread information on the sewing target being sewn shown in FIG. 29 and the program for executing the processing of calculating the thread replacement count shown in FIG. 30 are stored in the sewing sequence determining program storage area 465 of the ROM 46 (refer to FIG. 5). These processings and program are executed by the CPU 45 shown in FIG. 4.

When a processing of determining sewing sequences is started, first, the sewing data stored in the sewing data storage area 471 of the RAM 47 is acquired (S39). The sewing data acquired in S39 of the fourth embodiment is obtained as sewing data on an unfinished sewing target to be sewn after completing the sewing target being sewn. The sewing data on the sewing target being sewn or the sewing data on the already sewn target is not acquired. The sewing data may be stored in the sewing data storage area 471 by the operator directly inputting the data to the multi-needle sewing machine 11 via the liquid crystal display 30. Alternatively, the sewing data input to another apparatus may be stored in the sewing data storage area 471 by acquiring the data from the FDD 31 (refer to FIG. 2 and FIG. 4). In addition, whether or not a sewing target has already been sewn may be determined based on information on whether or not the sewing data on the sewing target stored in the RAM 47 has already been sewn. The information may be stored in the RAM 47 by causing the operator to specify it to store it in the sewing data storage area 471, or by causing the operator to store information on whether or not each of the sewing targets have already been sewn at the time of sewing operations. In Example 3, the sewing data on the unfinished sewing targets A and D is acquired.

Then, among the sewing targets configuring the sewing data acquired in S39, a sewing sequence candidate is created with respect to the unfinished sewing target (S40). In Example 3, permutations of AD and DA are obtained as sewing sequences in the case of sewing the sewing targets A and D, and the thus obtained permutations are stored in the sewing sequence candidate storage area 472. The sewing sequence candidates excluding the sewing target B having already been sewn and the sewing target C being currently sewn can be created in accordance with this processing.

Next, a description will be given with respect to a processing in S41 that is different from that of the second embodiment. In the fourth embodiment, in the case of determining sewing sequences of a plurality of sewing targets to be sewn after completing sewing of a sewing target being currently sewn, the sewing data on the sewing target which is not yet used to sew the sewing target is read from among the sewing data on the sewing target being sewn, and then, the sewing data of the sewing target to be sewn after completing the sewing target being currently sewn is read out in accordance with the sewing sequence candidate. In Example 3, from among the thread information of the sewing target C being sewn shown in FIG. 32, the thread information on the third to seventh sewing sequences is read out. First, in S410 of FIG. 29, in order to initialize a default thread replacement count Kj for obtaining an initial thread replacement count of a sewing sequence candidate, the default thread replacement count Kj is set at 0, and then, the value is stored in the default thread replacement count storage area 500.

Then, the needle bar/thread information, the predetermined thread information, and the number-of-predetermined thread information Yn are initialized (S411). The initialization of the needle bar/thread information is carried out by referring to the multi-needle sewing machine thread information storage area 470, acquiring thread information on threads set at the needle bars of the multi-needle machine 11 as the needle bar/thread information, and storing the acquired information into the needle bar/thread information storage area 475. As shown in a ninth line of FIG. 31, thread information on the threads set to the needle bars is "red, black, light blue, blue, brown, and pink" when carrying out sewing operations by means of a thread having sewing thread information of the third sewing sequence of the sewing target C. Therefore, in Example 3, "red, black, light blue, blue, brown, and pink" is acquired in S411 as the needle bar/thread information on the threads set for the needle bars 27 of the multi-needle sewing machine 11, and the acquired information is stored in the needle bar/thread information storage area 475. In addition, in initialization of the predetermined thread information, as in the second embodiment, it is assumed that a NULL value is set in the predetermined thread default information storage area 482, and then, the NULL value is stored in the predetermined thread information storage area 483. In addition, the initialization of the number-of-predetermined thread information Yn is carried out by setting 0 for the number-of-predetermined thread information Yn, and then, storing the setting in the predetermined thread information storage area 484.

Then, the unfinished sewing thread information counter M is initialized, the counter serving as a counter for sequentially reading out unfinished sewing thread information of a sewing target being sewn, and then, a default value is stored in the unfinished sewing thread information counter storage area 501 (S412). This initialization is carried out by acquiring the sewing sequence in the sewing target of sewing data currently being sewn, and then, storing it as the default value in the unfinished sewing thread information counter storage area 501. In the case where the sewing sequence creating apparatus is provided in the multi-needle sewing machine 11, the sewing sequence in the sewing target of sewing data currently being sewn can be acquired by referring to the sewing data being read out by the sewing control program. In addition, in the case where the sewing sequence creating apparatus is provided independently of the multi-needle sewing machine 11, for example, the sewing sequence in the sewing target of sewing data being sewn can be acquired by causing an operator to input and store it in the RAM 47, and then, referring to the RAM 47. In the fourth embodiment, the sewing sequence creating apparatus is provided integrally with the multi-needle sewing machine 11. Thus, the sewing data read out by the sewing control program is referred to, and then, the sewing sequence in the sewing target of sewing data being sewn is acquired. In Example 3, 3 is set at the unfinished sewing thread information counter M, and then, the value 3 is stored in the unfinished sewing thread information counter storage area 501 (S412).

Then, the sewing data storage area 471 is referred to, and then, it is determined whether or not there exists unfinished sewing thread information possessed by the sewing target currently being sewn (S413). In the case where it is determined that there does not exist sewing thread information of an M-th sewing sequence in the sewing target currently being sewn (S413: No), the routine proceeds to S422. The processing of S422 will be described later. On the other hand, in Example 3, as shown in FIG. 32, sewing has not been completed with respect to thread information of the third sewing sequence in the sewing target C currently being sewn and it is determined that the sewing is unfinished. Thus, it is determined that there exists a sewing sequence candidate of the third sewing sequence with respect to the sewing target that is unfinished (S413: Yes), and then, the sewing thread information "light blue" is stored in the sewing thread information storage area 474. Then, the sewing thread information storage area 474 and the needle bar/thread information storage area 475 are referred to, and then, it is determined whether or not there exists an item of the needle bar/thread information that coincides with this sewing thread information (S414). In S414, it is determined whether or not there exists any needle bar/thread information that coincides with the sewing thread information in S414 in order to prevent sewing from being interrupted until thread replacement becomes necessary with respect to the sewing target being sewn, that is, in order to disable setting of a thread replacement timing.

In Example 3, the items of the needle bar/thread information stored in the needle bar/thread information storage area 475 are "red, black, light blue, blue, brown, and pink" as shown in the second line of FIG. 32; there exists a needle bar/thread information item that coincides with the sewing thread information "light blue"; and thus, it is judged that there exists an item of the needle bar/thread information that coincides with the sewing thread information (S414: Yes). Then, the unfinished sewing thread information counter M is incremented by 1, and the incremented value is stored in the unfinished sewing thread information counter storage area 501 (S415). Then, the routine proceeds to S413 to repeat the above processing.

As in the processings of S413 to S415 described previously, from among the sewing thread information possessed by the sewing target C currently being sewn, the unfinished sewing thread information is sequentially read out, and then, it is determined whether or not the read out information coincides with any item of the needle bar/thread information. The processing is repeated, whereby, in the case where the unfinished sewing thread information counter M has been set at 7 in S415, it is determined that there exists sewing thread information "white" of the seventh sewing sequence among the sewing thread information possessed by the sewing target C currently being sewn. Then, in S414 that follows the above step, it is determined whether or not any item of the needle bar/thread information coincides with the sewing thread information "white". The items of the needle bar/thread information stored in the needle bar/thread information storage area 475 is "red, black, light blue, blue, brown, and pink"; no item of the needle bar information coincides with the sewing thread information "white"; and thus, it is determined that there does not exist needle bar/thread information that coincides with the sewing thread information (S414: No). When the determination result is negative, it is determined that sewing cannot be carried out without thread replacement, and then, the routine moves to a processing of setting a thread replacement timing.

Then, among the sewing thread information possessed by the sewing target C currently being sewn, it is determined whether or not there exists sewing thread information of the M-th sewing sequence (S416). In Example 3, as shown in FIG. 32, among the sewing thread information possessed by the sewing target C currently being sewn, it is determined that there exists sewing thread information "white" of the seventh sewing sequence (S416: Yes). Then, the sewing thread information storage area 474 and the predetermined thread information storage area 483 are referred to, and then, it is determined whether or not there exists predetermined thread information that coincides with the sewing thread information (S417). In S411, a NULL value is stored in the predetermined thread information storage area 483; the sewing thread information "white" is not stored, and thus, it is determined that there does not exist predetermined thread information that coincides with the sewing thread information (S417: No). Then, the number-of-predetermined thread information storage area 484 and the number-of-needle bars storage area 473 are referred to, and then, it is determined whether or not the value of the number-of-predetermined thread information Yn is equal to or greater than the number of needle bars N (S418). The number-of-predetermined thread information Yn is stored as 0, and thus, it is determined that the value of the number-of-predetermined thread information Yn is below the number of the needle bars (N=6)(S418: No), and then, the routine proceeds to S419.

Then, the sewing thread information "white" is stored in the predetermined thread information storage area 483 (S419). Then, in S419, one more item of the predetermined thread information has been stored in the predetermined thread information storage area 483, and thus, a value "8" obtained by incrementing the number-of-predetermined thread information Yn by 1 is stored in the number-of-predetermined thread information storage area 484 (S420). Then, the unfinished sewing thread information counter M is incremented by 1, and then, the incremented value is stored in the unfinished sewing thread information counter storage area 501 (S421). Then, the routine returns to S416 in which processing is repeated.

In S416, as shown in FIG. 32, among the sewing thread information possessed by the sewing target C currently being sewn, thread information of the eighth sewing sequence is not stored, and thus, it is determined that there does not exist sewing thread information of the M-th sewing sequence (S416: No). In S422 that follows the above step, the number-of-predetermined thread information Yn of Example 3 is set at 1, while the default value of the number-of-predetermined thread information Yn is set at 0. Thus, it is determined that Yn is not the default value (S234: No). Then, in order to provide the sewing thread information on the M-th sewing sequence to the processing of S416 again, a value "7" obtained by decrementing by 1 the unfinished sewing thread information counter M is stored in the unfinished sewing thread information counter storage area 501 (S423). Then, the routine proceeds to the processings of setting the thread replacement timing in S424 to S426. The processings of S424 to S426 are similar to those of S236 to S238 of the second embodiment shown in FIG. 16. Such processings are carried out to set the thread replacement timing at the time of replacing a sewing target as in the second embodiment.

In Example 3, in S424, it is determined whether or not any item of the needle bar/thread information "red, black, light blue, blue, brown, and pink" coincides with the predetermined thread information "white", and then, it is determined that there does not exist any item of the needle bar/thread information that coincides with sewing thread information "white" (S424: No). Then, the predetermined thread information storage area 483 and the needle bar/thread information storage area 475 are referred to; the needle bar/thread information is updated so as to register a needle bar/thread information item that coincides with the predetermined thread information; and then, the updated information is stored in the needle bar/thread default information storage area 502 (S425). In Example 3, the needle bar/thread information is updated to "white, black, light blue, blue, brown, and pink" so that the thread information that coincides with the predetermined thread information "white" is registered as an item of the needle bar/thread information, and then, the updated information is stored in the needle bar/thread default information storage area 502 (S425).

A processing in S425 of FIG. 29 will be described referring to FIG. 32. The sewing sequences and the thread information on the sewing targets in FIG. 32, and expression in relation to the thread information on threads set at needle bar numbers and thread replacement timings are similar to the case shown in FIG. 12 of the first embodiment. The thread colors "white, black, light blue, blue, brown, and pink" shown in the seventh line of FIG. 32 indicates the needle bar/thread information updated in S425. Among the items of the needle bar/thread information shown in the seventh line, the needle bar/thread information item "white" whose cell is shaded indicates the needle bar/thread information item updated in S425. At the time of sewing operations, before carrying out sewing operations by means of a thread having the sewing thread information "white" of the seventh sewing sequence in the sewing target C, thread replacement is carried out so that the colors of the threads set at the needle bars coincide with the needle bar/thread information "white, black, light blue, blue, brown, and pink" after updated in S425, whereby sewing operations can be carried out without interruption by the thread of the sewing thread information of the seventh sewing sequence.

Then, in S426, the number of items of the needle bar/thread information updated in S425 is added to the default thread replacement count Kj, and the obtained value is stored in the default thread replacement count storage area 500 (S426). Among the items of the needle bar/thread information shown in the seventh line of FIG. 32, one item has been updated in S425, and thus, 1 is added to Kj, and then, the obtained value is stored in the default thread replacement count storage area 500 (S426).

Then, the predetermined thread information and the number-of-predetermined thread information Yn are initialized (S427). In the initialization of the predetermined thread information and the number-of-predetermined thread information Yn, as in S412, the predetermined thread default information storage area 482 is referred to; and the NULL value is stored in the predetermined thread information storage area. In addition, 0 is set for the number-of-predetermined thread information Yn, and then, this value 0 is stored in the number-of-predetermined thread information storage area 484.

Then, in S421, a value "8" obtained by incrementing the unfinished sewing thread information counter M by 1 is stored in the unfinished sewing thread information counter storage area 501 (S421). Then, in S416, it is determined that there does not exist sewing thread information of the eighth sewing sequence again (S416: No). Then, the number-of-predetermined thread information storage area 484 is referred to, and then, it is determined whether or not the number-of-predetermined thread information Yn is the default value (S422). In S427, the number-of-predetermined thread information Yn has been set at the default value, and thus, it is determined that the number-of-predetermined thread information Yn is the default value (S422: Yes). Then, the routine returns to the main processings shown in FIG. 28, and then, proceeds to S14.

As described above, a processing of reading out sewing thread information on a sewing target currently being sewn, shown in S41 of FIG. 28, is carried out. Then, referring to FIG. 30, a description will be given with respect to a processing in S42 that is different from that of the second embodiment. As shown in FIG. 30, the processing of calculating the thread replacement count in the fourth embodiment is different from that of the second embodiment shown in FIG. 16 in S500 and S501. A description of processings common to those of the second embodiment will be omitted, and a description will be given with respect to the different processings in S500 and S501. The processing in S42 of FIG. 28 is carried out for each of the sewing sequence candidates. This processing is carried out by reading out thread information on a sewing target in accordance with an K-th sewing sequence candidate.

First, the processing in S500 of FIG. 30 will be described here. In order to set a value of a thread replacement count Ki for sequentially storing the thread replacement count of the K-th sewing sequence candidate at the default thread replacement count Kj obtained in S41 of FIG. 28, the default thread replacement count storage area 500 is referred to; the thread replacement count Ki of the K-th sewing sequence candidate is set at Kj; and then, the setting is stored in the thread replacement count storage area 476. In Example 3, 1 is stored as the default thread replacement count Kj, and thus, 1 is set for the thread replacement count Kj; and then, the setting is stored in the thread replacement count storage area 476.

Next, a processing in S501 of FIG. 30 will be described here. In S501, the needle bar/thread information, the predetermined thread information, and the number-of-predetermined thread information Yn are initialized. Unlike the second embodiment, the initialization of the needle bar/thread information is carried out by referring to the needle bar/thread default information storage area 502, and then, storing the information in the needle bar/thread information storage area 475. By this processing, the thread information on the threads set at the needle bars at the time sewing operations are completed on the sewing target being sewn can be set as the needle bar/thread information. In Example 3, as shown in the seventh line of FIG. 32, the needle bar/thread information "white, black, light blue, blue, brown, and pink" is stored in the needle bar/thread information storage area 475. The initialization processing of the predetermined thread information and the number-of-predetermined thread information Yn is similar to those of the second embodiment.

As has been described above, in S39, S40, S41, and S42 of FIG. 28, the processings that are different from those of the second embodiment are carried out, the thread replacement counts are calculated in S42 for all the sewing sequence candidates created in S40 of FIG. 28 and then, an optimal sewing sequence candidate is determined in S18. Then, in S19, the optimal sewing sequence candidate is announced, and then, the sewing sequence creation processing is terminated. In Example 3, the number of thread replacement is 8 times, in the case where sewing operations are carried out in order of AD that follows C being sewn. On the other hand, the thread replacement count is 11 times, in the case where sewing operations are carried out in order of DA after C. Therefore, in S18 of the main processings shown in FIG. 28, an optimal sewing sequence candidate is determined in order of AD. In S19 that follows the above step, the optimal sewing sequence candidate AD is announced to the operator, and then, the sewing sequence determining processing is terminated.

The present disclosure is not limited to the embodiments described above in detail, and various modifications are possible. While the foregoing embodiments have described a case in which the sewing sequence creating apparatus is provided integrally with the multi-needle sewing machine 11, the creating apparatus may be provided independent of the multi-needle sewing machine without being limited thereto.

While the foregoing embodiments have described a case of Example 1 in which thread information is composed of only thread color for the sake of simple explanation, the thread information representing thread attributes such as manufacturer name, thickness, materials can be applied without being limited thereto.

In addition, by storing an optimal sewing sequence candidate obtained by the method of the present disclosure, a thread replacement timing of the optimal sewing sequence candidate, and thread information on needle bars and threads to be replaced at each of the thread replacement timings, a sewing machine can be controlled so as to carry out sewing based on the optimal sewing sequence candidate. In that case, the sewing machine is controlled so as to interrupt sewing at the thread replacement timing, and then, the thread information on the threads to be set at the needle bars requiring thread replacement is announced by means of an announcing device, thereby making it possible for an operator to properly carry out thread replacement in accordance with the announced contents.

The announcing device is not limited to a liquid crystal display 30. An arbitrary announcing device can be employed by providing a speaker to announce by audio an optimal sewing sequence candidate or by providing a printer device to print and display an optimal sewing sequence candidate, for example.

While, in the first and second embodiments, sewing sequence candidates have been created in S12 of FIG. 9 and FIG. 15, respectively, this processing can be omitted in the case where sewing sequence candidates have been created in advance by an operator or in the case where sewing sequence candidates are acquired from the outside. In such a case, the sewing sequence candidates may be stored in the sewing sequence candidate storage area 472. In addition, while, in S12, an attempt has been made to obtain the permutations of sewing targets, only a specific combination may be obtained without being limited thereto.

While, in each of the first and second embodiments, an optimal sewing sequence candidate has been announced in S19 of each of FIG. 9 and FIG. 15, this announcing can be omitted in the case where there is no need. In addition, the announced contents are sufficient as far as an optimal sewing sequence candidate can be identified, and thus arbitrary contents can be announced. For example, only an optimal sewing sequence candidate may be announced, or an optimal sewing sequence candidate and a thread replacement count may be announced. In addition, all of the sewing sequence candidates and the thread replacement count of the sewing sequence candidates may displayed to show which of the sewing candidates is the optimal sewing sequence candidate. Moreover, a thread replacement timing of the optimal sewing sequence candidate and the needle bars requiring thread replacement at the thread replacement timing, and their associated information may be announced, respectively.

While, in the first embodiment, in S13 of FIG. 9, the number of needle bars N of the multi-needle sewing machine 11 has been acquired, and, in S155, N items of the thread information from the H-th sewing sequence has been acquired as the sewing thread information, the number of items of the sewing thread information acquired in S155 may be employed as the number less than N pieces, although it is preferably N.

While, in S239 of FIG. 16, the optimal candidate storage area 477 and the thread replacement counts storage area 476 are referred to, and then, it is determined whether or not the value of Ki is equal to or greater than that of Km (S239). However, such a processing can be omitted. In such a case, the processing in S21 of FIG. 15 can be omitted. As in the first embodiment, in S238, by updating a K-th thread replacement count Ki, the sewing sequence candidate and the thread replacement count may be stored in the thread replacement counts storage area 478 in associated with each other for each of the sewing sequence candidates.

While, in the second embodiment, the thread information on all of the sewing targets in which the sewing sequences are specified for each of the sewing sequence candidates have been sequentially acquired in S226 of FIG. 16, the sewing targets of up to a specific sewing sequence may be sequentially acquired, and then, the thread replacement count may be calculated to determine an optimal sewing sequence candidate. For example, after creating the sewing sequence candidates of 50 sewing targets, with respect to each of the sewing sequence candidates, thread information on the sewing targets of the first to 30th sewing sequences is sequentially acquired, and then, the thread replacement count is calculated, whereby an optimal sewing sequence candidate may be determined.

While, in the second embodiment, in S228 of FIG. 16, it has been determined whether or not the predetermined thread information can be registered in the predetermined thread information storage area 483 by determining whether or not the number of items of the predetermined thread information is equal to or greater than the number of needle bars of the multi-needle sewing machine, the present embodiment is not limited thereto. For example, whether or not a free space is available in the predetermined thread information storage area 483 may be determined in S228 of FIG. 16 by defining in advance the number of items of the predetermined thread information that can be stored in the predetermined thread information storage area 483 shown in FIG. 14. In the case where the determination result is affirmative (S228: Yes), it is determined that a free space is available in the predetermined thread information storage area 483, and thus, the processing in S229 of FIG. 16 is carried out. On the other hand, in the case where the determination result is negative (S228: No), it is determined that the predetermined thread information cannot be registered in the predetermined thread information storage area 483, and thus, the processing in S235 may be carried out. In addition, while a processing has been carried out such that the number-of-predetermined thread information Yn is not greater than the number of needle bars N in S228 of FIG. 16, a value to be compared with the number-of-predetermined thread information Yn is not limited to the number of needle bars N, and an arbitrary value equal to or smaller than the number of needle bars N can be employed. In the case where the predetermined thread information is registered as required and is not initialized, the predetermined thread information and the registration sequence of the predetermined thread information are stored in the predetermined thread information storage area 483 in association with each other. Then, in S228, reference is made to the number-of-predetermined thread information Yn that has been already registered during and after the predetermined registration sequence, and then, in S236, it may be determined as to whether or not there exists needle bar/thread information that coincides with the predetermined thread information during and after the predetermined registration sequence.

In the third embodiment, it is sufficient as far as a sewing sequence candidate can be created to meet a condition relating to a sewing sequence, and an arbitrary sewing sequence candidate creation processing can be employed. For example, after a sewing sequence candidate has been obtained from permutations of all of the sewing targets, there may be carried out a processing of eliminating from the sewing sequence candidates a sewing sequence that does not meet the condition relating to the sewing sequence.

While, in the third embodiment, the sewing sequence of the sequence-determined sewing target or the sequence-determined group has been specified and input on one by one basis, for example, a plurality of sewing sequence of the sewing target C in Example 2 may be specified and input as a first sequence or a second sequence. Alternatively, the sewing sequence of the sewing target C may be specified and input as a sequence other than the first sequence.

The sewing sequence of the sequence-determined group may be a sewing sequence obtained when the group has been assumed as one sewing target or may be the one obtained when considering all of the sewing targets. In the case where the sewing sequence of the sequence-determined group corresponds to the one in all of the sewing targets, the sewing sequence of arbitrary sewing sequence in the group can be obtained. For example, the sewing sequence of the sequence-determined group may be specified and input as that of the sewing target to be sewn at the first sequence in the group or as that of the sewing target to be sewn at the last sequence in the group. In addition, in the case where the sewing sequence of the sequence-determined group corresponds to the one in all of the sewing targets, the sewing sequence candidates may be obtained so that any one of the sewing targets in the group corresponds to that of the sequence-determined group.

While, in the third embodiment, the sewing sequences have been assigned to all of the sewing targets of the sewing sequences specified for each of the sewing sequence candidates, the sewing sequences may be assigned to only part of the sewing targets. For example, 30 sewing targets are extracted out of 50 sewing targets, whereby sewing sequence candidates may be created with respect to the 30 sewing targets. At this time, in the case where there exists a sewing target of the specified sewing sequence or in the case where grouped sewing targets are specified, contrivance is made so as to extract the sewing sequence or group with the specified sewing sequence, and then, sewing sequence candidates may be created so as to meet the specified condition.

While, in the third embodiment, the touch sensor 32 has been used as means such as for grouping, intra-group sequence input, group sequence input, and sewing target sequence input, it is possible to employ an interface with an operator such as a keyboard, a mouse, a trackball, or a voice input device, without being limited thereto.

While the third embodiment has described a case in which, among the main processings of the second embodiment shown in FIG. 15, the processing of specifying the sewing sequences in S30 (FIG. 21) is carried out between S11 and S12, and then, the processing of creating the sewing sequence candidates shown in FIG. 22 has been employed as S31, in place of S12 of FIG. 15. However, these processings may be applied to those of the first embodiment. In such a case, among the main processings of the first embodiment shown in FIG. 9, the processing of specifying the sewing sequence in S30 is carried out between S11 and S12, and then, the processing of creating the sewing sequence candidates shown in FIG. 22 may be applied in that in S12 of FIG. 9.

Figure 29:
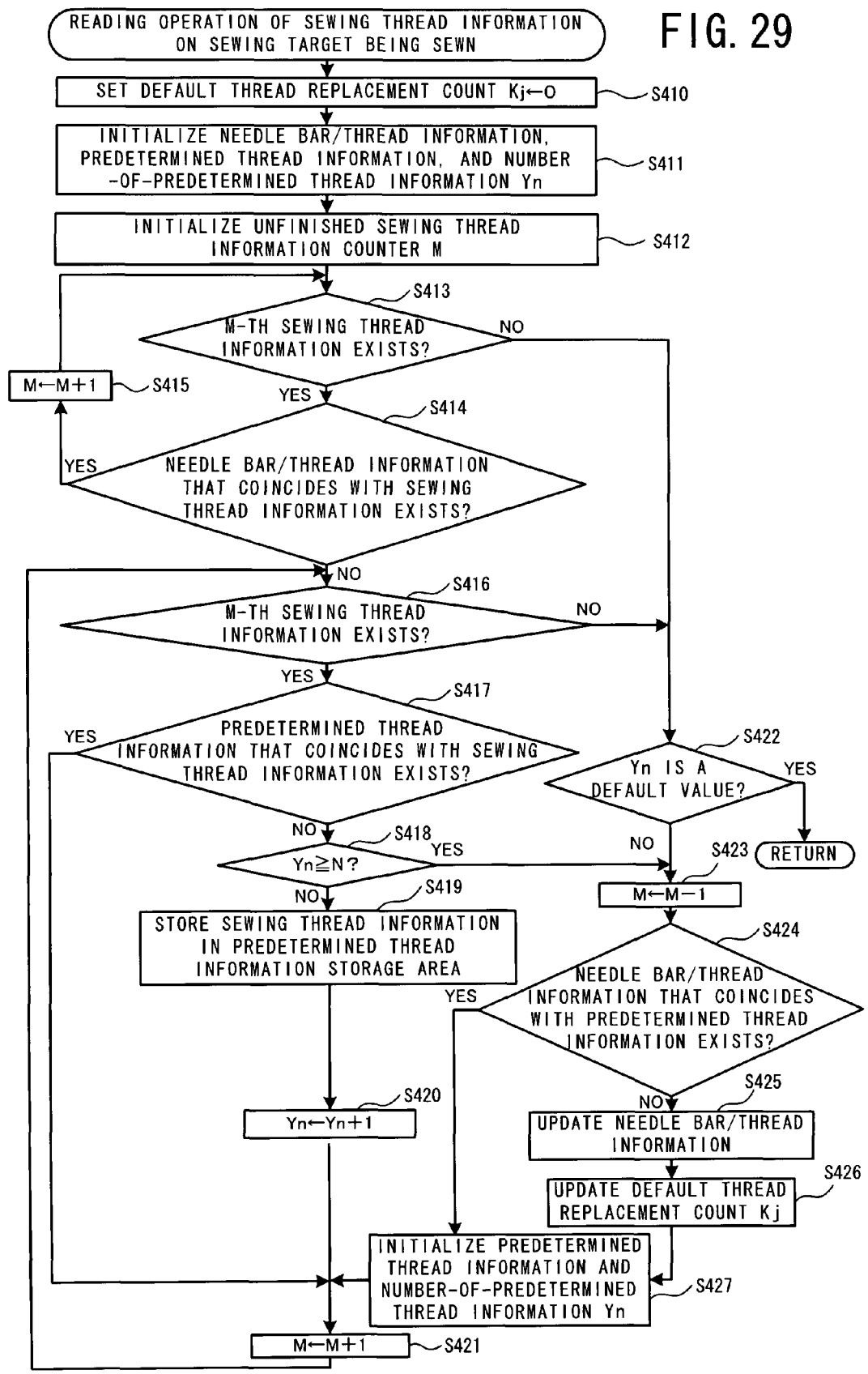
FIG. 29 is a flowchart showing sequences for carrying out reading sewing thread information on a sewing target in sewing, in the main process.
Figure 30:
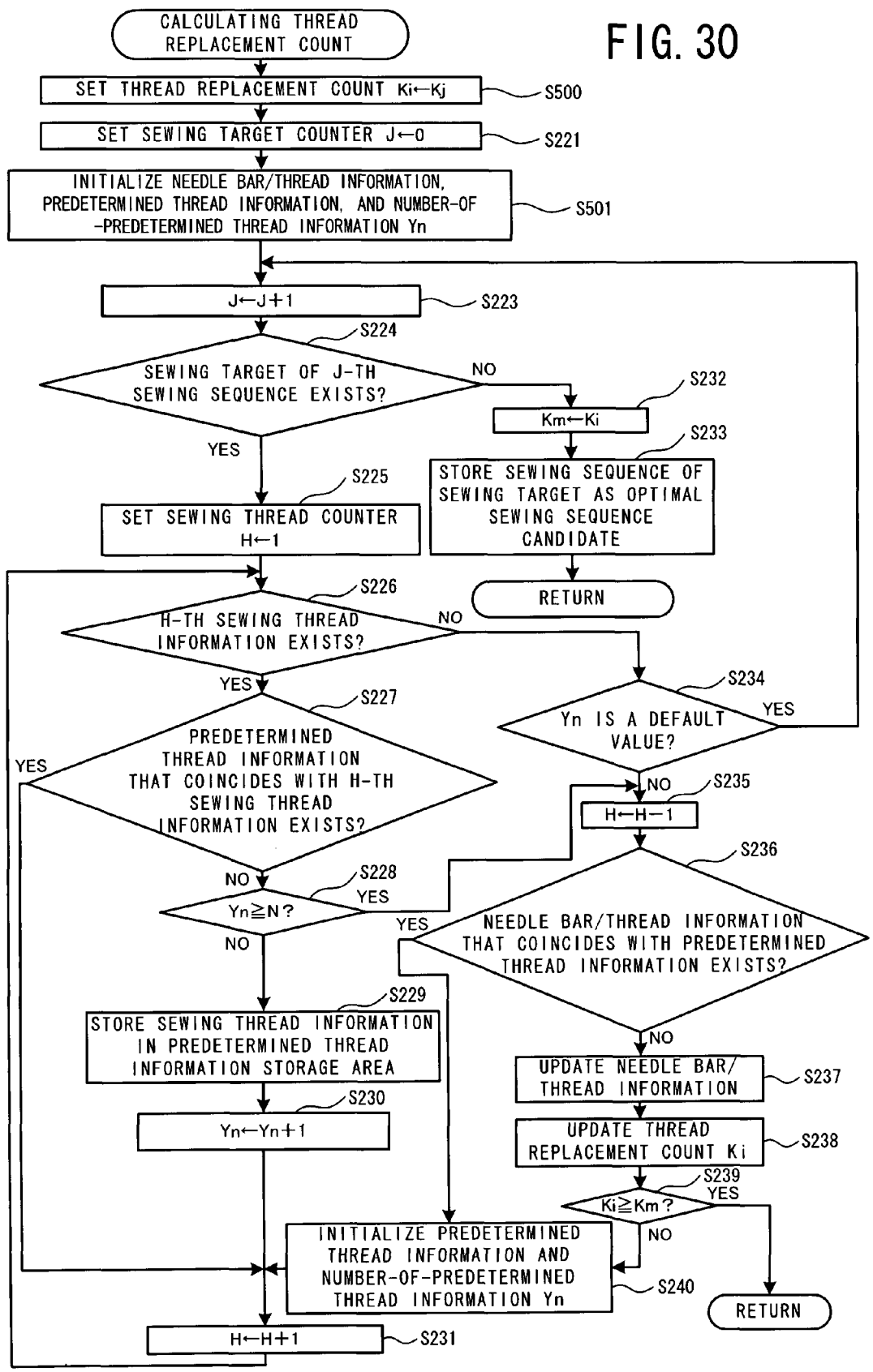
FIG. 30 is a flowchart showing sequences for carrying out a processing of calculating the thread replacement count in the main process.

While a fourth embodiment has described a case in which the processing of reading the sewing thread information of a sewing target being sewn, shown in FIG. 29, and the processing of calculating the thread replacement count, shown in FIG. 30, is applied to the processing of creating the sewing sequences of the second embodiment shown in FIG. 15, and these processings may be applied to those of modified examples of the first and second embodiments.

While, in the fourth embodiment, an attempt has been made to obtain the default thread replacement count Kj, the processing can be omitted in the case where an attempt is made to obtain the thread replacement count required for sewing a sewing target after the current sewing target being sewn. In such a case, the processings in S410 and S426 of FIG. 29 can be omitted.

The sewing sequence determining apparatus and the sewing sequence determining program of the present disclosure calculate the thread replacement count for each of the sewing sequence candidates, which are candidates of sewing sequences of a plurality of sewing targets, and then, determines as an optimal sewing sequence candidate the sewing sequence candidate having the minimum thread replacement count. Therefore, it is possible to automatically determine which sewing sequences can reduce the thread replacement count of the multi-needle sewing machine. Thus, an operator does not need to consider which sewing sequences should be employed in order to effectively sew the sewing targets. In addition, the sewing targets are sewn by the multi-needle sewing machine in accordance with the optimal sewing sequence candidate determined by the sewing sequence determining apparatus, whereby the thread replacement count can be minimized, and concurrently, a sewing time or inconvenience associated with such replacement can be reduced.

According to the sewing sequence determining apparatus and the sewing sequence determining program of the present disclosure, which needle bar's thread is to be replaced is determined based on the sewing thread information items read out by the number of needle bars. Thus, the thread replacement count assuming proper thread replacement can be calculated as compared with a case where determination is made based on each sewing thread information item. For example, in the case where a sewing target is to be sewn with threads whose colors are "red, blue, white, black, red, and white" in order of sewing by a multi-needle sewing machine having three needle bars at which threads of three colors "red, blue, and white" have been set, a thread set at any one of the needle bars needs to be replaced before sewing is carried out with a "black" thread of the fourth sewing sequence. At this time, in the case where a thread of a needle bar to which "red" thread is set is replaced with a "black" thread, the "red" thread must be set at any of the needle bars again as sewing operations are to be carried out with the "red" thread immediately after "black" of the fourth sequence. According to the present disclosure, sewing thread information is read out by the number of needle bars from the fourth sequence; the sewing thread information and the needle bar/thread information on the fourth to sixth sequences are referred to; and the needle bar/thread information to be updated is determined, so that the thread of the needle bar to which "blue" is set is replaced with "black". Then, the number of threads thus updated is counted as a thread replacement count. Therefore, according to the present disclosure, an optimal sewing sequence candidate can be determined based on the thread replacement count calculated, assuming proper thread replacement with respect to each of the sewing sequence candidates. Thus, a sewing target is sewn by the multi-needle sewing machine in accordance with the optimal sewing sequence candidate determined by the sewing sequence determining apparatus, whereby a sewing time or inconvenience associated with such replacement can be reduced.

According to the sewing sequence determining apparatus and program of the present disclosure, after thread information on threads to be set at the needle bars has once been stored as predetermined thread information, the stored predetermined thread information is compared with needle bar/thread information. Thus, the thread replacement count assuming proper thread replacement can be calculated as compared with a case where determination is made based on each of the sewing thread information. In the foregoing examples, in the present disclosure, the fourth to sixth thread colors are registered as predetermined thread information, and then, the predetermined thread information "black, red, and white" and needle bar/thread information "red, blue, and white" are compared with each other. As a result, with respect to "black", there does not exist the needle bar/thread information that coincides with the predetermined thread information, and thus the needle bar/thread information "blue" is updated to "black", whereby the predetermined thread information and the needle bar/thread information are made coincident with each other. Then, the number of threads to be updated is counted as a thread replacement count. Therefore, according to the present disclosure, an optimal sewing sequence candidate can be determined based on the thread replacement count calculated assuming proper thread replacement with respect to each of the sewing sequence candidates. Thus, a sewing target is sewn by the multi-needle sewing machine in accordance with the optimal sewing sequence candidate determined by the sewing sequence determining apparatus, whereby a sewing time or inconvenience associated with such replacement can be reduced.

According to the sewing sequence determining apparatus and the sewing sequence determining program of the present disclosure, sewing thread information and the predetermined thread information are compared with each other with respect to all items of thread information on a plurality of sewing targets, thus making it possible to determine an optimal sewing sequence candidate more reliably.

According to the sewing sequence determining apparatus and program of the present disclosure, when a processing of obtaining a thread replacement count with respect to each one of a plurality of sewing sequence candidates is carried out, in the case where the thread replacement count is equal to or greater than the thread replacement count of another sewing sequence candidate whose thread replacement count has already been obtained, a processing of calculating the thread replacement count of the sewing sequence candidate is cancelled. Therefore, an optimal sewing sequence candidate can be determined more efficiently.

In the sewing sequence determining apparatus and program of the present disclosure, it is assumed that, in the case where a sewing target has been sewn by a thread set at a needle bar, sewing operations are carried out as far as they can be carried out without thread replacement; and when sewing cannot be carried out without thread replacement, the threads to be used after the thread replacement are replaced as a whole. Therefore, the thread replacement count assuming more proper thread replacement can be calculated so as to reduce occasions of interrupting sewing by the multi-needle sewing machine for the sake of thread replacement. A sewing target is sewn by the multi-needle sewing machine so as to carry out thread replacement before sewing a next sewing target, in accordance with an optimal sewing sequence candidate determined by the sewing sequence determining apparatus of the present disclosure. This makes it possible to reduce occasions of interrupting sewing by the multi-needle sewing machine in order to replace a thread and to reduce a sewing time.

According to the sewing sequence determining apparatus and the sewing sequence determining program of the present disclosure, a thread replacement count is calculated assuming that thread replacement is carried out after a sewing target has been sewn. Therefore, consideration is made so as to reduce occasions of interrupting sewing by the multi-needle sewing machine in order to replace a thread, and then, an optimal sewing sequence candidate having the minimum thread replacement count can be determined. Thus, at the time of sewing operations, the occasions of interrupting sewing by the multi-needle sewing machine in order to replace a thread can be reduced, making it possible to reduce a sewing time.

According to the sewing sequence determining apparatus and program of the present disclosure, a sewing sequence candidate is automatically created. Thus, an operator does not need to preset a sewing sequence candidate or store it in a sewing sequence creating apparatus. In addition, all of sewing sequence patterns can be obtained, thus making it possible to prevent failures to set a sewing sequence candidate.

According to the sewing sequence determining apparatus and program of the present disclosure, among a plurality of sewing targets subjected to be sewn, sewing sequence candidates can be created so that sewing sequences of the sewing targets configuring a specific group become sequential. Therefore, for example, among a plurality of sewing targets, even in the case where an attempt is made to sew specific sewing targets as a group so that their sewing sequences become sequential, an optimal sewing sequence candidate can be determined so that the sewing sequences of the sewing targets in the group become sequential.

According to the sewing sequence determining apparatus and program of the present disclosure, in the case where sewing sequences in a specific group of sewing targets has been input, sewing sequence candidates can be created so that the sewing sequences in the group of the sewing targets are obtained as the input sewing sequences. For example, there is a case in which, among a plurality of sewing targets, a specific group of sewing targets are sewn as a whole and an attempt is made to sew a specific sewing target included in the group at a first sequence of the sewing target group. In such a case, the sewing sequences can be created so that the sewing sequence of the sewing target A is specified as a first sequence and the sewing sequences of the other sewing targets included in the group become sequential to the sewing target A. Thus, an optimal sewing sequence candidate can be determined from among sewing sequence candidates which can meet conditions specified by an operator.

According to the sewing sequence determining apparatus and program of the present disclosure, in the case where a specific group of sewing targets is grouped among a plurality of sewing targets, and then, the sewing sequence of the group is input, sewing sequence candidates can be created so that the sewing sequence of the group is obtained as the input sewing sequence. In such a case, for example, among a plurality of sewing targets, the sewing targets configuring the specified group are sewn as a whole, and at the same time, in the case where an attempt is made to sew the group first, sewing sequence candidates can be created so that the sewing sequences of the sewing targets constituting the group are obtained as sequential sewing sequences starting from 1st. Thus, an optimal sewing sequence candidate can be determined from among the sewing sequence candidates that meet conditions specified by an operator.

According to the sewing sequence determining apparatus and the sewing sequence determining program of the present disclosure, sewing sequences of specific sewing targets are input from among a plurality of sewing targets, and then, sewing sequence candidates can be created so that the sewing sequences of the sewing targets are obtained as the input sewing sequences. Therefore, for example, among a plurality of sewing targets, in the case where an attempt is made to first sew a specific sewing target A, sewing sequence candidates can be created so that the sewing sequence of the sewing target A is obtained as a first sequence. Thus, an optimal sewing sequence candidate can be determined from among the sewing sequence candidates that meet conditions specified by an operator.

According to the sewing sequence determining apparatus and the sewing sequence determining program of the present disclosure, in the case of determining sewing sequences of a plurality of sewing targets to be sewn after sewing operations are completed on a current sewing target being sewn, the sewing sequences can be automatically calculated such that the thread replacement count becomes minimal. For example, there is a case in which an attempt is made to review the sewing sequences of the sewing targets by adding or deleting the sewing target in the middle of sewing a plurality of sewing targets in accordance with an optimal sewing sequence candidate. In such a case also, the optimal sewing sequence candidate can be calculated with respect to a plurality of sewing targets to be sewn after a sewing target currently being sewn, without interrupting sewing of a sewing target currently being sewn.

According to the sewing sequence determining apparatus and the sewing sequence determining program of the present disclosure, an operator can know in advance which sequence is efficient to sew a plurality of sewing targets. Further, before starting sewing, preparation works can be made for sewing operations, for example, including rearranging sewing targets in accordance with an optimal sewing sequence candidate, and then, sewing efficiency can be improved.

According to a sewing machine equipped with the sewing sequence determining apparatus of the present disclosure, the advantageous effect described above can be attained.

What is claimed is:

1. A sewing sequence determining apparatus that determines sewing sequences of a plurality of sewing targets, the apparatus comprising:
   a sewing data storage device that stores a plurality of sewing targets and sewing data in association with each other, the sewing data including at least thread information that is information relating to threads for sewing the sewing targets and sequence information that indicates sequences for sewing the sewing targets;
   a thread information readout device that reads out the thread information in accordance with the sequence information for each of a plurality of sewing sequence candidates, wherein each sewing sequence candidate is determined from the plurality of the sewing targets having the sewing data stored in the sewing data storage device;

a needle bar/thread information storage device that stores needle bar/thread information that is information relating to threads set at a plurality of needle bars of a multi-needle sewing machine;

a thread replacement count calculating device that compares sewing thread information that is the thread information sequentially read out by the thread information readout device with the needle bar/thread information stored in the needle bar/thread information storage device, and then calculates a thread replacement count; and an optimal sequence determining device that determines as an optimal sewing sequence candidate the sewing sequence candidate having a minimum thread replacement count as calculated by the thread replacement count calculating device.

2. The sewing sequence determining apparatus as claimed in claim 1, wherein the thread replacement count calculating device comprises:

a thread information determining device that determines whether the needle bar/thread information that coincides with the sewing thread information read out by the thread information readout device by the number of the needle bars is stored in the needle bar/thread information storage device;

a thread information updating device that updates the needle bar/thread information so that there exists the thread information that coincides with the sewing thread information, in the case where it is determined by the thread information determining device that the needle bar/thread information that coincides with the sewing thread information is not stored in the needle bar/thread information storage device; and a thread replacement count storage device that stores a number of items of the needle bar/thread information updated by the thread information updating device as a thread replacement count for each of the sewing sequence candidates, wherein the optimal sequence determining device determines as the optimal sewing sequence candidate the sewing sequence candidate having the minimum thread replacement count, among the sewing sequence candidates stored in the thread replacement count storage device.

3. The sewing sequence determining apparatus as claimed in claim 1, further comprising:

a predetermined thread information storage device that stores predetermined thread information that is the thread information to be registered in the needle bar/thread information storage device, wherein the thread replacement count calculating device comprises:

a thread information determining device that determines whether or not the predetermined thread information that coincides with the sewing thread information sequentially read out by the thread information readout device is stored in the predetermined thread information storage device;

a thread information registering device that causes the predetermined thread information storage device to store the sewing thread information as the predetermined thread information in the case where it is determined by the thread information determining device that the predetermined thread information that coincides with the sewing thread information is not stored;

a thread information updating device that updates the needle bar/thread information so that there exists the needle bar/thread information that coincides with the predetermined thread information, and then initializes the predetermined thread information storage device; and a thread replacement count storage device that stores a number of the needle bar/thread information updated by the thread information updating device as a thread replacement count for each of the sewing sequence candidates, wherein the optimal sequence determining device determines as the optimal sewing sequence candidate the sewing sequence candidate having the minimum thread replacement count, among the sewing sequence candidates stored in the thread replacement count storage device.

4. The sewing sequence determining apparatus as claimed in claim 3, further comprising a determination control device that causes the thread information determining device to execute determination until all of the sewing thread information read out by the thread information readout device is registered as the predetermined thread information and the needle bar/thread information is updated, after the needle bar/thread information is previously updated by the thread information updating device.

5. The sewing sequence determining apparatus as claimed in claim 4, wherein the determination control device terminates determination by the thread information determining device, in the case where the thread replacement count of one of the sewing sequence candidates being processed is equal to or greater than the number of thread replacement of another one of the sewing sequence candidates stored in the thread replacement count storage device.

6. The sewing sequence determining apparatus as claimed in claim 3, further comprising:

a thread information registration determining device that determines whether the sewing thread information can be registered in the predetermined thread information storage device in the case where it is determined by the thread information determining device that the predetermined thread information that coincides with the sewing thread information is not stored in the predetermined thread information storage device; and a timing setting device that sets a thread replacement timing that is a timing of replacing a thread set to the needle bar immediately before the sewing sequence of the sewing data including the sewing thread information with which it is determined by the thread information determining device that the predetermined thread information that coincides is not stored, in the case where it is determined by the thread information registration determining device that the sewing thread information cannot be registered, wherein the thread information updating device updates the needle bar/thread information so that there exists the needle bar/thread information that coincides with the predetermined thread information, and then initializes the predetermined thread information storage device, in the case where the thread replacement timing is set by the timing setting device.

7. The sewing sequence determining apparatus as claimed in claim 6, further comprising:

a last detecting device that detects last thread information that is the sewing thread information corresponding to the last sewing sequence of the sewing target; and a forcible timing setting device that sets the thread replacement timing so that thread replacement is carried out after sewing operations are completed by a thread of the last thread information detected by the last detecting device, irrespective of whether the thread replacement timing is already set or not, wherein the thread information updating device updates the needle bar/thread information so that there exists the needle bar/thread information that coincides with the predetermined thread information, and then initializes the predetermined thread information storage device, in the case where the thread replacement timing is set by the forcible timing setting device.

8. The sewing sequence determining apparatus as claimed in claim 1, further comprising a sequence creating device that creates the sewing sequence candidates of the plurality of sewing targets of which the sewing data is stored in the sewing data storage device, wherein the thread information readout device reads out the thread information on the sewing data stored in the sewing data storage device, in accordance with the sequence information for each of the sewing sequence candidates created by the sequence creating device.

9. The sewing sequence determining apparatus as claimed in claim 8, further comprising:

a grouping device that creates a group consisting of a plurality of the sewing targets stored in the sewing data storage device; and a group storage device that stores the group created by the grouping device and the sewing targets configuring the group, wherein the sequence creating device creates the sewing sequence candidates so that the sewing targets grouped by the grouping device have the sewing sequences that are sequential.

10. The sewing sequence determining apparatus as claimed in claim 9, further comprising:

an intra-group sequence input device that inputs an intra-group sequence that is the sewing sequence within the group of the sewing targets configuring the group; and an intra-group sequence storage device that stores an intra-group sequence-determined sewing target that is the sewing target of which the intra-group sequence is input by the intra-group sequence input device and the intra-group sequence of the intra-group sequence-determined sewing target;

wherein the sequence creating device creates the sewing sequence candidates so that the intra-group sequence of the intra-group sequence-determined sewing target is obtained as the sewing sequence stored in the intra-group sequence storage device.

11. The sewing sequence determining apparatus as claimed in claim 9, further comprising:

a group sequence input device that inputs the sewing sequence of the group; and a group sequence storage device that stores a sequence-determined group that is the group of which the sewing sequence is input by the group sequence input device and the sewing sequence of the sequence-determined group, wherein the sequence creating device creates the sewing sequence candidates so that the sewing sequence of the sequence-determined group is obtained as the sewing sequence stored in the group sequence storage device.

12. The sewing sequence determining apparatus as claimed in claim 8, further comprising:

a sewing target sequence input device that inputs the sewing sequence of the sewing target; and a sewing target sequence storage device that stores sequence-determined sewing target that is the sewing target of which the sewing sequence is input by the sewing target sequence input device and the sewing sequence of the sequence-determined sewing target, wherein the sequence creating device creates the sewing sequence candidates of the sewing targets stored in the sewing data storage device so that the sewing sequence of the sequence-determined sewing target is obtained as the sewing sequence stored in the sewing target sequence storage device.

13. The sewing sequence determining apparatus as claimed in claim 8, wherein the sequence creating device recreates the sewing sequence candidates as candidates of sewing sequences of the plurality of the sewing targets that are unfinished, of which the sewing data is stored in the sewing data storage device, in the case where the sewing sequence candidates are recreated in a middle of reading out the sewing data and carrying out sewing operations in accordance with the sewing sequences already determined; and wherein the thread information readout device reads out the thread information in the sewing data stored in the sewing data storage device in accordance with the sequence information for each of the sewing sequence candidates after the sewing data which is unfinished has been read out among the sewing data on the sewing target being sewn in accordance with the sequence information.

14. The sewing sequence determining apparatus as claimed in claim 1, further comprising an optimal sequence announcing device that announces the optimal sewing sequence candidate determined by the optimal sequence determining device.

15. A sewing sequence determining program that determines sewing sequences of a plurality of sewing targets, recorded on a computer-readable recording medium, the program comprising:

a sewing data storage step of storing a plurality of sewing targets and sewing data in association with each other, the sewing data including at least thread information that is information relating to threads for sewing the sewing targets and sequence information that indicates sequences for sewing the sewing targets;

a thread information readout step of reading out the thread information in accordance with the sequence information for each of a plurality of sewing sequence candidates, wherein each sewing sequence candidate is determined from the plurality of the sewing targets having the sewing data stored in the sewing data storage step;

a needle bar/thread information storage step of storing needle bar/thread information that is information relating to threads set at a plurality of needle bars of a multi-needle sewing machine;

a thread replacement count calculating step of comparing sewing thread information that is the thread information sequentially read out in the thread information readout step with the needle bar/thread information stored in the needle bar/thread information storage step, and calculating a thread replacement count; and an optimal sequence determining step of determining as an optimal sewing sequence candidate the sewing sequence candidate having a minimum thread replacement count as calculated in the thread replacement count calculating step.

16. The sewing sequence determining program as claimed in claim 15, wherein the thread replacement count calculating step comprises:
   a thread information determining step of determining whether the needle bar/thread information that coincides with the sewing thread information read out in the thread information read out step by the number of the needle bars has been stored in the needle bar/thread information storage step;
   a thread information updating step of updating the needle bar/thread information so that there exists the thread information that coincides with the sewing thread information read out in the thread information read out step by the number of the needle bars, in the case where it is determined in the thread information determining step that the needle bar/thread information that coincides with the sewing thread information has not been stored; and
   a thread replacement count storage step of storing a number of items of the needle bar/thread information updated in the thread information updating step as a thread replacement count for each sewing sequence candidate; and
   wherein the optimal sequence determining step determines as the optimal sewing sequence candidate the sewing sequence candidate having the minimum thread replacement count, among the sewing sequence candidates stored in the thread replacement counts storage step.

17. The sewing sequence determining program as claimed in claim 15, further comprising a predetermined thread information storage step of storing predetermined thread information that is the thread information to be registered in the needle bar/thread information storage step,
   wherein the thread replacement count calculating step comprises:
      a thread information determining step of determining whether the predetermined thread information that coincides with the sewing thread information sequentially read out in the thread information readout step has been stored in the predetermined thread information storage step;
      a thread information registering step of causing the predetermined thread information storage step to store the sewing thread information as the predetermined thread information in the case where it is determined in the thread information determining step that the predetermined thread information that coincides with the sewing thread information has not been stored;
      a thread information updating step of updating the needle bar/thread information so that there exists the needle bar/thread information that coincides with the predetermined thread information, and then initializing the predetermined thread information stored in the predetermined thread information storage step; and
      a thread replacement count storage step of storing a number of the needle bar/thread information updated in the thread information updating step as a thread replacement count for each of the sequence candidates,
   wherein the optimal sequence determining step determines as the optimal sewing sequence candidate the sewing sequence candidate having the minimum thread replacement count among the sewing sequence candidates stored in the thread replacement count storage step.

18. The sewing sequence determining program as claimed in claim 17, further comprising a determination control step of causing the thread information determining step to execute determination until all of the sewing thread information read out in the thread information readout step is registered as the predetermined thread information and the needle bar/thread information is updated, after the needle bar/thread information is previously updated in the thread information updating step.

19. The sewing sequence determining program as claimed in claim 18, wherein the determination control step terminates determination in the thread information determining step, in the case where the thread replacement count of one of the sewing sequence candidates being processed is equal to or greater than the number of thread replacement of another one of the sewing sequence candidates stored in the thread replacement counts storage step.

20. The sewing sequence determining program as claimed in claim 17, further comprising:
   a thread information registration determining step of determining whether the sewing thread information can be registered in the predetermined thread information storage step, in the case where it is determined in the thread information determining step that the predetermined thread information that coincides with the sewing thread information has not been stored in the predetermined thread information storage step; and
   a timing setting step of setting a thread replacement timing that is a timing of replacing a thread set to the needle bar immediately before the sewing sequence of the sewing data including the sewing thread information with which it is determined in the thread information determining step that the predetermined thread information that coincides has not been stored, in the case where it is determined in the thread information registration determining step that the sewing thread information cannot be registered,
   wherein the thread information updating step updates the needle bar/thread information so that the needle bar/thread information that coincides with the predetermined thread information is stored, and then initializes the predetermined thread information stored in the predetermined thread information storage step, in the case where the thread replacement timing is set in the timing setting step.

21. The sewing sequence determining program as claimed in claim 20, further comprising:
   a last detecting step of detecting last thread information that is the sewing thread information corresponding to the last sewing sequence of the sewing target; and
   a forcible timing setting step of setting the thread replacement timing so that thread replacement is carried out after sewing operations are completed by a thread of the last thread information detected in the last detecting step, irrespective of whether the thread replacement timing is already set or not,
   wherein the thread information updating step updates the needle bar/thread information so that there exists the needle bar/thread information that coincides with the predetermined thread information, and then initializes the predetermined thread information stored in the predetermined thread information storage step, in the case where the thread replacement timing is set in the forcible timing setting step.

22. The sewing sequence determining program as claimed in claim 15, further comprising a sequence creating step of creating the sewing sequence candidates of the plurality of sewing targets of which the sewing data has been stored in the sewing data storage step,
- wherein the thread information readout step reads out the thread information on the sewing data stored in the sewing data storage step, in accordance with the sequence information for each of the sewing sequence candidates created in the sequence creating step.

23. The sewing sequence determining program as claimed in claim 22, further comprising:
- a grouping step of creating a group consisting of a plurality of the sewing targets stored in the sewing data storage step; and
- a group storage step of storing the group created in the grouping step and the sewing targets configuring the group,
- wherein the sequence creating step creates the sewing sequence candidate so that the sewing targets grouped in the grouping step have the sewing sequences that are sequential.

24. The sewing sequence determining program as claimed in claim 23, further comprising:
- an intra-group sequence input step of inputting an intra-group sequence that is the sewing sequence within the group of the sewing targets configuring the group; and
- an intra-group sequence storage step of storing an intra-group sequence-determined sewing target that is the sewing target of which the intra-group sequence has been input in the intra-group sequence input step and the intra-group sequence of the intra-group sequence-determined sewing target;
- wherein the sequence creating step creates the sewing sequence candidates so that the intra-group sequence of the intra-group sequence-determined sewing target is obtained as the sewing sequences stored in the intra-group sequence storage step.

25. The sewing sequence determining program as claimed in claim 23, further comprising:
- a group sequence input step of inputting the sewing sequence of the group; and
- a group sequence storage step of storing a sequence-determined group that is the group of which the sewing sequence has been input in the group sequence input step and the sewing sequence of the sequence-determined group,
- wherein the sequence creating step creates the sewing sequence candidates so that the sewing sequence of the sequence-determined group is obtained as the sewing sequence stored in the group sequence storage step.

26. The sewing sequence determining program as claimed in claim 22, further comprising:
- a sewing target sequence input step of inputting the sewing sequence of the sewing target; and
- a sewing target sequence storage step of storing a sequence-determined sewing target that is the sewing target of which the sewing sequence has been input in the sewing target sequence input step and the sewing sequence of the sequence-determined sewing target,
- wherein the sequence creating step creates the sewing sequence candidates of the sewing targets stored in the sewing data storage step so that the sewing sequence of the sequence-determined sewing target is obtained as the sewing sequence stored in the sewing target sequence storage step.

27. The sewing sequence determining program as claimed in claim 22,
- wherein the sequence creating step recreates the sewing sequence candidates as candidates of sewing sequences of the plurality of the sewing targets that are unfinished, of which the sewing data has been stored in the sewing data storage step, in the case where the sewing sequence candidates are recreated in a middle of reading out the sewing data and carrying out sewing operations in accordance with the sewing sequences already determined; and
- wherein the thread information readout step reads out the thread information in the sewing data stored in the sewing data storage step in accordance with the sequence information for each of the sewing sequence candidates after the sewing data which is unfinished has been read out among the sewing data on the sewing target being sewn in accordance with the sequence information.

28. The sewing sequence determining program as claimed in claim 15, further comprising an optimal sequence announcing step of announcing the optimal sewing sequence candidate determined in the optimal sequence determining step.

29. A multi-needle sewing machine comprising a sewing sequence determining apparatus that determines sewing sequences of a plurality of sewing targets, the sewing sequence determining apparatus comprising:
- a sewing data storage device that stores a plurality of sewing targets and sewing data in association with each other, the sewing data including at least thread information that is information relating to threads for sewing the sewing targets and sequence information that indicates sequences for sewing the sewing targets;
- a thread information readout device that reads out the thread information in accordance with the sequence information for each of a plurality of sewing sequence candidates, wherein each sewing sequence candidate is determined from the plurality of the sewing targets having the sewing data stored in the sewing data storage device;
- a needle bar/thread information storage device that stores needle bar/thread information that is information relating to threads set at a plurality of needle bars of a multi-needle sewing machine;
- a thread replacement count calculating device that compares sewing thread information that is the thread information sequentially read out by the thread information readout device with the needle bar/thread information stored in the needle bar/thread information storage device, and then calculates a thread replacement count; and
- an optimal sequence determining device that determines as an optimal sewing sequence candidate the sewing sequence candidate having a minimum thread replacement count as calculated by the thread replacement count calculating device.

* * * * *